US005732212A

United States Patent [19]
Perholtz et al.

[11] Patent Number: 5,732,212
[45] Date of Patent: Mar. 24, 1998

[54] SYSTEM AND METHOD FOR REMOTE MONITORING AND OPERATION OF PERSONAL COMPUTERS

[75] Inventors: Ronald J. Perholtz, Silver Spring, Md.; Eric J. Elmquest, Arlington, Va.

[73] Assignee: Fox Network Systems, Inc., Rockville, Md.

[21] Appl. No.: 180,824

[22] Filed: Jan. 13, 1994

Related U.S. Application Data

[63] Continuation-in-part of Ser. No. 966,081, Oct. 23, 1992, Pat. No. 5,566,339.

[51] Int. Cl.$^6$ .................................................. G06F 11/00
[52] U.S. Cl. ........................ 395/200.11; 395/200.09; 395/838
[58] Field of Search ............................. 395/200, 800, 395/500, 575, 700, 775, 725, 20.77, 200.11, 20, 72, 838, 200.09; 371/16–22

[56] References Cited

U.S. PATENT DOCUMENTS

| | | | |
|---|---|---|---|
| 4,353,092 | 10/1982 | Bailey et al. | 358/160 |
| 4,641,262 | 2/1987 | Bryan et al. | 340/745 |
| 4,833,625 | 5/1989 | Fisher et al. | 358/111 |
| 5,084,875 | 1/1992 | Weinberger et al. | 371/16.4 |
| 5,109,350 | 4/1992 | Henwood et al. | 364/575 |
| 5,124,622 | 6/1992 | Kawamura et al. | 318/569 |
| 5,140,435 | 8/1992 | Suzuki et al. | 358/335 |
| 5,153,886 | 10/1992 | Tuttle | 371/22.9 |
| 5,170,466 | 12/1992 | Rogan et al. | 395/145 |
| 5,193,174 | 3/1993 | Bealkowski et al. | 395/500 |
| 5,237,677 | 8/1993 | Hirosawa et al. | 395/575 |
| 5,315,512 | 5/1994 | Roth | 364/413.25 |
| 5,327,243 | 7/1994 | Maietta et al. | 348/565 |
| 5,349,675 | 9/1994 | Fitzgerald et al. | 395/800 |
| 5,379,409 | 1/1995 | Ishikawa | 395/575 |
| 5,388,252 | 2/1995 | Dreste et al. | 395/575 |
| 5,404,493 | 4/1995 | Bolne et al. | 395/500 |
| 5,444,849 | 8/1995 | Farrand et al. | 395/200.09 |
| 5,452,093 | 9/1995 | Kwak | 358/296 |

OTHER PUBLICATIONS

David Stone, "A new generation in the wings" PC Magazine, Dec. 8, 1992, v11, n21, p. 322.

"Navigating the Perils of Remote Control" by David Willis and Bruce Broadman, *Network Computing*, Oct. 1, 1993, pp. 44–62.

"Novell Unwraps Remote–Access Ware" by Michael Dortch, *Communications Week*, Sep. 13, 1993, p. 12.

"Remote Power On/Off", *Computer Discount Warehouse Catalog*, 1993, p. 26.

"Sentry Remote Power Manager", Ad in *Network Computing*, Sep., 1993, p. 204.

"Commander" by Cybex Corporation.

"Master Console" by Raritan Computer, Inc.

"Keyplex" by Data Vision, Inc.

"Picture Phone" by Home Automation Laboratories, p. 37.

"AT&T Video Phone" by AT&T.

(List continued on next page.)

*Primary Examiner*—Mehmet B. Geckil
*Attorney, Agent, or Firm*—Sixbey, Friedman, Leedom & Ferguson, P.C.; Eric J. Robinson

[57] ABSTRACT

A system and method for accessing, controlling and monitoring a data processing device in which a video raster signal from the data processing device is analyzed to determine the information displayed on a video display monitor attached to the data processing device is used. The video raster signal is converted to a digital form and a cyclic redundancy check is performed on the digital data to determine the information contained in the video raster signal and to generate a compressed representation of that information. The information may then easily and quickly be transmitted to a remote location for analysis and review. Additionally, commands from the remote location can be transmitted to the system to control the data processing device.

21 Claims, 42 Drawing Sheets

Microfiche Appendix Included
(3 Microfiche, 255 Pages)

OTHER PUBLICATIONS

"Map Assist" by Fresh Technology.

"LANtastic" by Artisoft Corporation, Ad in *PC Magazine*, Apr. 14, 1992, p. 6.

"Carbon Copy Plus, Reference Manual for Lan Connections"–Microcom.

"Add–in Boards Lower Cost Of Capturing Video", an article by Erica Schroeder.

"VGA–TV Converter" appearing in *Black Box Catalog* from Black Box Corporation, pp. V8–V9.

"Indeo Technology—Real–Time Video Compression—Intel Technology Briefing".

"Plugging Into The Lan From the Road" by Frank Derfler, Jr., *PC Magazine*, Aug., 1993, pp. NE1, NE4, NE6.

"Improving Information Access" by Mike Byrd, *PC Magazine*, Apr. 1991, pp. 101–197.

"Simple or Simplistic" by Frank Derfler, Jr., *PC Magazine*, Apr. 27, 1993, pp. 239–293.

"OCR Gets You From There to Here" by Mitt Jones, *PC Magazine*, Jul., 1992, pp. 267–319.

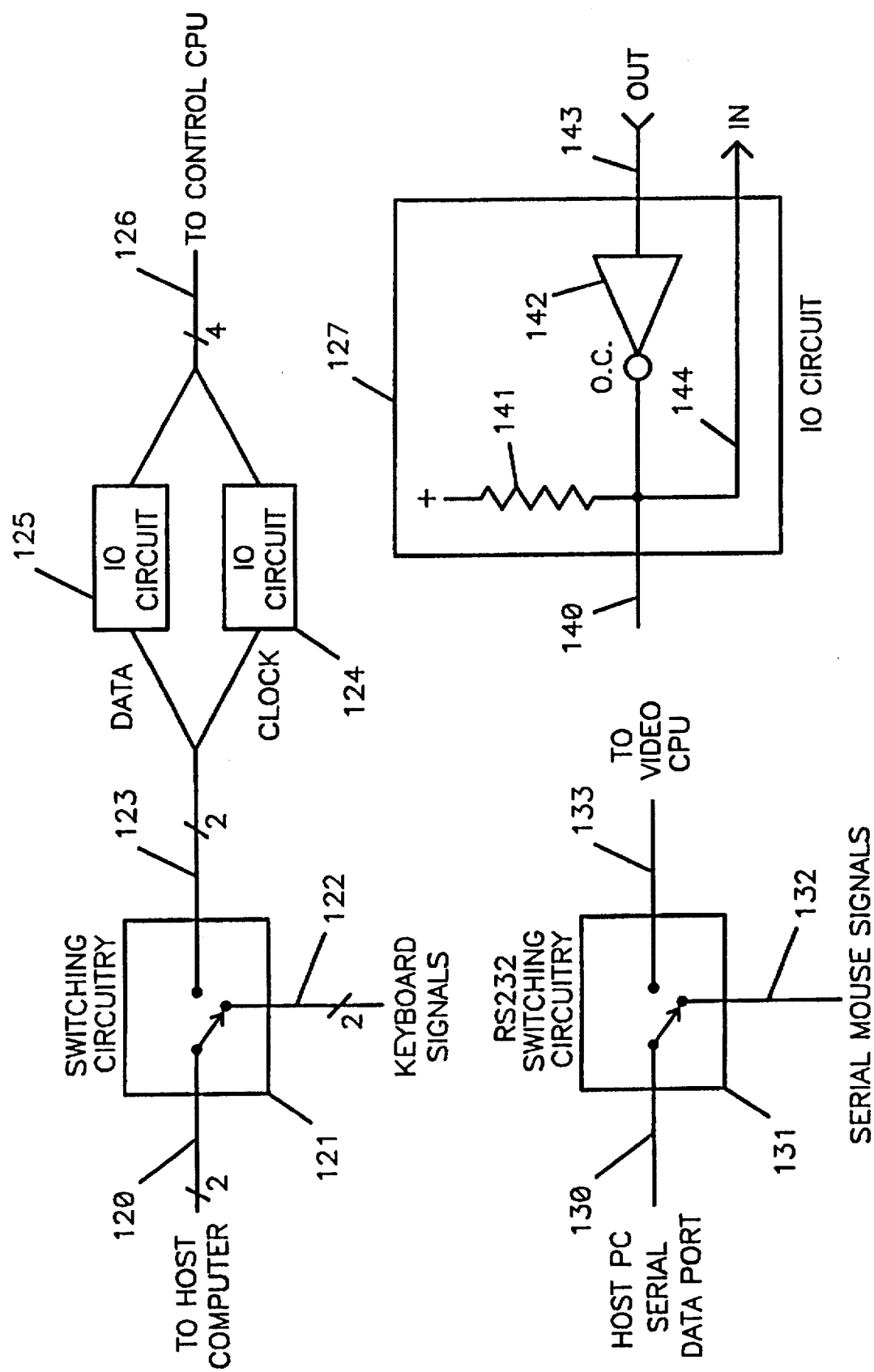

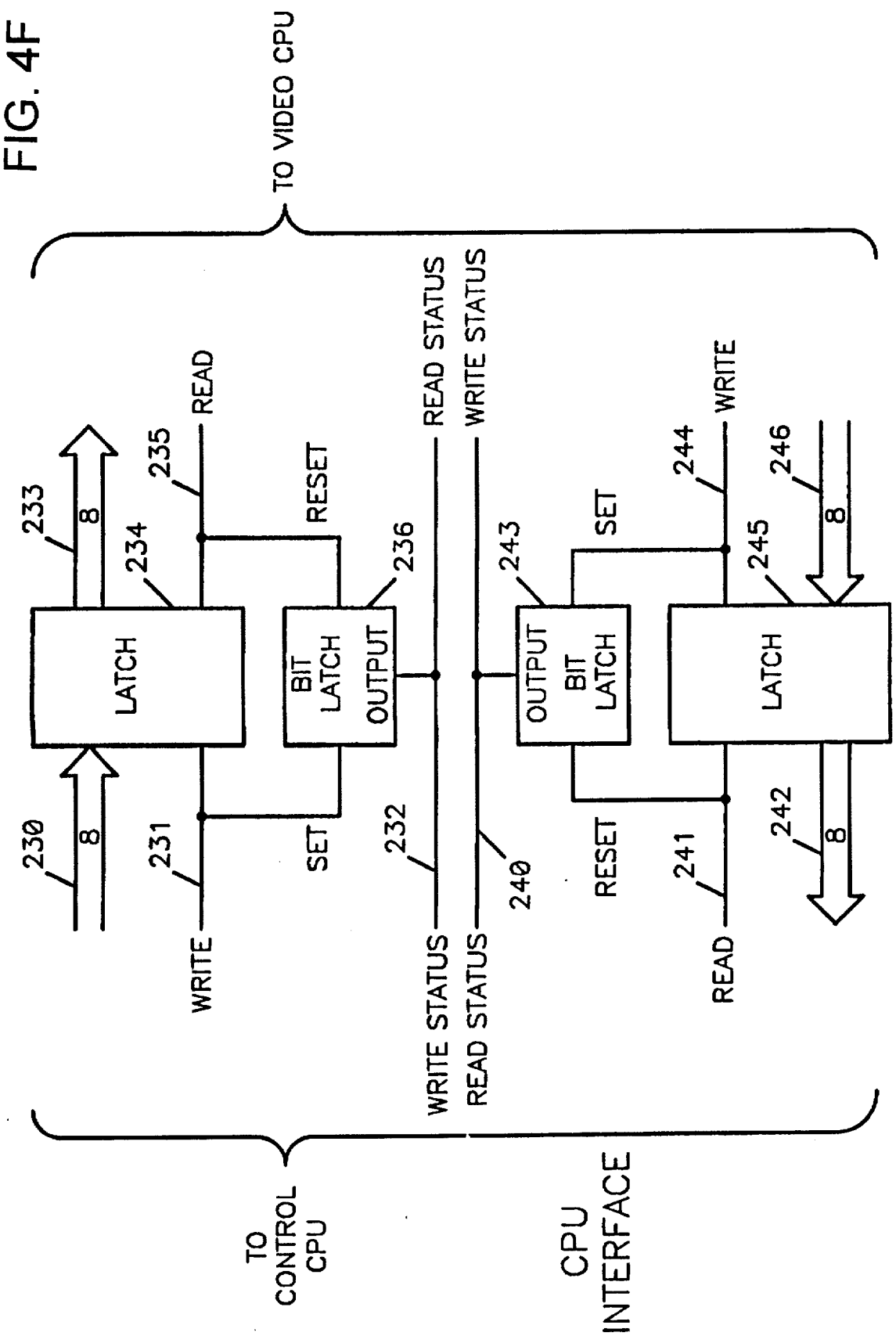

VIDEO DISPLAY MONITOR IN VGA TEXT MODE

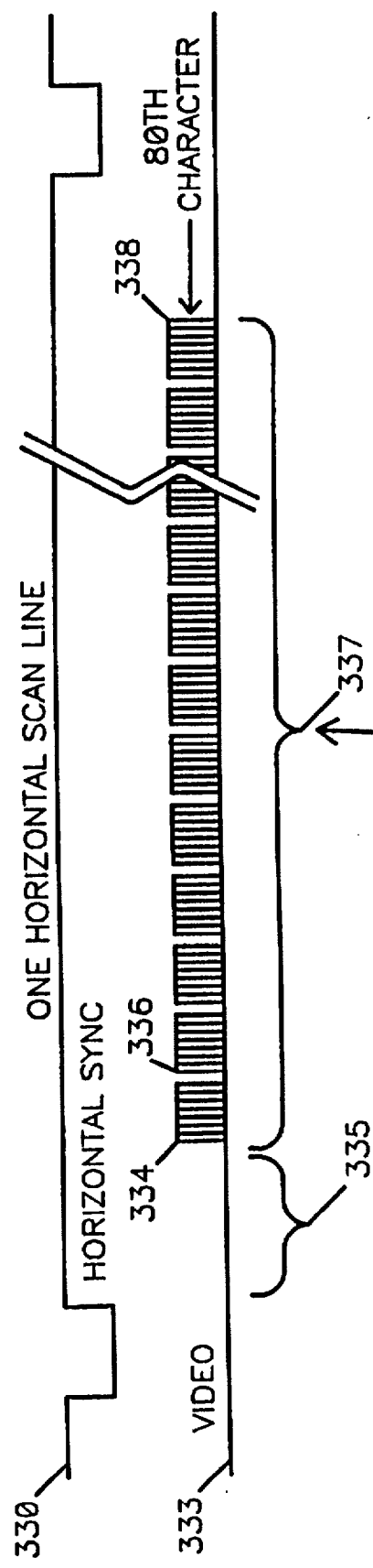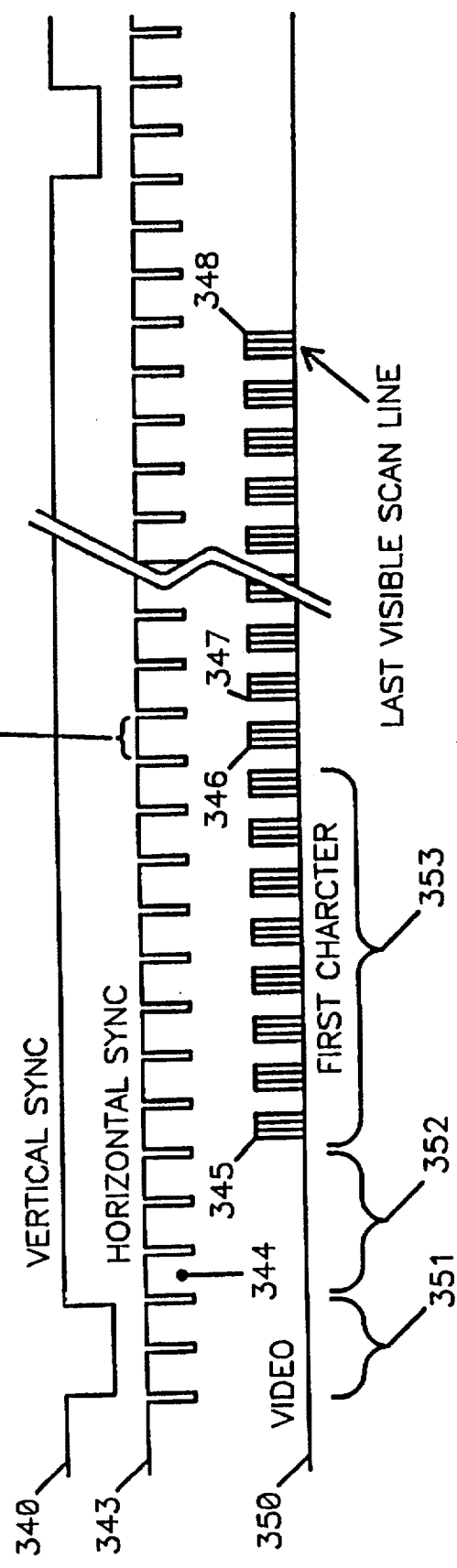

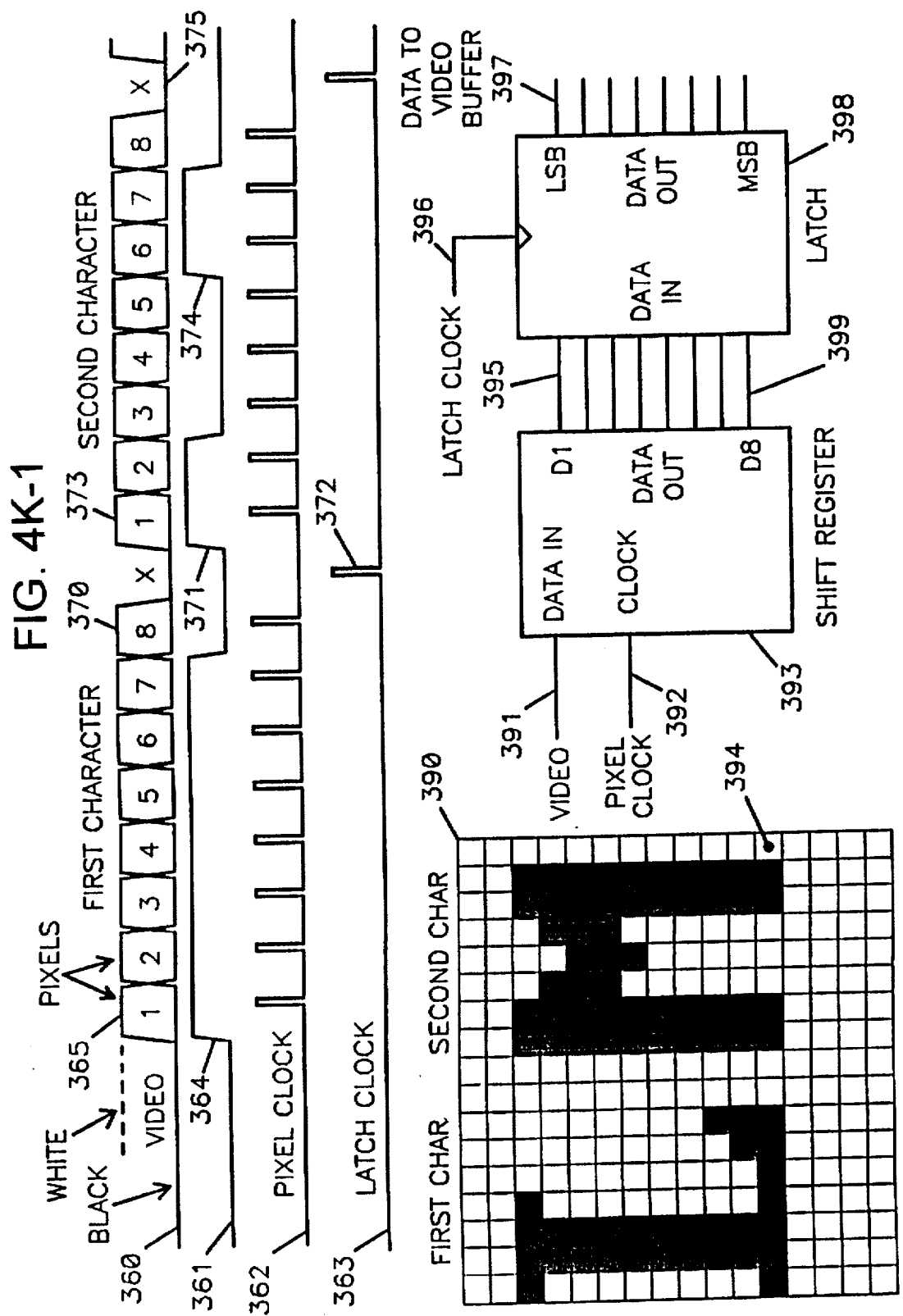

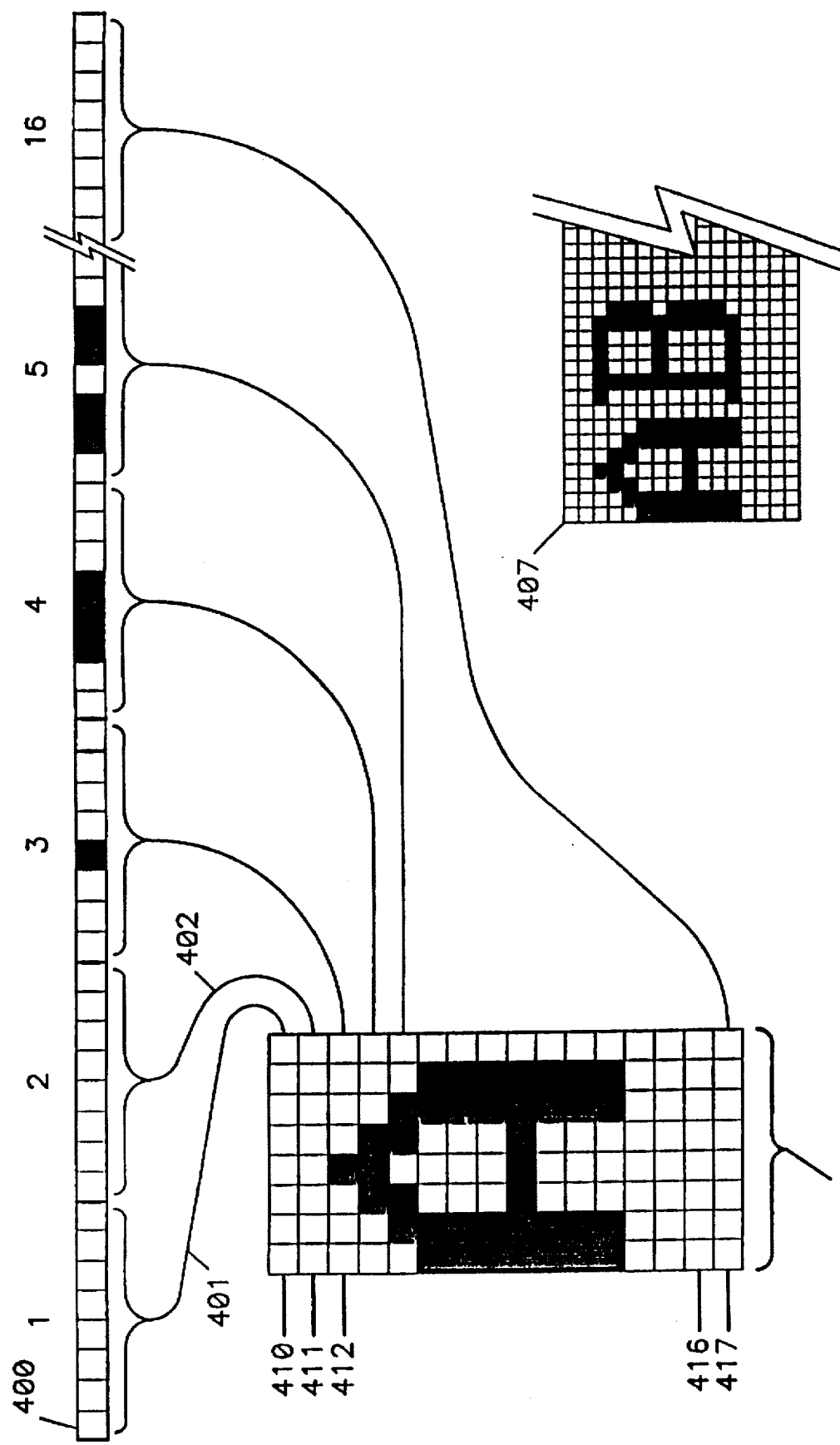

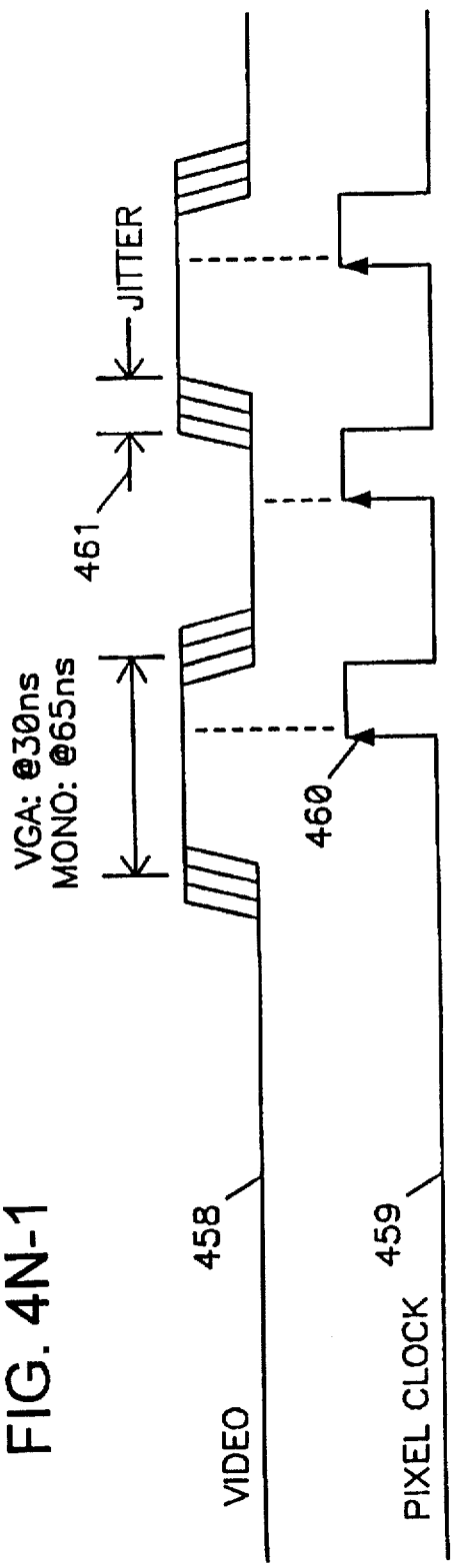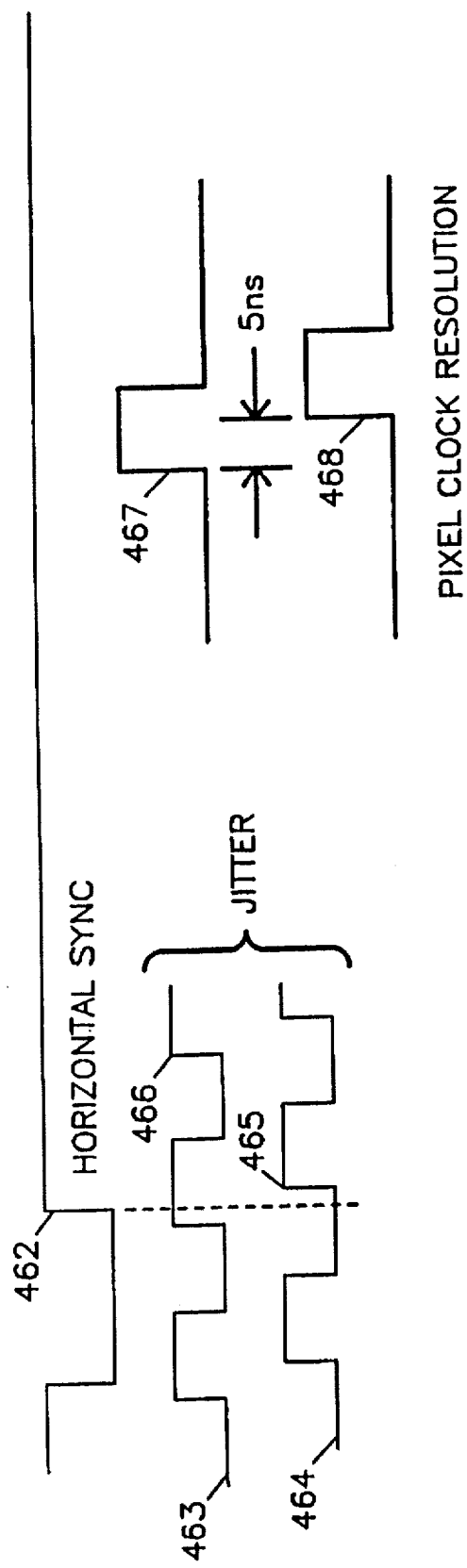

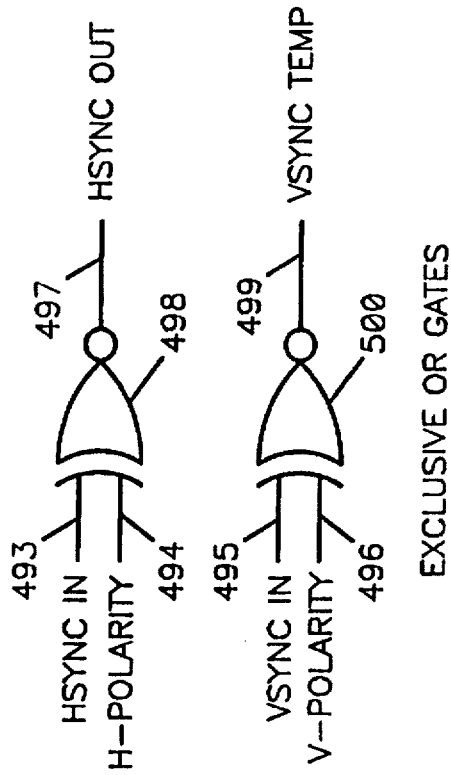
FIG. 4P-1
FIG. 4P-2
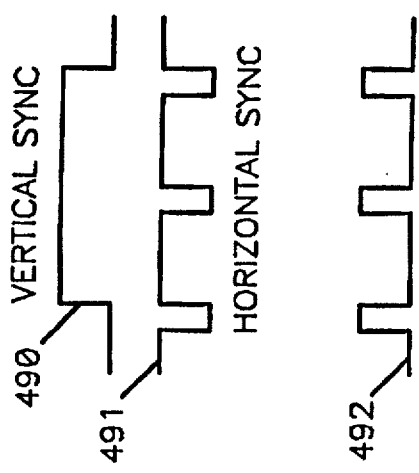
FIG. 4P-3
FIG. 4P-4
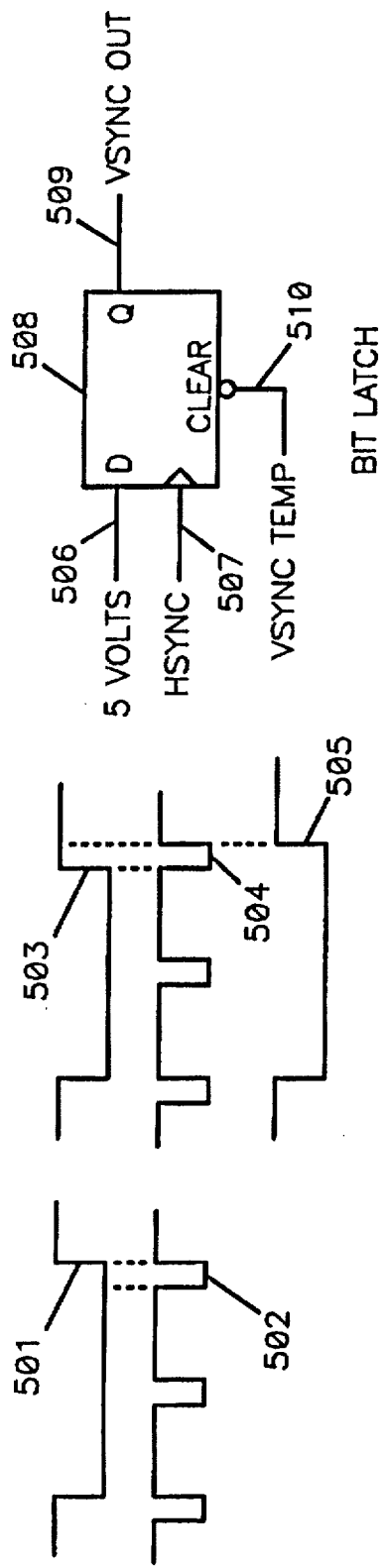
FIG. 4P-5

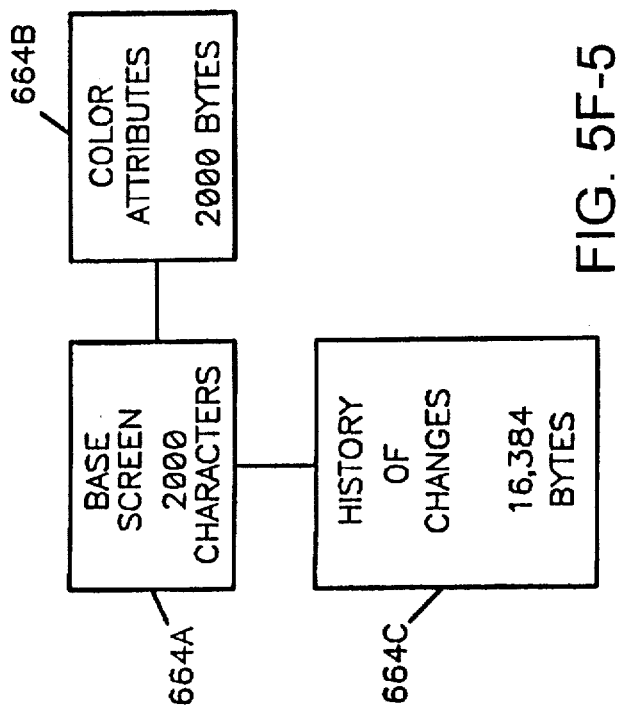
FIG. 5F-4
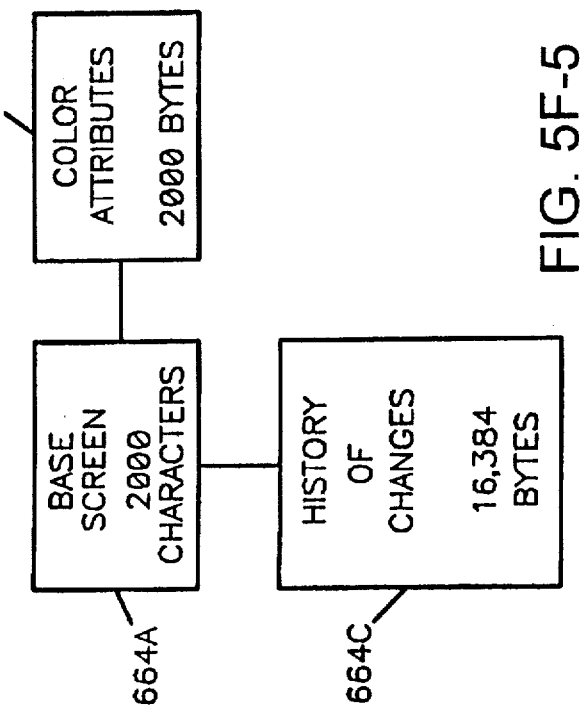
FIG. 5F-5
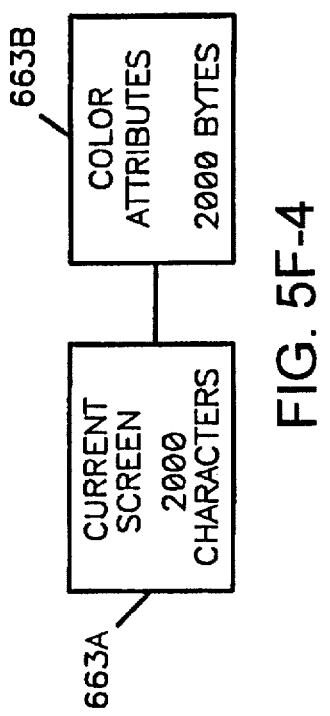
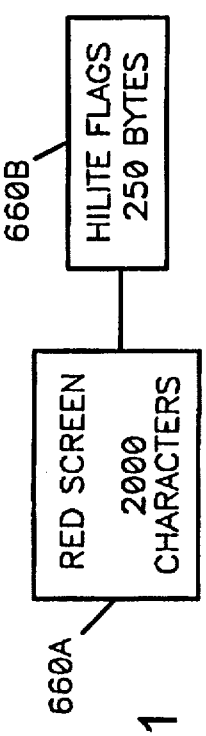
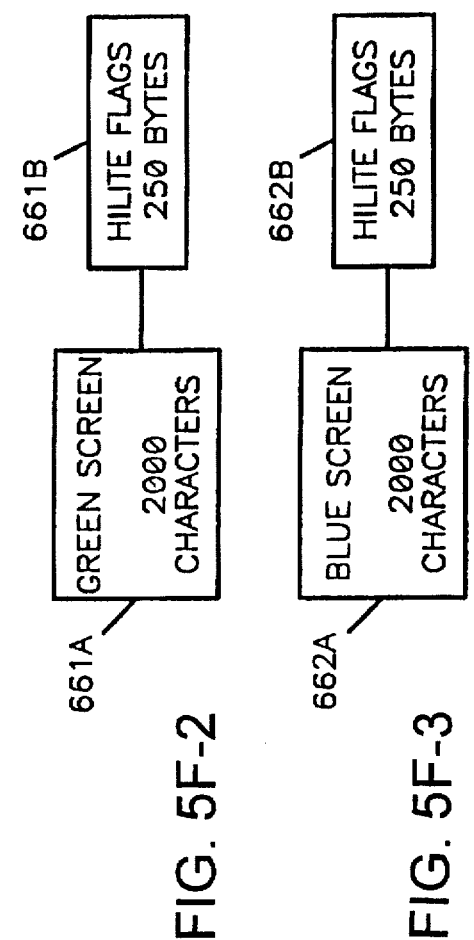
FIG. 5F-1    FIG. 5F-2    FIG. 5F-3

FIG. 5G

| CHARACTER COLOR | RED SIGNAL | GREEN SIGNAL | BLUE SIGNAL |
|---|---|---|---|
| WHITE ON BLACK — 665A | 666A | 667A | 668A |
| WHITE ON BLUE — 665B | 666B | 667B | 668B |
| YELLOW ON BLUE — 665C | 666C | 667C | 668C |
| RED ON BLUE — 665D | 666D | 667D | 668D |
| YELLOW ON VIOLET — 665E | 666E | 667E | 668E |

FIG. 5H

| CHARACTER COLOR | | RED SIGNAL | GREEN SIGNAL | BLUE SIGNAL |
|---|---|---|---|---|
| YELLOW ON GREEN | 665F | 666F | 667F | 668F |
| BLACK ON WHITE | 665G | 666G | 667G | 668G |
| BLACK BLOCK | 665X | 666X | 667X | 668X |
| WHITE BLOCK | 665Y | 666Y | 667Y | 668Y |
| YELLOW BLOCK | 665Z | 666Z | 667Z | 668Z |

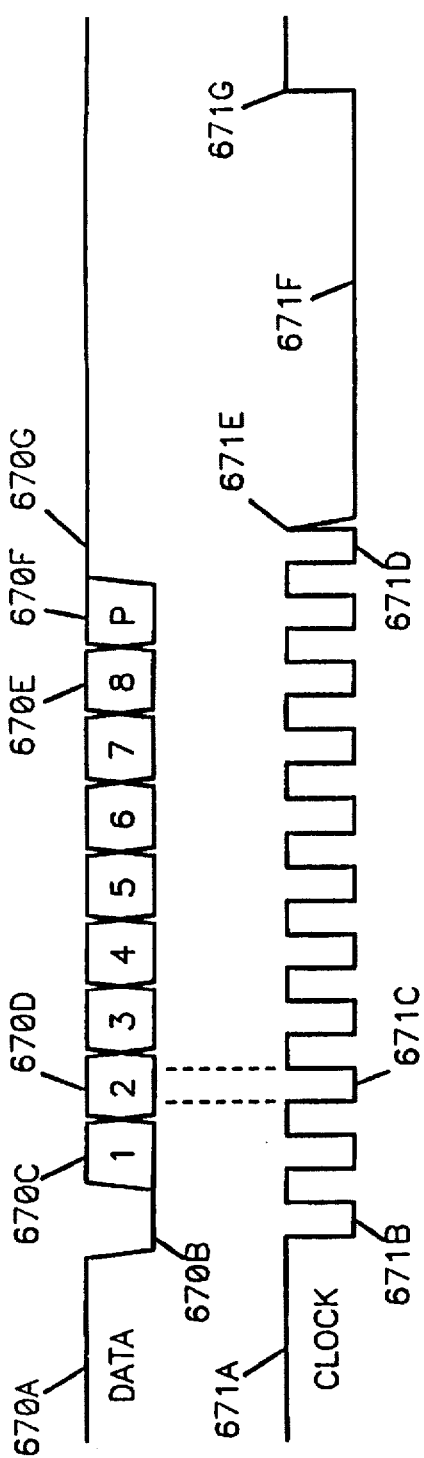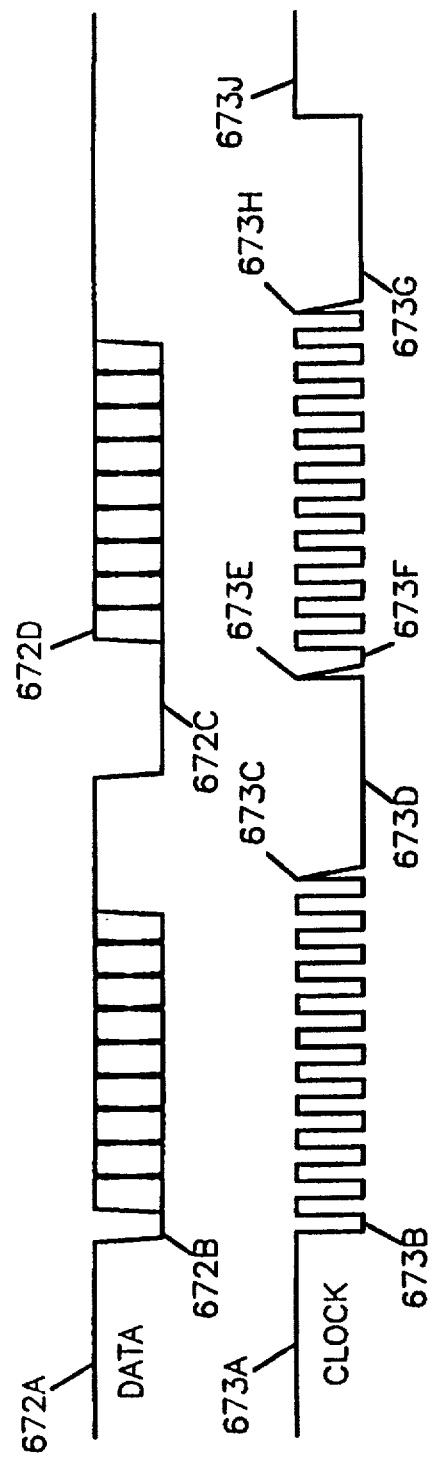
FIG. 5I-1
FIG. 5I-2

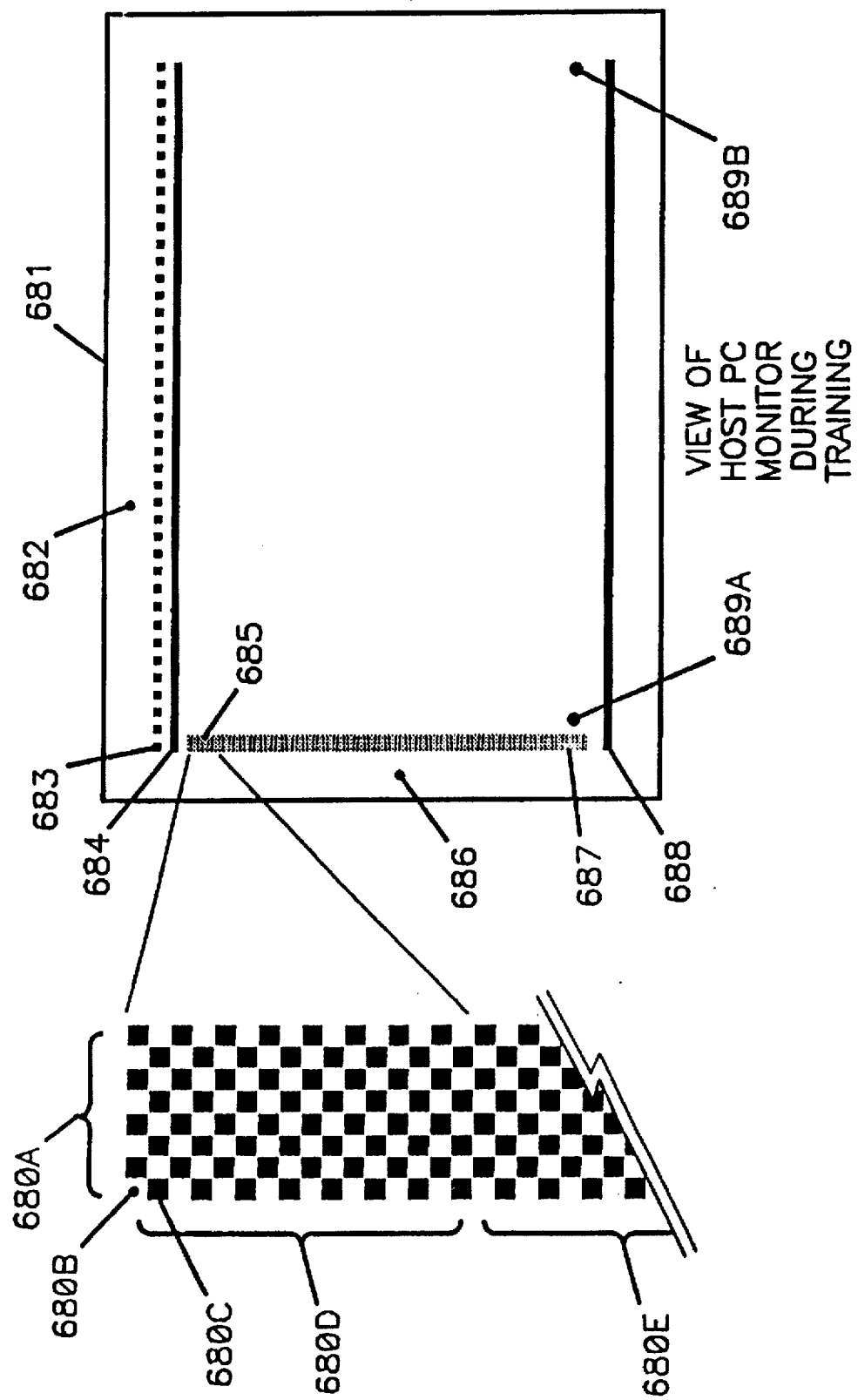

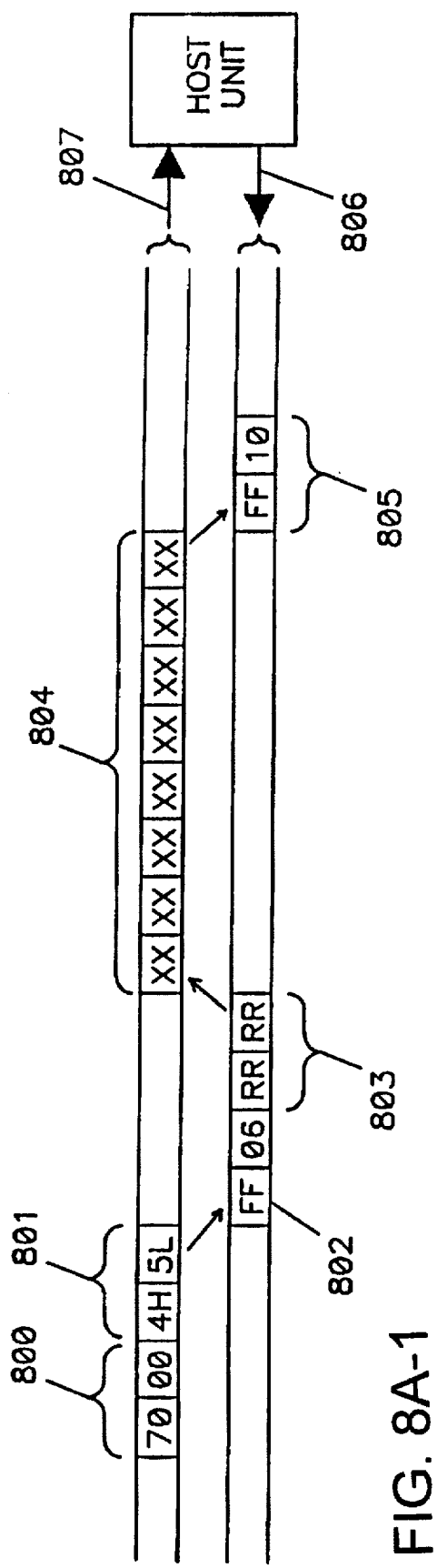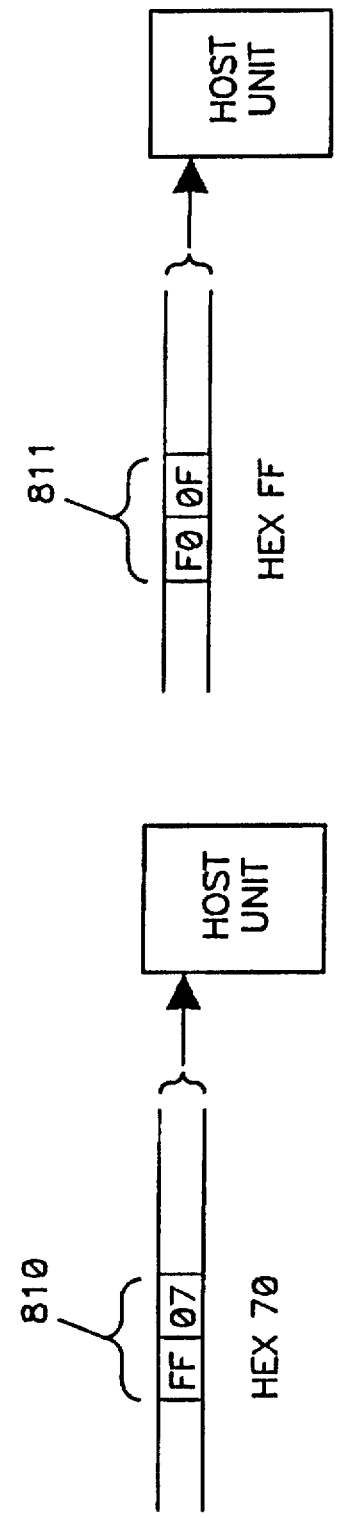
FIG. 8A-1
FIG. 8A-2
FIG. 8A-3

SYSTEM AND METHOD FOR REMOTE MONITORING AND OPERATION OF PERSONAL COMPUTERS

This application is a continuation-in-part of U.S. patent application Ser. No. 07/966,081 filed Oct. 23, 1992, now U.S. Pat. No. 5,566,339.

This specification includes a microfiche appendix containing 3 fiches having 255 frames.

FIELD OF THE INVENTION

The present invention relates generally to a method and apparatus for personal computer (PC) monitoring and control and more specifically to a method and apparatus for enabling a PC to which the apparatus is connected (hereinafter referred to as a "Host" PC) to be accessed, restarted, operated and/or controlled remotely by another PC (hereinafter referred to as a "Remote" PC) using standard public utility telephone lines or direct cabling. The invention further permits a Remote PC to access Host processing status information and/or restart (i.e reboot) the Host PC without Central Processing Unit (CPU) support from the Host PC.

BACKGROUND OF THE INVENTION

Millions of PCs are presently in use. Each PC includes various hardware components including a CPU, keyboard, mouse, video display adapter card/circuit (hereinafter referred to as "VDAC"), video display monitor (hereinafter referred to as "VDM"), and/or one or more mass storage devices. Other special purpose hardware devices such as a modem, voice or sound card, or network interface adapter card may be connected to or installed within a PC.

Presently, a VDM is normally either an analog or TTL (digital) display device that connects to either a 15 pin or 9 pin receptacle on a PC's VDAC. A PC's VDAC normally sends video signals to a VDM in either a monochrome, CGA, EGA, or VGA format known to persons familiar with the trade. The present invention, however, is not to be limited to these video formats and will operate with any video format when properly configured. PC's may be accessed and controlled remotely by other PC's by essentially two different types of processes. First, a hardware network interface adapter card or device may be installed or connected to a PC. This interface device is then connected, either using a cable or through the airways using a wireless network interface device, to other PCs attached to a Local Area Network (LAN). All such devices require Host CPU support (via network interface software installed in the PC's memory) to permit a Remote PC to access or control a Host PC. Persons familiar with the trade refer to this type of process as "peer to peer" PC networking.

Second, a memory resident software system may be installed on a Host PC having access to a modem which would then permit the Host PC to be remotely controlled over standard telephone lines by another Remote PC having access to a modem and compatible memory resident interface software operating on the Remote PC. Again, in this case the ability of the Remote PC to control and access the Host PC depends on CPU processing support being provided by both PC's and a memory resident software system being pre-installed on the Host PC to acknowledge and process an incoming call from the Remote PC.

In many cases control of a PC is not always practical or possible remotely. Many PC based application software systems take over a PC completely and, due to memory restrictions or other processing conflicts, cannot co-exist with those software systems permitting Remote PC access. Moreover, even in cases where the required Host and Remote access interface software has been successfully installed, if the Host processor should lock-up or otherwise fail, remote users immediately lose their ability to access the Host system. In such cases the Remote user would not be able to remotely access information displayed on the Host PC's VDM screen after the lock-up occurred. Information displayed on the VDM screen, however, usually indicates why the failure occurred and the status of processing at the point of failure, and therefore can be particularly useful in analyzing the PC failure and in preventing future similar failures.

Numerous PC monitoring systems are presently available to automatically alert designated persons via pagers, prerecorded voice alerts or electronic mail when a PC or application running on a PC has failed. When such failures occur, the persons being notified may be in remote locations (e.g. at home) not able to physically access the PC that has failed.

After a failure alert is issued, persons alerted typically have access to a Remote PC, but may not be able to access a desired Host PC because the Host CPU has locked up and will no longer respond to user input, the application running on the Host system does not support or condone Remote PC access, or the Host system does not have the required software installed to permit a Remote PC to access the Host PC. When a Host CPU has locked up or a program error has occurred, vital information, as to the exact nature of the problem which has occurred is often displayed on the PC's VDM screen. Normally, this information must be viewed and/or analyzed before corrective action can be taken. Devices presently exist that permit a PC to be remotely or automatically re-booted, which in many cases restores normal processing after an alert is issued. However, persons alerted are reluctant to use such devices without first looking at the PC's VDM screen to determine what may have caused the failure, so that similar failures can be prevented. In other cases, information on the VDM screen may be necessary to successfully re-start an application that has failed from the point of failure.

Many PC users need to remotely monitor and control another PC, where, due to processing restrictions or limitations, it may not be possible to use the PC's processor to access a particular PC remotely. For example, for security reasons, a bank may wish to discreetly monitor PC usage by tellers or loan officers from a central, off-site location. As a second example, a Network Manager may wish to periodically remotely monitor and control the activities of a dedicated network file server or tape backup workstation. As a third example, unskilled on-site PC users may need a simple means to permit PC maintenance personnel to have extensive remote access to their PCs, and particularly to a network file server, in the event of trouble or failure.

Numerous software systems are available which are designed to link one PC with other PCs using modems connected via standard telephone lines. These systems permit a Host PC to be controlled by a Remote PC. Special functions keys and menus are used by these software systems that permit these products to operate a Host PC from a Remote PC as if the remote user was physically sitting at the Host PC. Examples of such packages include Crosstalk, developed by Digital Communications Associates, Inc., 1000 Alderman Dr., Alpharetta, Ga. 30202-1000 (404-442-4000); Procomm Plus, developed by Datastorm Technologies Inc., 3212 Lemone Blvd, Columbia, Mo. 65201, (314-

443-3282); or Unicom, developed by Data Graphics, P.O. Box 58517, Renton, Wash. 98058 (206-432-1201). Each of these products require processing support and memory from the Host PC and will halt if Host processing should lock-up or fail. Also, if these products are not pre-installed on the Host PC, remote access will not be possible and no provision is made by these products to save VDM screen history or to capture an active VDM screen when a PC has locked-up. Finally, these products assume software based control of the keyboard and/or mouse, as opposed to assuming physical control over the PC's keyboard and/or mouse, which is less restrictive.

Network software utility programs exist that permit one workstation to access and control the activities of another workstation connected to the network. Products that fall into this category include, Carbon Copy for LANs, developed by Microcom Inc., 500 River Ridge Drive, Norwood, Mass. 02062 (617-551-1000); and Map Assist, developed by Fresh Technology Company, 1478 North Tech Boulevard, Suite 101, Gilbert Arizona, 85234 (602-497-4200). Similar to the other remote access utility programs, these products require software resident in the Host PC's memory to operate. Neither remote control or access will be possible if the Host PC should lock-up or fail.

Utility software programs exist that are designed to convert graphics image data captured by document scanners into text data, so that the resulting text data can be manipulated and edited using word processing software products. Examples of such programs include, OmniPage Professional, developed by Caere Corp. 100 Cooper Ct., Los Gatos, Calif. 95030 (408-395-7000); Perceive, developed by Ocron, 3350 Scott Blvd., #36, Santa Clara, Calif. 95054; TypeReader, developed by ExperVision Inc., 3590 N. First St., San Jose, Calif. 95134 (408-428-9444); and WordScan Plus, developed by Calera Recognition Systems, 475 Potrero Ave., Sunnyvale, Calif. 94086 (408- 720-8300). Such programs obtain source input data from digitized output of static data files created by document scanners as opposed to capturing, decoding then converting to text the output signals of a PC's video display adapter cards/circuits (VDAC) as the signals are occurring (i.e. on a real time basis). In addition, such utility programs depend on CPU support from the PC where they are installed, cannot transmit data related to the status of processing in the event the PC should fail, and provide for no remote keyboard and/or mouse control.

Devices exist that permit using a central keyboard and monitor to control and access multiple PC's. Examples of such products include Commander, developed by Cybex Corporation, 2800-H Bob Wallace Ave. Huntsville, Ala. (205-534-0011); Master Console developed by Raritan Computer, Inc., 10-1 Ilene Court, Belle Mead, N.J. 08502; and Plex developed by Data Vision Inc., 370 West Camino Gardens Blvd, Boca Raton, Fla., 33432 (407-482-3996). These products require the keyboard and PC interface cables to be directly connected to one or more physical cable switching device(s). The VDAC signals are merely boosted and transferred as video signals over direct dedicated cabling. No attempt is made to convert the signal output of the VDAC to a digital form suitable transmission over public utility telephone lines or other communication network. Similarly, the keyboard used by the central unit is connected directly to each PC controlled with local wiring and no attempt is made to control keyboards using the public telephone system or to support keyboards existing at both the remote console and Host PC.

Devices exist that transmit a composite (TV) video signal over a telephone line. Such products include the PhoneViewer, distributed by Home Automation Lab, 5500 Highlands Pkwy, Suite 450, Smyrna, Ga. 30082-5141 and AT&T's video phone, developed by AT&T, 14250 Clayton Road, Baldwin, Mo. 63011, 1-800-437-9504. These products rely on a video camera to periodically capture a picture which is then transmitted to a screen on the remote caller's video phone. These systems convert the video camera images captured to bit-mapped graphical images. No attempt is made to decode the data captured into text data. Furthermore, such products are not capable of decoding and transmitting the video signals produced by a PC's VDAC. If such products were used to simply snap a picture of the PC's VDM screen, the resulting data transmitted would be slow and of a poor quality, particularly if the PC video output changed during the period when the video snapshot is being; taken. Moreover, none of these products provide a PC keyboard/mouse telephone interface necessary to control a Remote PC. Even if such an interface were provided, the user may require a separate phone line to access the Remote PC, so as to not interfere with the transmission of video graphics image data derived from the composite video snapshot.

Devices exist that permit a video signal to be captured by a PC from an external analog video recording device, such as a video camera, and the signal converted into a digital format suitable for display on a PC's VDM using a video capture adapter card inserted into a PC. One such device is the Smart Video Recorder manufactured by Intel Corp., P.O. box 58130, Santa Clara, Calif. 95052 (800-955-5599). Such devices require a dedicated cable to be directly connected from the video capture adapter card to the video recording device, and none of these products provide a PC keyboard/mouse telephone interface necessary to control a Remote PC.

Numerous devices exist that permit a PC to be re-booted remotely such as the Sentry Remote Power Manager, developed by Server Technology, 2332-B Walsh Ave. Santa Clara, Calif. 95051 (408-988-0142), Tone Operated Switch (TOPS) developed by Black Box Corp., P.O. Box 12800, Pittsburgh Pa. 15241 (412-746-5530) or TELEBOOT developed by Fox Network Systems, 15200 Shady Grove Road, Suite 350, Rockville Md. 20750 (301-924-2264). Once such system is described in U.S. patent application Ser. No. 07/966,081 filed Oct. 23, 1992 and assigned to assignee of the present invention, the contents of which are incorporated by reference herein. These devices, however, provide no remote video display or keyboard/mouse interface capabilities.

U.S. Pat. No. 5,153,886 to Tuttle discloses a visual display signal processing system and method used for regression testing of computer hardware and/or software applications. The system disclosed in Tuttle, however, relies upon connection to the internal video adapter circuitry and does not operate to interpret video raster signals generated by the video display adapter circuit. Furthermore, the system disclosed in Tuttle is intrusive since it requires a circuit card to be installed into a computer to be tested, and cannot be easily connected to a computing device using the existing standard interface connectors.

U.S. Pat. No. 5,084,875 to Weinberger et al. discloses a system for automatically monitoring copiers from a remote location and allowing operation of a copier from a remote location. Weinberger et al., however, does not disclose a system suitable for use in remote monitoring and control of a personal computer system or network, and further does not disclose a system which can monitor and forward video raster signals generated by a remote computer system.

U.S. Pat. No. 5,124,622 to Kawamura et al. discloses a system for remote diagnosis of a numerical apparatus. Again, however, Kawamura et al. does not disclose a system which can monitor and forward video raster signals generated by a remote computer system. Additionally, Kawamura et al. does not disclose a system for use in remote monitoring and control of a personal computer system or network.

U.S. Pat. No. 5,237,677 to Hirosawa et al. discloses a monitoring and controlling system and method for a data processing system in which report of a fault occurrence is automatically effectuated to a remotely located supervision/control system. Hirosawa et al., however, fails to disclose a system that can monitor the video raster signals generated by a remote data processing system.

SUMMARY OF THE INVENTION

The present invention permits a Remote PC to access and control a Host PC. The system includes a microprocessor controlled computer hardware device, (hereinafter referred to as a "Host Unit"), software programs operating on the Host PC, and software programs operating on the Remote PC.

The connection between a Host PC and Remote PC can be accomplished through either of two means. As a first means, a modem is connected to the Remote PC's serial interface port and a compatible modem is connected to a data interface port on the Host Unit. On this basis, a Remote PC could communicate with a Host site via a standard telephone line linkage between the two modems. This means is hereinafter referred to as a "Modem Linkage".

As a second means, a remote PC could be connected by a dedicated cable from a data transfer port of the PC (e.g. a serial or parallel port) directly to a data interface port on the Host Unit. This means is hereinafter referred to as a "Direct Line Linkage". The Direct Line Linkage means supports greater data transfer rates than the Modem Linkage means and the Direct Line Linkage means avoids the need to use modems. However, the Direct Line Linkage means does not provide the same flexibility for off site remote access to a Host Unit as does the Modem Linkage means.

The Host Unit contains it's own microprocessor (or other computing circuitry) designed to capture, interpret and store information displayed on a Host PC's VDM screen from the video raster signal output of the Host PC's VDAC (i.e. a video raster signal is that video output signal of a VDAC which serves as direct input into a VDM). VDM screen data collected in this manner permits a Remote user to access, obtain, view, and store Host PC current and previous VDM screen data on a Remote PC after linking the Remote PC to the Host Unit. VDM screen data captured, interpreted and stored by a Host Unit from the Host PC's VDAC raster output may be either text or graphics (i.e. image) based and may be in either color or monochrome. Host VDAC video raster signal output display formats captured and interpreted by a Host Unit include monochrome, CGA, EGA, and VGA modes, which are known to persons familiar with the trade, and similar techniques could be used for any display format.

In addition, the invention permits a Remote PC to (1) physically redirect keyboard and/or mouse control from a keyboard and/or mouse connected to a Host PC at the Host Site to the keyboard and/or mouse connected to the Remote PC, thereby allowing the Remote PC to fully control keyboard and/or mouse input to the Host PC, (2) remotely initiate software programs installed on a Host PC necessary to transfer files and data between the Host PC and Remote PC, (3) interconnect (i.e. daisy chain) multiple Host Units together so as to allow a Remote PC to switch between different Host PC's during a single access session, and (4) cold boot a Host PC, when necessary by instructing the Host Unit to temporarily cut the AC power to the Host PC forcing it to perform a cold boot.

One embodiment of the present invention comprises (1) software installed on the Remote PC that permits the Remote PC to utilize a standard modem such as, for example, a Hayes 9600 baud Ultra modem, Hayes 2400 Smart modem or Boca 14.4 for Modem Linkage, or a direct cable connection for Direct Line Linkage, to remotely access a Host Unit, thereby allowing the Remote PC to communicate with the Host Unit and access/control a Host PC attached to the Host Unit; (2) a Host Unit, which is either (a) directly attached to a modem or remote PC or (b) connected to a Remote PC via another Host Unit (i.e daisy chained) and is directly connected to the keyboard input, optional mouse input, VDAC raster output and AC power input interfaces of the Host PC; (3) software program files installed on the Host PC that may be activated remotely to facilitate file transfers between the Host and Remote PCs and (4) software programs run on the Host PC during installation to permit the Host Unit attached to the Host PC to automatically train itself how to decode the specific video raster output signals from the Host PC's VDAC.

Software installed on the Remote PC permits (1) accessing a Host PC site in either a Modem Linkage or Direct Line Linkage mode, (2) initializing a modem attached to the Remote PC (including baud rate, and initialization strings) necessary for a Modem Linkage mode, (3) maintaining a list of Host Units that may be accessed from the Remote PC (including the dialing information needed to call the Host modem that is used to access each Host Unit (when in a Modem Linkage mode), the ID number for each Host Unit, and the password needed to access each Host Unit), (4) completing a Modem or Direct Line Linkage from the Remote PC to a designated Host Unit, (5) displaying status information relating to a active connection on the Remote PC's VDM screen, (6) scanning the Host PC's VDM screen display history transferred from the Host Unit and stored on a mass storage device on the Remote PC, (7) setting the specific procedure to be used by the active Host Unit to capture Host PC VDAC video raster output (i.e. text modes, graphic modes, etc. in either monochrome or color), (8) switching the Remote PC's keyboard and/or mouse from use as a normal Remote keyboard and/or mouse to use as the keyboard and/or mouse for the Host PC, (9) accessing a Host PC for purposes of viewing a Host PC's VDM activity without switching the Host PC's keyboard and/or mouse to the Remote PC's keyboard and/or mouse, (10) switching the keyboard and/or mouse back from use as Host PC keyboard/mouse to use as a Remote keyboard/mouse, (11) initiating and controlling the transfer of data files between the Host and Remote PC, (12) communicating with the Host Unit using either standard telephone lines and modem communication protocols, when in a Modem Linkage mode, or a direct dedicated line, when in a Direct Line Linkage mode, (13) switching the Remote PC's VDM screen from a normal (i.e. Remote) VDM screen mode to a Host screen mode where a Host PC's VDAC output data is captured (without Host PC CPU support) and transmitted by the Host Unit to the Remote PC and is displayed on the Remote PC's VDM screen in place of the normal Remote PC's VDM screen display, (14) switching the Remote PC's VDM screen back from a Host PC video display to use as a Remote PC video display, (15) notifying the Host Unit to temporarily cut AC power input to the Host PC thereby forcing the Host PC to re-start, which is commonly referred to in the trade as a "cold-boot," (16) switching between Host Units and the Host Unit's associated Host PC in cases where more than Host Unit is interconnected, (17) changing a Host Unit's permanent or temporary password used by Remote PC's to access the Host Unit so as to prevent the unauthorized access of a Remote user to a Host PC, (18) terminating a Modem Linkage or Direct Line Linkage to a Host, (19) initiating a connection to another site, as required, (20) storing procedures necessary to train a Host Unit to decode a particular Host PC's VDAC video raster output signal, so that such procedures can be reloaded by a Remote PC into the Host PC's memory to facilitate using one Host Unit to access more than one Host PC without the need to repeat on-site training, and (21) exiting Remote PC application processing when there is no longer a need to access Host PCs.

A Host Unit can connect (via cable and adapters) to a Host PC and is capable of (1) verifying a remote user's password entered to access the Host Unit, so that access to the Host PC will be denied in cases where an invalid password is received; (2) permitting a Remote PC to optionally take over the Host PC's keyboard and/or mouse by ignoring any input from the Host PC keyboard and/or mouse and accepting only keyboard and/or mouse input from the Remote PC's keyboard received through a Modem Linkage or Direct Line Linkage; (3) permitting a user located at a Host site to take back control of a Host PC's keyboard and/or mouse by depressing a momentary switch button on the Host Unit; (4) passing though the Host PC's keyboard and/or mouse input signals to the Host PC via input and output keyboard and/or mouse connectors on the Host Unit; (5) intercepting, storing, analyzing, decoding and then passing through the Host PC's VDAC video raster signal to the Host PC's VDM screen display via input and output video connectors on the Host Unit, even in cases where a Remote PC is not accessing the Host unit; (6) decoding the Host PC's VDAC video raster output signals to either text or bit-mapped graphics format; (7) identifying and storing, as necessary, VDAC data that has changed between each VDAC refresh cycle; (8) compressing, transmitting and storing the changes in text or graphics data decoded from the VDAC raster output signal of the Host PC to a Remote PC; (9) supplying input/output interface cable receptacles to permit Host Units to be daisy chained with each other so as to allow a Remote PC to switch between, and remotely control, multiple Host PC's over a single phone line and modem during a single phone call; (10) supplying AC power to the Host PC, through an AC output connector, so as to permit the Host Unit, when desired, to temporarily cut power to a Host PC forcing the Host PC to reboot.

VDAC video raster output signals from a Host PC's VDAC circuits may vary from PC to PC (or adapter circuit to adapter circuit) making it impossible to utilize a standard process to decode the signal. During installation of the Host Unit, software supplied with the apparatus may be activated on the Host PC to train the Host Unit to properly decode the text mode VDAC video raster output of the Host PC. During this one time training process, predetermined text and character strings are displayed using software supplied with the Host Unit via the Host PC's VDAC. The resulting video raster output signal of the PC's VDAC is then analyzed by the Host Unit's processors to determine the exact procedures needed to convert the VDAC raster output signals to known text data or graphics pixel data displayed during the training process. The results of this training process yields the specific procedures and data needed to decode and capture text data or graphics pixel data from the VDAC output of a specific PC. Such procedures and data are stored in non-volatile RAM contained in the Host Unit, so that the training process for a specific Host PC need not be repeated unless the Host PC's VDAC is changed. This training process permits the Host Unit to interface with any of the PC monochrome or color VDAC standards, such as CGA, EGA, or VGA familiar to persons in the trade. On request by a Remote PC said training procedures needed to decode a given Host PC's VDAC signal may be copied to a file on a mass storage device connected to the Remote PC. This procedure would then permit the Remote PC to reset the decode procedure used by a Host Unit to support situations where a single Host Unit at a site is switched between different PC's by user's on site to facilitate remote diagnostics of a PC that has failed.

A less preferred embodiment of the present invention could be employed in which the video capture function of the Host Unit is accomplished by inserting an adapter card into one of the I/O buss adapter slots in the PC. This adapter card would have it's own microprocessor, or other processing circuitry, that would independently capture and store a PC's Basic Input Output System (BIOS) video data for transmission to the Host Unit over a cable interface from the adapter card to the Host Unit. There are several reasons why this embodiment of the present invention is less preferred:

A. Many PC's now operate in a graphics VDM screen mode as opposed to a text VDM screen mode where data is displayed through the PC's internal BIOS (Basic Input/Output System) by setting pixels on a VDM screen as opposed to sending standard character format data to the VDM screen. The Windows™ operating system developed by Microsoft Corporation is an example of a such a graphics user interface software operating system. In a graphics VDM screen mode numerous VDM standards exist that define number, placement and intensity options available for displaying graphics information on the VDM screen. Software drivers from the various PC application manufactures may modify or circumvent traditional BIOS functions to display data on the VDM screen. As the result, the process of decoding graphics information at this level is more diversified and subject to more change than the preferred embodiment of decoding the actual VDAC video raster output signal which conforms to a relatively fixed standard (i.e. the input to a VDM).

B. Some PC's have motherboards with "built-in" video circuitry on the motherboard, which may not permit the user to disable video processing and/or may not pass video data across the PC's buss.

C. Inserting an adapter card into a PC requires shutting off the PC's power then opening the PC to insert the adapter card. Such a procedure is not viewed as acceptable to the user as simply attaching interface cables from the Host Unit to the VDAC interface port on the PC. Moreover, opening the PC to install the adapter card would make it difficult and time consuming for unskilled personnel at an off-site location to setup a spare Host Unit on a failed Host PC for remote diagnostic and/or repair by a off-site maintenance operation.

D. The size of the PC adapter card must remain within fixed size limits. Such limits could constrain the level of functionality that could be incorporated into the card.

E. The I/O buss adapter slot, power, etc. within the Host PC could fail which would prevent the Host Unit from transferring any stored video data from the Host PC.

F. An additional adapter card is required, which may preclude users without an available buss adapter slot from installing the apparatus.

A second less preferred embodiment similar to that discussed above, could be used where a dual function video I/O adapter card could be engineered and inserted in a PC's I/O buss adapter slot in place of the PC's existing video I/O board. One function of this adapter card would be to provide video output to a VDM screen using standard video connector plugs. The other function of the adapter card would be capture the video BIOS data using additional circuitry on the I/O adapter card and transmit this data to a remote PC. In this case, the video adapter card would conform to standard, pre-defined video display options and thereby avoid the different drivers and display approaches taken by the various video adapter card manufacturers. There are several reasons why this preferred embodiment of the present invention is less preferred:

A. Inserting an I/O buss adapter card into a PC requires shutting off the PC's power and then opening the PC to insert the card. Such a procedure would not be as acceptable for the user as simply attaching interface cables from the Host Unit to the VDAC interface port on the PC. Moreover, opening the PC to install the adapter card would make it difficult and time consuming for unskilled personnel at an off site location to setup a spare Host Unit on a failed Host PC for remote diagnostic and/or repair by a off site maintenance operation.

B. Some PC's have motherboards with "built-in" video circuitry on the motherboard, which may not permit the user to disable video processing and/or may not pass video data across the PC's buss.

C. The size of the adapter card must remain within fixed size limits. Such limits could constrain the level of features that could be incorporated into an adapter card with dual functionality.

D. The I/O buss adapter slot, power, etc. in the Host PC could fail which would prevent the Host Unit from transferring any video data from the Host PC.

Other less preferred embodiments of the present invention could also be employed where one, several, or all of the remaining functions of the Host Unit could be placed on one or more adapter cards using an approach similar to that discussed above for other less preferred embodiments of the present invention. For example, a special adapter cable could be connected to the end of a keyboard cable's plug and plugged into an input jack of a keyboard interface adapter card. Then, another adapter cable could be plugged into a output jack of the keyboard interface adapter card and the other end of the cable plugged into the normal input keyboard plug on the PC. The keyboard adapter card would contain a microprocessor and circuitry designed to perform the keyboard processing function described above for the Host Unit. There are several reasons why this preferred embodiment of the present invention is less preferred:

A. The multiple interface boards would be more costly to design and would require the production of non-standard interface cables.

B. Some PC's have motherboards with "built-in" video circuitry on the motherboard, which may not permit the user to disable video processing and/or may not pass video data across the PC's buss.

C. Inserting an I/O buss adapter card into a PC requires shutting off the PC's power and then opening the PC to insert the card. Such a procedure would not be as acceptable for the user as simply attaching interface cables from the Host Unit to the various interface ports on the PC or on other Host Units. Moreover, opening the PC to install the adapter card would make it difficult and time consuming for unskilled personnel at an off site location to setup a spare Host Unit on a failed Host PC for remote diagnostic and/or repair by a off site maintenance operation.

D. The size of a adapter card must remain within strict size limits. Such limits could constrain the level of functionality that could be incorporated into the card.

E. Multiple adapter cards may be required, which may preclude users with insufficient available buss adapter slots from installing the apparatus.

F. The I/O buss adapter slot, power, etc. in the Host PC could fail which would prevent the functions now being performed by the Host Unit from being performed within the Host PC's adapter card(s).

From the above, it will be readily seen that one object of the present invention is to allow a user at a first location to view information displayed on a video display terminal, or monitor, of a data processing device at second location.

Yet another object of the present invention is to allow a user to view the information on the video display terminal even if the data processing device at the second location is locked up and no longer processing data or input commands.

A still further object of the present invention is to allow the user at the first location to give commands to the data processing device at the second location in such a manner that the data processing device perceives the commands as coming from a standard input device typically attached to the data processing device such as a keyboard or mouse.

Another object of the present invention is provide for the temporary interruption of AC power to the data processing device at the second location in response to a command from the user to force the data processing device to initiate a cold boot, or power on routine.

Yet another object of the present invention is provide a system and method in which video display information contained in a video raster signal output from a video display circuit of a data processing device is analyzed to determine the content of the signal and to convert the signal into a form suitable for transmission over a standard public telephone line or other communications network.

A still further objective of the present invention is to provide a system and method for training the apparatus to recognize different display formats that are used to transmit information from a video display circuit to a video display terminal or monitor.

BRIEF DESCRIPTION OF THE DRAWINGS

The drawings consist of 7 figures numbered 1 to 7. Figures that consist of more than one sheet contain a unique alphabetic suffix for each sheet. When a figure is referred to in it's entirety, the alphabetic suffix is omitted. A brief description of each figure is as follows:

FIG. 4A–4P–5 are engineering diagrams representing an overview of the internal circuitry of the Host Unit.

FIG. 5A–5I–2 are block diagrams describing the microprocessor based software operating system controlling processing occurring in the Host Unit.

FIG. 6A1–6D are block diagrams describing the process of training the Host Unit to recognize text for a specific PC.

FIG. 8–A1 to 8–B–2 illustrate the current protocol used to communicate between a Remote PC and a Host Unit.

The microfiche appendix, part 1 contains a detailed parts list of the parts presently included on the Host Unit's printed circuit board, cross-referenced to detailed electrical circuit schematics presently employed within the Host Unit, which are provided as part 2 of the microfiche appendix. Also, the microfiche appendix includes the detailed application and operating system software source code presently used for the apparatus.

DESCRIPTION OF THE PREFERRED EMBODIMENT

Figure 1:
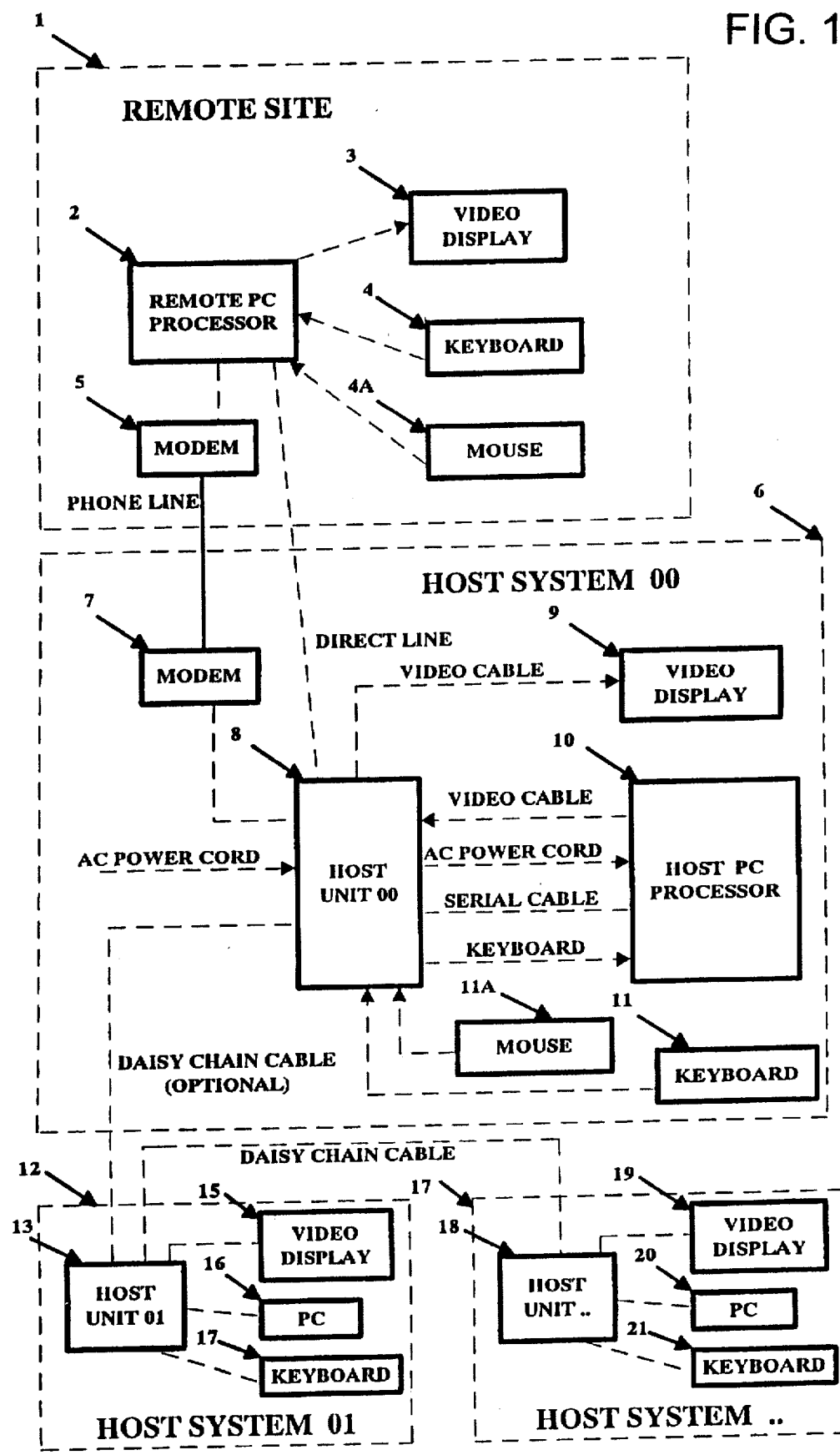
FIG. 1 is a functional overview of the invention.

FIG. 1 is a operational overview of the invention. Rectangular objects on this diagram represent physical (i.e. hardware) components of the apparatus. Dashed rectangular boxes represent groupings of related hardware components at different locations, dashed lines represent cables or cords, a solid line represents a communications interface (e.g. a telephone line or dedicated communications line), a arrow on the end of a line represents the direction that data or power flows and a line with no arrows indicates that data flows in both directions.

A PC located at a Remote Site 1 may be used to access a Host System 6. The Remote PC 2 may be equipped with a VDAC and monitor 3, a keyboard 4 and a Hayes compatible Modem 5 familiar to persons in the trade to access a remote site via a Modem Linkage. No modem is necessary to access a Host Unit in cases where a Direct Line Linkage is used instead of a Modem Linkage. A Mouse 4A may also be connected to the Remote PC.

Software installed in the Remote PC 2, permits the Remote PC to initiate a call via the Remote PC's Modem 5 to a Host Site's Modem 7 over a standard phone line or to make a direct linkage via a dedicated Direct Line Linkage. The apparatus currently supports up to 19.2 kb data transfer rates between a Remote PC 1 and Host System 6 or between a Host Unit 8 and another Host Unit 13 or 18, but the speed of data transfer could be higher or lower and still fulfil the objects of the invention.

Host Units 8, 13, 18 may be daisy chained together to permit a Remote PC to switch between Host Units during a single access session. A group of Host Units connected together on a single daisy chain is herein referred to as a "Host Site." Software provided with the apparatus permits a Remote PC to access more than one Host Site, but, presently, access to one Host site must be terminated before a different Host site may be accessed.

Host Units 8, 13, 18 are identified by a unique number set by DIP switches located in each Host Unit. There are a total of six DIP switches in a Host Unit available to set a specific Host Unit ID number, so the Host Unit ID may be set by a user to yield a decimal number between 00–63 depending on the positions of the switches. Of course, additional switches could be provided to allow for addressing of a greater number of Host Units. Presently, Host Unit 00 8 must be connected to the Modem interface 7 via a modem cable from "Data In" 70 (shown in FIG. 3) receptacle of the Host Unit to the serial interface receptacle on the modem or must have a Direct Line Linkage via a dedicated cable from the "Data In" 70 (FIG. 3) receptacle of the Host Unit to a serial interface port on the Remote PC. An RJ-12 cable with serial port interface cable adapters can be used for either purpose. Although any suitable cable could be used, the RJ-12 cable has six conductors, two of which are available for serial communications. Other Host Units may then be connected in a Daisy Chain fashion using a cable from the "Data Out" 71 (FIG. 3) receptacle on the last Host Unit in the Daisy Chain 13 to the "Data In" 70 (FIG. 3) of the newly connected Host Unit 18. Host Units connected together in a daisy chain presently use R J-12 cable for the connection from Host Unit to Host Unit, but any cable could be used with the appropriate conductors therein. In order for a Remote PC to communicate with a specific Host Unit on a daisy chain, each Host Unit must have a unique ID number assigned from 01 to 63. All data packets sent from the Remote PC to a particular Host Unit on a daisy chain use the Host Unit ID to address the transmitted data packet to a specific Host Unit number for a response. Presently, a Remote PC may only access one Host Unit at a time, but may switch been Host Units during a single active communications session.

A Host Unit 8 receives it's power from an AC electrical power source via an AC power cord connected to an "AC Power" 61 (FIG. 3) receptacle on the Host Unit. The Host Unit also supplies AC power to the Host PC 10 to which it is connected through an AC power cord going from the "AC To PC" 62 (FIG. 3) receptacle on the Host Unit to the AC power supply input on the Host PC. By supplying power to the Host PC in this manner, AC power to the Host PC may be temporarily cut by the Host Unit when instructed by a remote user's Remote PC to force a locked-up Host PC to cold-boot, so that normal Host PC processing can be restored remotely. This "cold-boot" procedure is particularly useful when the Host PC will no longer respond to any keyboard or other input. The Host PC is turned off and back on by the remote user, thereby reinitializing the Host PC's processing circuitry.

When a Host Unit 8 is first connected to a Host PC 10, the Host PC's keyboard 11 is disconnected from the keyboard input jack and plugged into a "Keyboard Input From KB" 68 (FIG. 3) receptacle on the Host Unit. Then, a Keyboard Cable supplied with the apparatus is plugged into the "Keyboard Output To PC" 69 (FIG. 3) receptacle on the Host Unit and the other end of this cable is plugged into the keyboard input jack on the Host PC. In this manner, the keyboard's signals go through Host Unit to the Host PC, which permits the Host Unit to interrupt Host keyboard signals and redirect keyboard input to utilize the Remote PC's keyboard instead of the Host PC's keyboard. Therefore, a Host PC need not have a Keyboard 11 present in order to facilitate Keyboard 4 data input and control of the Host PC by a Remote PC. With regard to the Remote PC's Keyboard 4, when the Remote PC 2 is accessing a Host Unit, the Remote PC's keyboard input is also captured by a software program running on the Remote PC supplied with the apparatus and redirected out of the Remote PC to the Host Unit 8 for input into the Host PC 10 via either a Modem (5 to 7) or Direct Line Linkage (2 to 8).

Similar to keyboard cabling, the Host PC's video cable from the Host PC's video display 9 (VDM) is disconnected from the Host PC's VDAC and plugged into either the Host Unit's 8 15 pin "VGA Out" 64 (FIG. 3) or 9 pin "Video Out" 66 (FIG. 3) receptacle depending on the number of pins on the video cable's connector. Then, either the corresponding 9 pin or 15 pin video cable supplied with the apparatus is plugged into the appropriate 15 pin "VGA In" 65 (FIG. 3) or 9 pin "Video In" 67 (FIG. 3) receptacle on the Host Unit 8 and the other end of the video cable is plugged into the Host PC's video display 9 (VDAC). This configuration allows the Host PC's video display 9 (VDAC) output signals, including the video raster signals, to pass through the Host Unit 8, so that the Host Unit can access, scan and decode the signals into either bit image, or monochrome or color text data and also store the most recent data (up to the internal storage capacity of the Host Unit) for transmission to a Remote PC when requested.

A serial cable can be connected from one of the Host PC's communications ports to a "Serial" 72 (FIG. 3) receptacle on the Host Unit 8. This connection permits data file transfers to occur between a mass storage device on a Remote PC 2 and the Host PC 10. This connection also permits data from a Remote PC's Mouse 4A to be transmitted to the Host PC's serial port through the Host Unit's Serial 72 (FIG. 3) interface. Mouse input 4A from a Remote PC is captured by software running on the Remote PC (supplied with the apparatus) and redirected out of the Remote PC 2 to the Host Unit 8 for input into the Host PC 10.

When a Host Unit 8 is first connected to a Host PC 10, the Host PC's serial Mouse 11A (if present) is disconnected from the Host PC's serial port and plugged into a "Mouse" 73 (FIG. 3) receptacle on the Host Unit. This permits Mouse 11A signals to pass through Host Unit to the Host PC via the "Serial" 72 (FIG. 3) port interface on the Host Unit 8. This approach permits the Host Unit 8 to interrupt any Host PC Mouse 11A input signals and redirect mouse data input to utilize the Remote PC's Mouse 4A instead of the Host PC's Mouse 11A. On this basis, a Host PC need not have a Mouse 11A present in order to facilitate Mouse 4A data input and control of the Host PC by a Remote PC. A mouse interface could exist on any Host Unit on a daisy chain (e.g. Host Unit 01 13, Unit.. 18, etc.).

A microprocessor and software located in each Host Unit on a daisy chain 8, 13, 18 looks for communication data packets sent from a Remote PC addressed individually to the Host Unit's ID number. When received, codes contained in the data packet define the nature of a Remote PC's processing request. For example, a data packet may contain a code requesting the Host Unit to verify that a password contained in the packet is correct. If the password is correct, the Host Unit transmits a data packet back to the Remote PC with a code indicating the password had been verified. Otherwise, a data packet containing a code indicating that the password was incorrect is returned to the Remote PC. Similar data packet requests and responses would be sent over the communication line interfaces for other remaining functions of the system.

A second microprocessor, memory storage and software also exists in each Host Unit. The primary purpose of this microprocessor and related operating system software is to capture, decode, store and transmit individual Host PC VDAC data to a Remote PC. Although the most preferred embodiment of present invention contains two microprocessors to handle the video analysis and the communications with a remote PC, it is contemplated that these functions could be performed by a single microprocessor having sufficient computing power to conduct both operations. Notably, as microprocessor technology continues to evolve, it is possible that a single processor system could be developed, thereby increasing reliability and reducing costs.

Host System 01 12 and Host System.. 17 represent examples of how other Host Unit/Host PC configurations can be daisy chained at a site, so that one Modem or Direct Line Linkage could be used to permit a Remote PC to switch between multiple Host Units during a single communications session. The ".." in the "Unit.." and "Host System.." identifiers on FIG. 1 are used to indicate one or more additional Host Units may exist on the daisy chain. The maximum number of Host Units depends on the available number of bits used for each Host Unit address, and the most preferred embodiment supports up to 64 Host Units at any one Host Site. These other Host System configurations are connected to their respective Host PCs in the same manner as described above for Host Unit 00 8. More specifically, Host Unit 01 13 and Host Unit.. 18 are connected to video displays 15, 19; Host PCs 16, 20; and Keyboards 17, 21 using the same procedures described for Host Unit 00 8 above, except the last Host Unit in the daisy chain would not have a daisy chain cable connected to the Host Unit's "Data Out" 71 (FIG. 3) receptacle. Software installed on a Remote PC (provided with the apparatus) permits a Remote PC to access more than one Host Site, but access to one Host site must be ended before access to another Host site can begin (i.e. no more than one Host Site may be accessed at a time).

Figure 2:
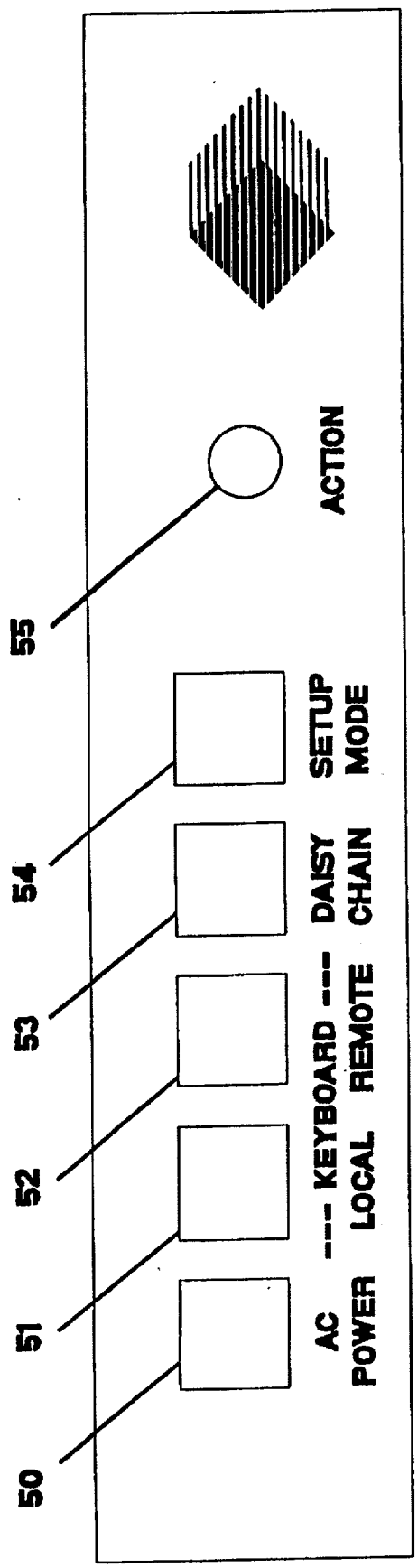
FIG. 2 is a front external view of the Host Unit.

FIG. 2 details a frontal view of a Host Unit. The front panel of the Host Unit includes five status indicator lights 50–54 and an "Action" momentary switch 55. All five indicator lights will be off until the ON/OFF power switch, located on the right rear side of the Host Unit is turned ON.

A detailed description of the purpose of each of the five indicator lights going from left to right is as follows:

AC Power 50—This light indicates that the Host Unit's on/off switch is in the "on" position and AC power is being received into the Host Unit.

Keyboard Local 51—This light indicates the keyboard/ mouse attached to the Host Unit is available for use.

Keyboard Remote 52—This light indicates a remote user is accessing the Host Unit. If the light is blinking, it means a remote user is in the process of connecting to the Host Unit or has been previously blocked by a Host PC user from taking over the keyboard. If the light is ON, it means a remote user has taken over the Host PC's keyboard and/or mouse.

Daisy Chain 53—This light presently blinks periodically indicating a remote user is currently connected to one of the Host Unit's on the daisy chain. If no remote user is accessing a Host Unit on the daisy chain, the light will be off.

Setup Mode 54—This light blinks during the initial training or re-configuration of the Host Unit to indicate the Host Unit is properly linked to the Host PC. This light also blinks when file transfers are occurring between a Remote PC and Host PC.

If someone is using a Host PC's keyboard and/or mouse when a Remote PC attempts to take over the Host PC, a user at a Host PC site may wish to retain control of the Host PC's keyboard and/or mouse by depressing the Action 55 momentary switch. Only one user can have control of the Host PC's keyboard and/or mouse at any point in time. In cases of conflict, the user at the Host site has the final authority to determine who controls the Host system's keyboard and/or mouse. Control may be passed back and forth by depressing the Action 55 momentary switch. Regardless of who has current control of the Host Unit's keyboard and/or mouse, a remote user will have the ability to view the Host PC's VDM screen remotely on their Remote PC after they have successfully connected to a Host Unit. Such VDM screen access can be prevented by a Host user by turning the Host Unit's ON/OFF switch OFF.

As previously mentioned, the Keyboard Remote 52 light on the front of the Host Unit indicates a remote user is accessing the Host Unit. If the light is blinking, it means a Remote PC is in the process of initially accessing the Host Unit or has been previously blocked by a Host PC user from taking over the Host PC's keyboard. If the light is ON, it means a remote user has taken over the Host PC's keyboard and/or mouse. When a remote user initially attempts to take over a Host PC, a brief audible alarm sound is generated from a speaker (not shown) within the Host Unit to further alert anyone present at the Host Site that the Host Unit's keyboard and/or mouse is about to be taken over by a Remote PC.

While the Keyboard Remote 52 light is flashing, another user at the Host PC may depress the Action 55 momentary switch on the front panel to prevent a Remote PC from taking over the Host PC's keyboard and/or mouse. If the Action 55 momentary switch is depressed for this purpose, the Keyboard Remote 52 light will continue to flash and the remote user will be prevented from taking over the Host PC's keyboard and/or mouse until either the Action 55 momentary switch is depressed again or the remote user disconnects and re-connects at a later time. If the remote user should disconnect from the Host Unit while the Keyboard Remote 52 indicator is flashing, the indicator will turn off automatically. When a remote user is blocked from accessing a Host Unit's keyboard and/or mouse, they will receive an alert message on their VDM screen (connected to the Remote PC) during the connection process. Even if a Remote user is prevented from accessing the keyboard and/or mouse by persons present at the Host Unit, the remote user will still be able to monitor any VDM screen activity on the Host PC. Once a user has taken over a Host keyboard, the Keyboard Remote 52 indicator light will remain on. The remote user's privilege to continue to use the Host PC's keyboard and mouse can be revoked at any time by depressing the Action 55 momentary switch on the front of the Host Unit, which causes the Keyboard Remote indicator light to blink until the remote user disconnects from the Host Unit. When such an action is taken, the remote user will remain locked out until either the Action 55 momentary switch is depressed again or the remote user terminates the connection and reconnects at a later time.

In cases where a Remote User desires access to a Host Unit in a manner that would not be readily detectable by anyone using the Host PC (hereinafter referred to as a "stealth mode"), the embodiment of the Host Unit could only include AC Power 50 and Setup Mode 54 lights and would not include the audible alarm. In such cases, the Remote user would access the Host Unit in a "view only" mode, as more fully described below in the narrative supporting FIG. 5B. This embodiment would be used, for example, in cases where an employer desired to remotely, discreetly, monitor employee use of an employer's Host PC.

Figure 3:
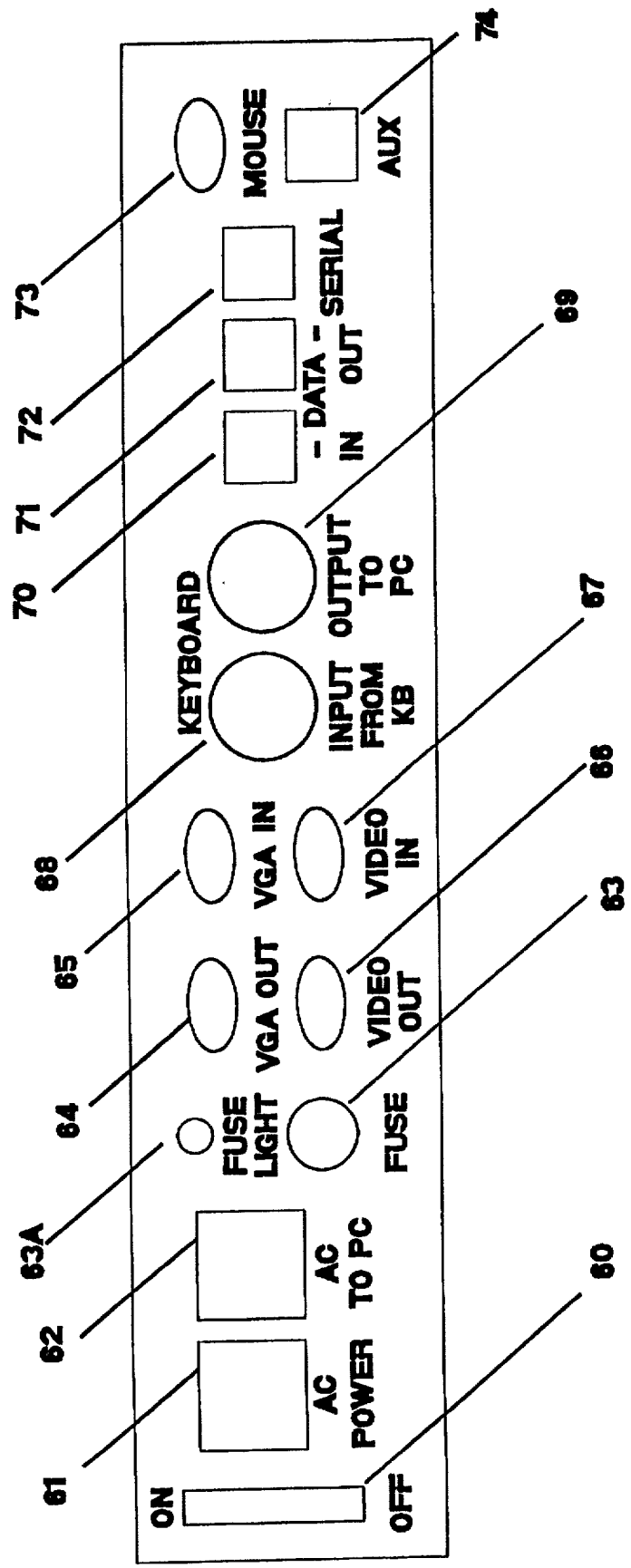
FIG. 3 is a rear external view of the Host Unit.

FIG. 3 details the present rear view of the Host Unit. A variety of alternative interface cables, adapters and connectors could have been used to connect the Host Unit to the Host PC, modem (Modem Linkage mode), Remote PC (Direct Line Linkage mode), and/or another Host Unit on a daisy chain. For example, the R J-12 receptacle presently used to connect the Host Unit's serial output to the Host PC's serial input could have used a 25 pin female receptacle and a parallel interface cable from the Host Unit to one of the parallel ports on the Host PC. As a second example, standard serial cables and serial receptacles could have been used in place of the RJ-12 receptacles to connect the Host Unit to a modem/Remote PC and to connect Host Units together on a daisy chain. Such alternative cabling, connector and receptacle approaches are known to persons familiar with the trade and do not materially affect the functioning of the apparatus.

The rear panel of the Host Unit presently contains the AC power receptacles, various RJ-12 data transfer linkage jacks, various video interface receptacles, keyboard interface ports, optional mouse interface ports and user replaceable fuse with a fuse blown indicator light. A detailed description of each item on the back panel going from left to right is as follows:

ON/OFF Switch 60—The ON/OFF power switch 60 is used to turn off AC power input into the Host Unit. Turning this switch ON or OFF controls only power flowing to the internal circuitry of the Host Unit and has no effect on AC power flowing to the Host PC.

AC Power 61—The female end of the AC power cord used that is normally used by the Host PC to obtain AC power is plugged into this receptacle and the other three-prong male end of the cord is plugged into a source for AC power such as a public utility wall outlet or a battery backup system. This cord would then carry AC power into the Host Unit.

AC To PC 62—One end of the AC power cord supplied with the apparatus is plugged into this receptacle and the other end of the power cord is plugged into the AC power input of the Host PC, so that the Host PC depends on the Host Unit for it's AC power. This approach permits the Host Unit to satisfy a request to cold-boot the Host PC by temporarily cutting off AC power to the Host PC. The power can be interrupted for any suitable time to allow the Host PC to properly re-boot, for example from approximately 1 to 30 seconds. In the preferred embodiment this time is approximately 15 seconds.

Fuse 63—The system employs a user replaceable 5 amp/ 250 volt fuse on the rear panel with an indicator light which lights when the fuse is blown. When the fuse is blown power to the Host PC will be terminated.

Fuse Light 63A—When AC power is applied to the Host Unit and the Fuse 63 is blown, this indicator light will be ON.

VGA Out 64—For Host PC's with a VGA graphics VDAC, the 15 pin connector from the end of the Host PC's VDM cable is plugged into this receptacle. This receptacle permits the signal received from Host PC's VDAC through the VGA In 65 receptacle to be passed out to the Host PC's VDM.

VGA In 65—For Host PC's with a VGA mode VDAC, one end of the 15 pin male to male VGA video interface cable (supplied as part of the apparatus) is plugged into this receptacle and the other end of the cable is plugged into the Host PC's VDAC receptacle. This cable interface permits the Host Unit to capture the video output signal from the Host PC's VDAC and pass the signal out through the VGA Out 64 receptacle to the Host PC's VDM.

Video Out 66—For Host PC's with other than a VGA graphics card, the 9 pin connector from the end of the Host PC's video monitor cable is plugged into this receptacle. This receptacle permits the signal received from Host PC's VDAC through the Video In 67 receptacle to be passed out to the Host PC's VDM.

Video In 67—For Host PC's with other than VGA mode VDACs, the female end of the 9 pin female to male video interface cable (supplied as part of the apparatus) is plugged into this receptacle and the other male end of the cable is plugged into the Host PC's VDAC receptacle. This cable interface permits the Host Unit to capture the video output signal from the Host PC's VDAC and pass the signal out through the Video Out 66 receptacle to the Host PC's VDM.

Keyboard Input From KB 68—The Host PC's keyboard cable is plugged into the Keyboard Input From KB receptacle instead of into the PC's keyboard input receptacle. This permits the Host Unit to pass or block any Host keyboard input to the Host PC, as required.

Keyboard Output To PC 69—One end of the male to male keyboard interface cable (supplied as part of the apparatus) is plugged into this receptacle and the other end of the cable is plugged into the Host PC's keyboard input receptacle. This receptacle is used by the Host Unit to transfer keyboard input from either the Remote or the Host PC's keyboard to the Host PC.

Data In 70—One end of a telephone style RJ-12 (6 wire) cable (supplied as part of the apparatus) is plugged into this receptacle and the RJ-12 jack on the other end of the cable is connected to either the Data Out 71 jack of another Host Unit or to either (1) an external, stand alone, Hayes compatible modem for a Modem Linkage mode or (2) a Remote PC's data transfer interface port for a Direct Line Linkage mode. When a Host Unit is connected to another Host Unit via a daisy chain, at least one of the Host Units on a daisy chain must be connected to a modem (Modem linkage mode) or directly connected to a Remote PC (Direct Line Linkage mode). The modem connection can be accomplished by plugging the open end of the telephone cable into the telephone jack-to-9 pin male adapter plug (supplied with the apparatus), and then plugging the 9 pin male adapter into the data interface receptacle on the modem. If the modem has other than a female 9 pin receptacle, then gender changers and/or 9 pin to 25 pin adapters (available for the apparatus) must be used to complete the Unit-to-modem connection. The Remote PC Direct Line Linkage connection can be accomplished by plugging the open end of the telephone cable into the telephone jack-to-9 pin female adapter plug (supplied with the apparatus), and then plugging the female adapter into the data interface receptacle on the Remote PC. If the Remote PC has other than a male 9 pin data interface receptacle, then gender changers and/or 9 pin to 25 pin adapters (available for the apparatus) must be used to complete the Unit-to-Remote PC connection.

Data Out 71—One end of a telephone style RJ-12 (6 wire) cable (supplied as part of the apparatus) is plugged into this receptacle and the other end of the RJ-12 cable is plugged into the Data In 70 receptacle of another Host Unit. If this is the last Host Unit in a daisy chain, no cable would be plugged into this receptacle. When a Host Unit is connected to another Host Unit, at least one of the Host Units on a daisy chain must be connected to a modem for the Modem Linkage mode or to a Remote PC for the Direct Line Linkage mode (as described above for the Data In 70 receptacle); The Data In 70 and Data Out 71 receptacles are also used to transmit data packets between a selected Host Unit and a Remote PC.

Serial 72—One end of an RJ-12 cable supplied with the apparatus is plugged into this receptacle and the other end of the RJ-12 cable is plugged into a serial communications port on the Host PC using a RJ-12 to serial port adapter plug provided with the apparatus. Data file transfer between the Host PC and Remote PC occur through this Serial 72 receptacle. Presently, the apparatus uses serial data transfers but transfers are also possible through the Host PC's parallel port.

Mouse 73—The Host PC's serial mouse cable is plugged into the male Mouse receptacle 73 instead of into the PC's serial port. This permits the Host Unit to pass through or block any Host Mouse input to the Host PC, as required.

Aux 74—Auxiliary devices may be plugged into this receptacle, which is presently an RJ-12 jack, and this receptacle permits two way communications between the device and the Host Unit. Specific uses for this port are discussed later.

On the side of the Host Unit there are eight DIP switches (not shown). The left most 6 DIP switches indicate the Host Unit's ID number. When these 6 DIP switches are in the down position, the Host Unit is connected directly to a modem (Modem Linkage mode) or to a Remote PC (Direct Line Linkage mode). Otherwise, when the Host Unit is daisy chained through other Host Units, each Host Unit on the daisy chain must be assigned a unique DIP switch setting indicating an address from 1 to 63 by the user. On this basis, only a maximum of 64 Host Units can be daisy chained at a Host Site. As noted above, however, the number of DIP switches could be increased to allow additional units to be daisy chained together. The 6 DIP switch settings presently represent binary values reading from left to right. Accordingly, if only the left most DIP switch is set to the up position, the Host Unit's ID would be 1. If the left most two DIP switches were set to the up position, the Host Unit's ID would be 3, (i.e. 1+2) and so forth. In order to remotely access a Host Unit, the Host Unit ID number must be correctly defined on the remote PC's call table, as discussed below under the narrative for FIG. 7.

The seventh and eighth DIP switch are accessible to the Host Unit circuitry. The seventh DIP switch is not presently used. The eighth DIP switch is presently used for VGA VDAC's to indicate whether a monochrome (i.e. DIP switch in the UP position) or color (i.e. DIP switch in the DOWN position) VGA VDM is connected to the VGA OUT 64 receptacle of the Host Unit.

Figure 4A:
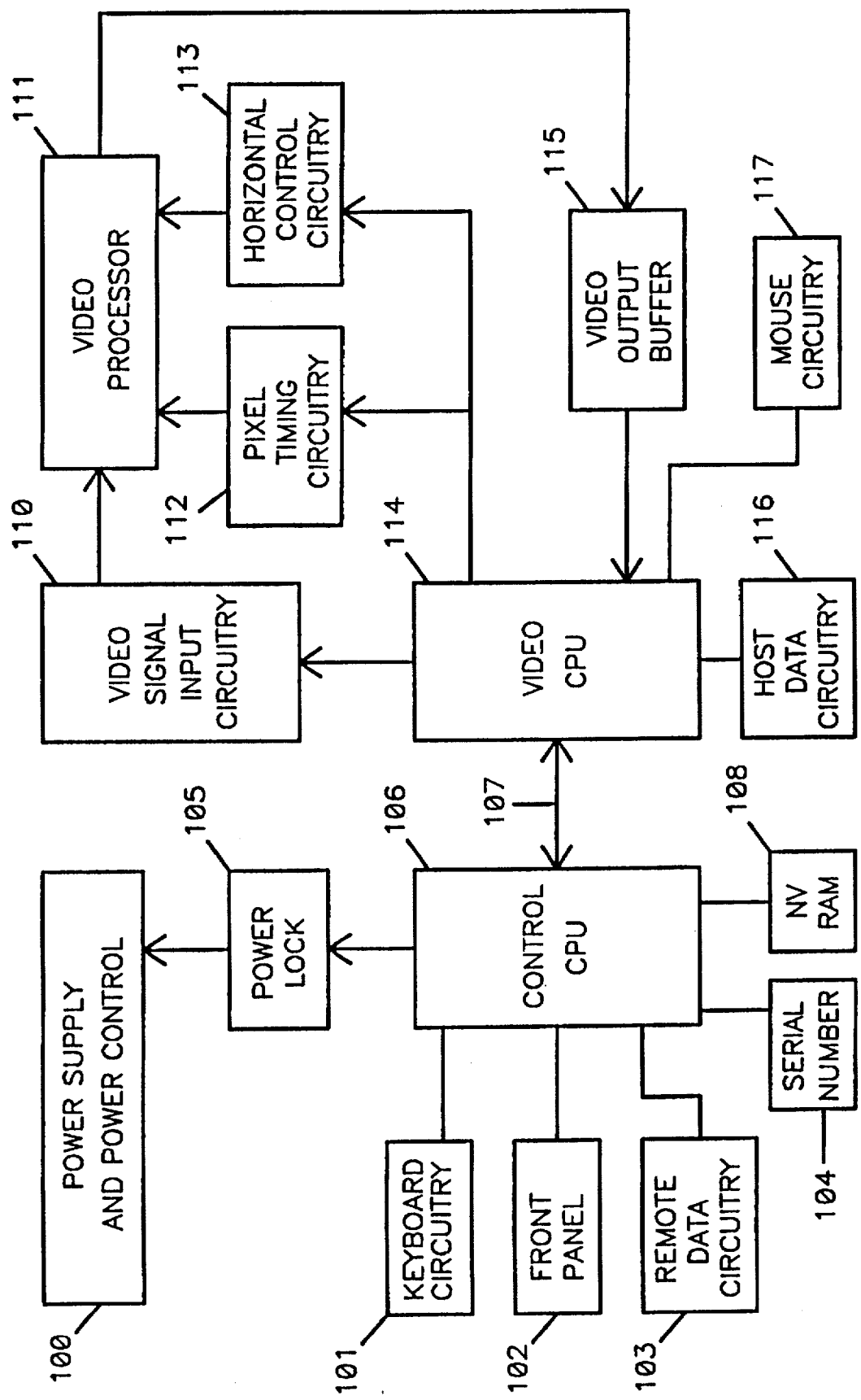

FIG. 4A through FIG. 4P illustrate general functional diagrams of the Host Unit's internal circuitry. A detailed list of specific electronic components presently installed in the Host Unit is contained in the microfiche appendix, part 1. Detailed circuit diagrams defining the specific internal circuit layouts for the present embodiment of the Host Unit is also contained in the microfiche appendix, part 2.

FIG. 4A depicts an overview of the Host Unit's circuitry. The unit contains a power supply 100, two microprocessors (CPUs) 106, 114, and associated circuitry.

The Video CPU 114 controls the video circuitry (i.e. blocks 110–113 and 115), interface to the Host PC's Data Circuitry 116, and interface to the Host PC's Mouse Circuitry 117. The Host Data 116 and Mouse Circuitry 117 interfaces between the Host Unit and Host PC occur using the Host PC's serial interface port. However, other Host PC data ports, such as a parallel interface port, could have been chosen for this purpose. The Host Data Circuitry 116 interface is used to accomplish file transfers between a Remote PC and a Host PC.

The software program source code for the apparatus is set forth in the microfiche appendix. Additional features of the invention discussed below that could be included in the software shown in the appendix by one of skill the art include mouse processing capability, Host PC screen history recordation, files transfers between a Host PC and Remote PC, password lockout protection, temporary password processing, training parameter up-loading and down-loading, internal modem operation, acoustical coupler operation, and AUX port operation.

The Control CPU 106 controls the Keyboard Circuitry 101, Host Unit Front Panel Circuitry 102 and Remote Data Circuitry 103. The Keyboard Circuitry 101 passes the Host PC's keyboard signals through to the Host PC or alternatively redirects all keyboard signals away from the Host PC's keyboard to a Remote PC's keyboard (via the Remote Data Circuitry 103) when requested by an authorized remote user. The front panel circuitry controls the indicator lights and action button located on the Host Unit's front panel (see FIG. 2) as well as the Host Unit's audible alarm. The Remote Data Circuitry 103 permits digital data to flow between the Host Unit and a Remote PC and/or other Host Units on a daisy-chain. This digital data could be transmitted using RS-232 serial communication signals familiar to persons in the trade. This digital data could include, for example, video display data being transmitted from a Host Unit to a Remote PC, Keyboard input data transmitted from the Remote PC to a Host Unit and modem setup strings. Also, the Control CPU 106 has access to the Host Unit's fixed serial number 104 and Non-Volatile (NV RAM) memory 108. NV RAM 108 is used to store the critical data needed to be saved in cases where AC power to the Host Unit is interrupted, such as, for example, the password(s) needed to access the Unit.

The Control CPU 106 and Video CPU 114 communicate with each other via a two-way data port 107.

Presently, the power supply 100 is a linear power supply with power transformer, bridge rectifier, filter capacitor, and two 7805 5 volt regulators. The power control circuitry controls AC power to the Host PC and in the present implementation is comprised of a 5 amp fuse, 5 amp relay and associated driver transistor. The driver transistor is controlled by a power lock circuit 105 that prevents inadvertent activation of this circuit, which would cause AC power to the Host PC to be temporarily interrupted.

The Keyboard Circuitry 101 interfaces to the Host PC and it's keyboard. Referring to FIG. 4B, the Host keyboard signals 122 are comprised of two primary lines: CLOCK and DATA which allow bi-directional communication between the keyboard and the Host PC 120. Symbols used on FIG. 4B to denote switches, number of lines, etc. are familiar to persons in the trade. When remote access is not occurring to a Host Unit (i.e. a normal local operating mode), the Host PC's keyboard signals are routed directly to the Host PC's keyboard input receptacle as shown in block 121. When in remote mode (i.e. a remote user has taken control of a Host PC's keyboard input), the Control CPU 106 causes the circuitry 121 to disconnect the Host PC's keyboard 120 and causes the Host PC to receive it's keyboard signals from the Control CPU via references 123, 124, 125. The two keyboard signals, Clock and Data, (nominally at 5 volts, pulled high via resistors) go through an I/O circuit 124 and 125 which separates them into Input and Output lines for each signal 126 and shown in more detail at block 127. This circuit contains an open collector gate 142 and a pull-up resister 141 (a nominal 2.2K value was used). This allows the Host Unit to emulate a keyboard signal. References 143 and 144 represent how the clock and data signals are split into input and output lines connected to the control CPU.

The Mouse circuitry 117 (FIG. 4A) is further detailed in block 131 on FIG. 4B. In local mode, the serial mouse signals 132, which could use an RS-232C protocol, are passed from the Mouse interface connector (see FIG. 3 at reference 73) directly through to the Host Unit's serial output (see FIG. 3 at reference 72) to the Host PC's serial data port 130, as shown. When in remote mode, the Host Unit's Video CPU 114 activates a switch so that only mouse input data received from the Remote PC 133 is passed through to the Host PC's serial port. In addition, this connection also serves another purpose. It allows data files to be transferred between the Host PC and Remote PC. The decision as to whether mouse data or data files are being transferred is determined by the software operating system on the Remote and/or Host PC's. The Host PC treats all serial input received as mouse data unless a special software program, provided as part of the apparatus, is activated on the Host PC (via Keyboard commands from the Remote PC) which will cause the Host PC to treat serial input data as data file transfers instead of mouse input data. When processing by this software program is complete, the Host PC will treat any subsequent serial input as mouse data.

Host units can be connected together as a daisy-chain using a dedicated cable to interconnect each Host Unit. A modem (or primary serial data line) connects to the Host Unit Data In receptacle of the Host Unit number 00 and the Data Out port of this Host Unit can then be connected to the Data In receptacle of another Host Unit, and so on as previously described in the narrative for FIG. 1.

The Control CPU 106 contains an 80C32 microprocessor, 32K of RAM memory and 32K of EPROM memory, but any microprocessor and any amount of memory could be used with the invention. The EPROM contains the operating system software for this CPU. Also, the Control CPU 106 has access to an 8 position dip-switch. As discussed above, this dip-switch determines the unit's identification number. This number, or address, is used to allow access to a particular Host Unit on a daisy-chain by a Remote PC, and addresses may be determined by the user. However, Host Unit number 00 is different and expects a Hayes compatible modem, or Direct Line Linkage to be connected to the Data In port (see FIG. 3 at reference 70).

Figure 4C:
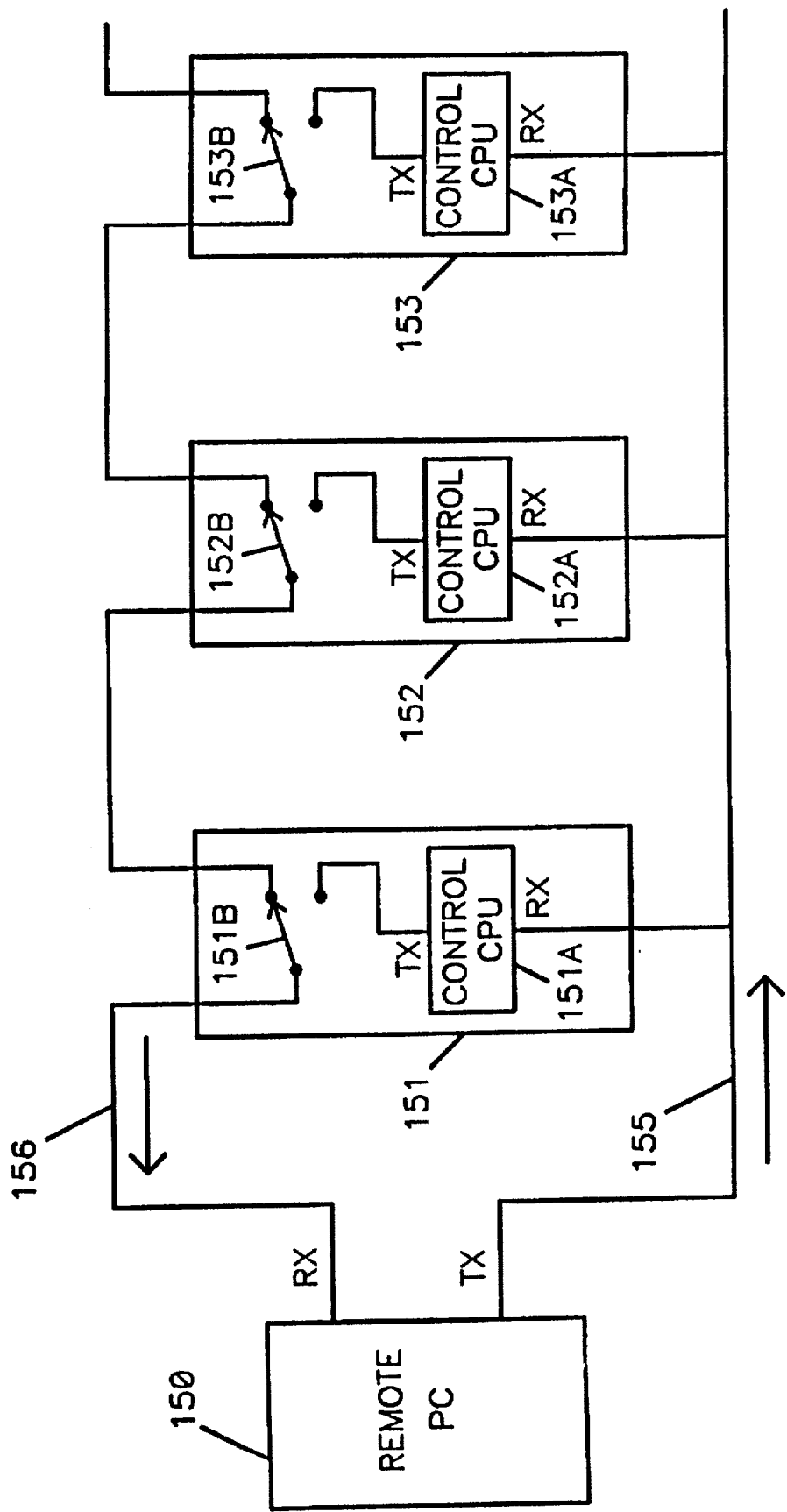

As shown in FIG. 4C, the Remote Data Circuitry 103 allows Host Unit access to occur. Data coming from the Remote PC 150, electrically passes through the Data In port to the Data Out ports of each Host Unit 151, 152, 153 on a daisy chain. The Control CPU 151A, 152A, 153A of each Host Unit receives any data passing through the daisy-chain from the Remote PC 150 on a Receive 155 line.

Data going from Host Units to a Remote PC is on a different transmission line 156 which is separate from the Receive 155 line. When no Host Unit on a daisy-chain is accessed none of the Host Units are electrically connected to the transmission 156 line. However, when a Remote PC accesses a Host Unit via the receive 155 line, that Host Unit electrically connects to the transmission 156 line through a relay 151B, 152B, 153B to facilitate two way communication between the Host Unit and a Remote PC.

AC Power to the Host PC is controlled by a power lock circuit 105 (FIG. 4A). This circuit insures that an intentional data transfer occurs before the power control circuitry 100 will briefly interrupt AC power to the Host PC. This "lock" circuitry requires that not only a specific series of values be written to it, but also at specific port addresses, and a separate bit value must be correct at the time of writing, before the Host Unit will permit AC power to the Host PC to be interrupted. This power lock circuit, as well as the video processing circuitry discussed below, both utilize a Cyclic Redundancy Check (CRC) function familiar to person of skill in the art for processing.

Figure 4D:
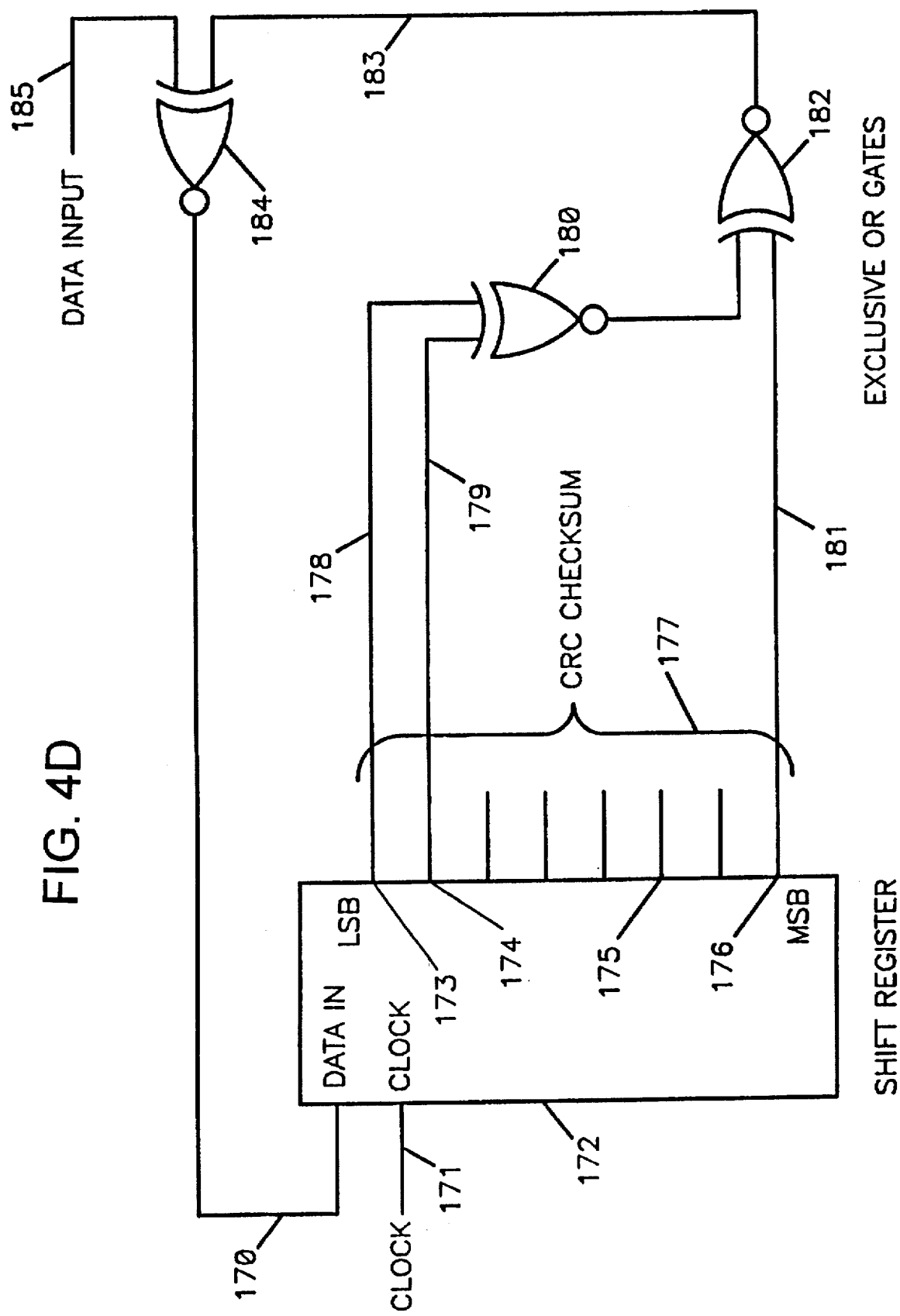

As shown in FIG. 4D, CRC is a common process used for generating pseudo-random numbers and reducing long streams of data to a smaller check sum quantity (1, 2, or more bytes). CRC is typically used for random number generation, bit stream identification and bit stream error detection.

The CRC process is based on shifting the parity, or single bit sum, of an input data signal 185 and selected bits 178, 179, 181 of a shift register output 177. Each time the shift register 172 is clocked 171, a new bit 170 is shifted into the shift register. EXCLUSIVE OR gates 180, 182, 184 generate the parity signal. After 8 clocks, the new value 177 will have no apparent relation to the previous value. If the input bit 185 is hard-wired to plus (or a logical 1), a long series of pseudo-random values can be generated. Rather than hard-wiring this input 185, gate 184 would normally be omitted and signal 183 would be connected to 170. The series generated will repeat every N clock cycles where N has a theoretical maximum of 256 for an 8 bit shift register and 65,536 for a 16 bit shift register. If a data stream is present 185, this will modify the pseudo-random series and produce a unique value at 177 which can be used to identify the data stream. Note that the particular bits 173, 174, 176 of the shift register output 174 selected for parity generation determines the pseudo-random series generated. That is, connections 178 and 179 can be connected to different bits of 177, such as the output bit referenced at 175 and/or more bits can be added with more EXCLUSIVE OR gates and the numbers generated will be different.

Figure 4E:
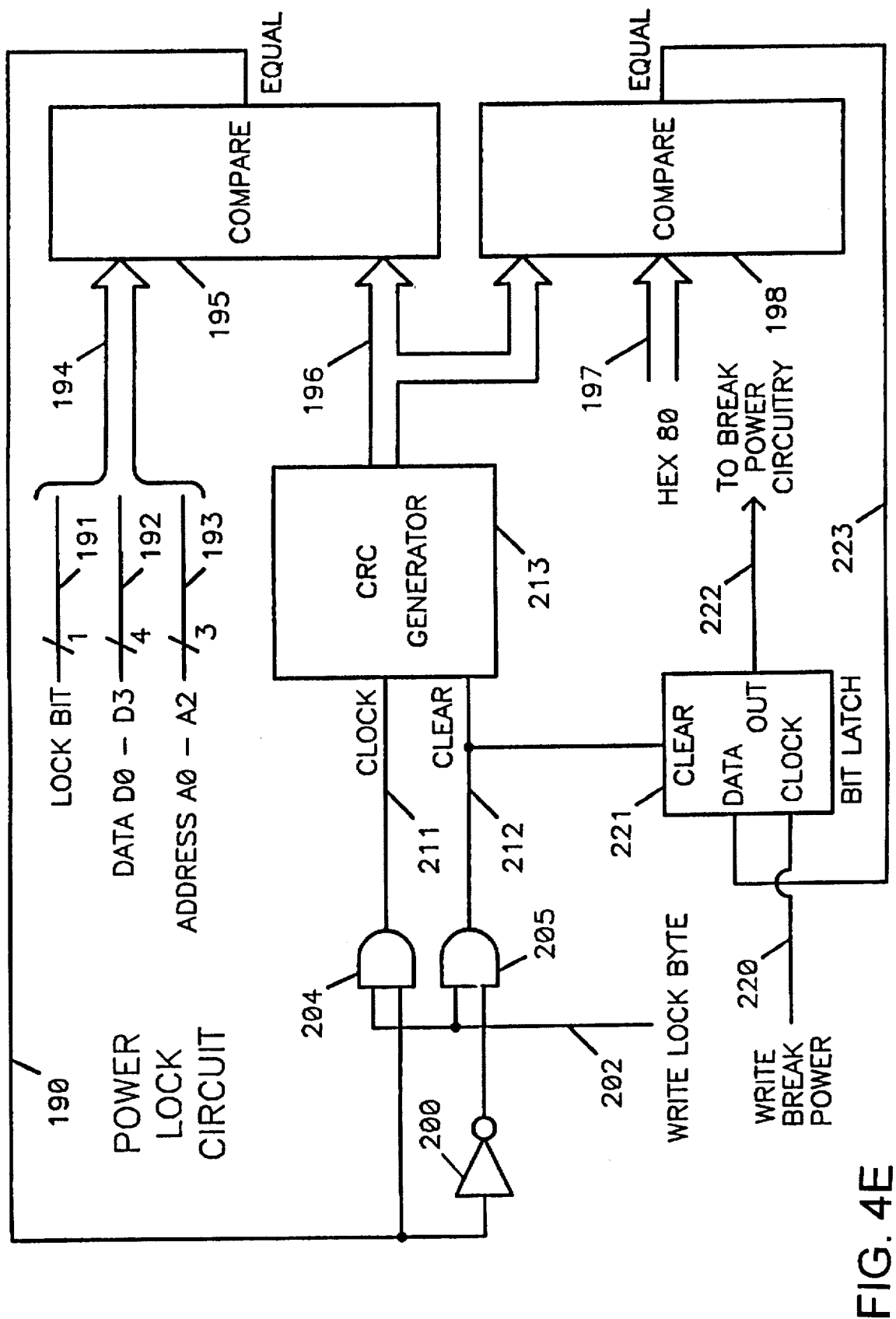

FIG. 4E shows a diagram of the power lock circuitry. The CRC generator 213 uses an 8 bit shift register and is similar to FIG. 4D with the data input 185 omitted and a clear input 212 is provided. This clear input will set the CRC value to zero. Power to the Host PC is terminated when bit latch output 222 is ON. To set this bit latch output 222, the Control CPU (in the present implementation.) generates a write pulse to the bit latch 221 when the digital signal 223 is a one (logical high). This signal 223 is a one (logical high) only when the CRC value 196 is compared via the compare circuitry 198 and is equal to the value 128 (hexadecimal 80) which is hard-wired 197 to this value. Signal 202 will clock the CRC generator 213 only when the compare output signal 190 is a one (logical high). Otherwise signal 202 will instead set the CRC value 196 to zero. This is accomplished by logic gates 200, 204, 205. When a CRC output 196 is compared with data input 194 via compare circuit 195, and is equal, then output 190 will be a one (logical high). Assuming the CRC value 196 is zero, then approximately 250 clock pulses 211 occur before the CRC value 196 will reach 128 (80 hexadecimal) during which time the CRC generator 213 will have produced approximately 250 unique CRC values 196. To produce these clock pulses 211 the value 194 must be equal to the current CRC value 196 for each write pulse 202. This data byte input 194 is composed of three sets of signals 191, 192, 193. The address lines 193 makes this port 194 appear as 8 output ports to the Control CPU 106 (FIG. 4A). Thus, the Control CPU must correctly set up the lock bit 191, and write (via pulsing at reference 202) a correct value 192 to the correct port 193 with the combination of these signals being equal to the current CRC 196 to clock 211 the CRC generator and get the next CRC value. This continues until the CRC value becomes 128 (80 hexadecimal) and then the Control CPU pulses 220. The choice of 191, 192, 192 ensures that the Host PC's AC power will not be interrupted inadvertently in the event of erroneous processing by the Control CPU.

The above circuit is employed in the most preferred embodiment of the present invention to ensure that power to the Host PC will not be interrupted unless commanded by a user. However, if such precautions are not warranted, a simpler power management circuit could be employed to, for example, reduce the overall cost of the system. This circuit could, for example, only require that the control CPU 106 receive a power interrupt command byte from the remote user. Other examples of less complex power management circuits will be readily apparent to those of skill in the art in light of the above discussion.

The Control CPU 106 has access to a serial number device 104. This provides a unique hardware serial number for the unit. The preferred embodiment of the present invention uses a DALLAS DS2401 part, which comes pre-programmed with a unique serial number. Of course, other suitable means could be employed to retain the hardware serial number for each Host Unit. Also, the Host Unit includes 2K of non-volatile RAM 108 for storage of the unit's password and video timing and CRC information peculiar to the Host PC's video hardware configuration, which are determined during a Host Unit training process discussed below in connection with FIGS. 6A to 6D.

In the preferred embodiment, the Video CPU 114 contains an 80C32 microprocessor, two banks of 32K by 8 bits of RAM memory (totalling 64K) and 32K of EPROM memory. This microprocessor, as well as the control microprocessor 106 discussed above, could be replaced by any suitable microprocessor (for example an 80286, 80386, 80486, 68000, 68010, etc.) and memory. The EPROM contains the operating system software for this CPU. An RS-232C serial port 116 is provided for file transfers or serial mouse data to the Host PC.

The portions of the Host Unit which deal with video processing employ a combined hardware / software approach. In this regard, discrete logic circuitry does some of the video processing and a microprocessor and associated operating software performs the remainder of the video processing. In the preferred embodiment, this was done to preserve flexibility in the video processing techniques. As will be readily apparent to those of skill in the art, other embodiments of the invention may dedicate more of this processing to discrete circuitry, to lessen demands placed on the processing software to increase processing performance, or more of this processing to software or hardware to enhance flexibility.

The Control CPU 106 and the Video CPU 114 communicate through a two-way communication port 107. As shown in FIG. 4F, the Control CPU 106 checks the write status 232 to see if the latch 234 is empty. If it is empty, the CPU presents a value 230 and toggles the write line 231. This will set the bit latch 236 and the status 232 will indicate that the latch 234 is full. The Video CPU 114 can then poll the read status 232 and, if it is set, read the value 233 by pulsing 235, which will reset the read status 232. The Video CPU 114 checks the write status 240 to see if the latch 245 is empty. If it is empty, then the Video CPU 114 presents a value 246 and toggles the write line 244. This will set the bit latch 243 and the status 240 will indicate that the latch 245 is full. The Control CPU 106 can then poll the read status 240 and, if it is set, read the value 242 by pulsing 241, which will reset the read status 240. The status signals 232 and 240 are both referenced as read and write status and their function depends on which CPU is polling the status signal.

As shown in FIG. 4A, the Video CPU 114 programs the video circuits 110, 112, 113 after which video signals, including video raster signals, coming from the Host PC VDAC (discussed in more detail in FIG. 4G) are processed by the Video Signal Input Circuitry 110 and the Video CPU 111. The resulting video data is written to the Video Output Buffer 115. In the preferred embodiment, this buffer is 32K by 16 bits, which is enough memory to hold one screen of 800 by 600 digitized graphics or more than one screen of text data. The Video Processor 111 writes to this Video Output Buffer 115, so that the data written to the buffer can be read by the Video CPU 114.

The video input enters from the Host PC's VDAC, through a video interface cable which is presently either a DB 9 pin receptacle (with TTL video signals) or a DB 15 pin receptacle (with analog video signals) located on the rear panel of the Host Unit (see FIG. 3 at references 65 or 67). For both of these receptacles, the horizontal and vertical syncs are TTL signals. When these video signals enter the Video Signal Input Circuitry 110, the circuitry selects sync polarity, TTL or analog mode, and a particular color signal. This signal is passed to the Video Processor 111.

Analog VGA display monitors can be either color or monochrome. As previously mentioned the eighth DIP switch in the Host Unit is presently used to indicate whether a monochrome (i.e. DIP switch in the UP position) or color (i.e. DIP switch in the DOWN position) VGA VDM is connected to the VGA OUT 64 receptacle of the Host Unit.

Analog (VGA) monochrome monitors generally display only the green signal. When the PC is reset, the VDAC will interrogate the three monitor identification signals coming from the VDM to determine the type of monitor that is connected (i.e monochrome or color). If a monochrome monitor is detected, the VDAC will add together the red, green, and blue color signals and output this one combined signal to all three color gun outputs. This gray scale summing is designed so that the same amount of brightness will be displayed in monochrome as would be displayed in color.

The three monitor identification signals appear on pins 4, 11, and 12 of the monitor's DB15 video connector. The Host Unit currently hardwires these signals so as to appear to the VDAC that a color monitor is always present (i.e. pins 4 and 11 grounded, pin 12 open), regardless if a monochrome or color VDM is connected to the VGA OUT 64 receptacle of the Host Unit. For simplicity, this enhancement to the Host Unit's circuitry is not reflected in the schematics contained in the microfiche appendix, part 2.

If a color monitor is connected to the Host Unit, the red, green, and blue signals simply pass through, and are displayed in color. When a monochrome display is attached, the Host Unit will apply gray scale summing and output this sum on the red, green, and blue signals going to the display monitor. This summing is not reflected in the microfiche appendix. The formula for gray scale summing is: 30% red+59% green+11% blue. This gray scale summing is independent of the Host Unit's video processing and affects only the video output to the monochrome monitor. The Host Unit could determine whether or not to apply this gray scale summing by examining the identification signals coming from the monitor, but in the current implementation, position 8 of the Dip Switch is used to indicate the type of VDM connected to the Host Unit.

Forcing the Host PC's VDAC to believe a color VDM is always connected permits the Host Unit, and remote users, to have access to color information, regardless of the monitor type connected to the Host PC via the Host Unit. In other words, this approach permits a remote user to view a Host PC's VDAC in color even in cases where a monochrome VDM is connected to the Host Unit. In addition, because Host Unit video output signals are buffered, the Host Unit need not have a VDM connected to the Host Unit. In cases where a remote user has a monochrome VDM connected to their Remote PC, the TVLINK.EXE software program (discussed later) will ignore any color attributes sent by the Host Unit for display purposes.

Figure 4G:
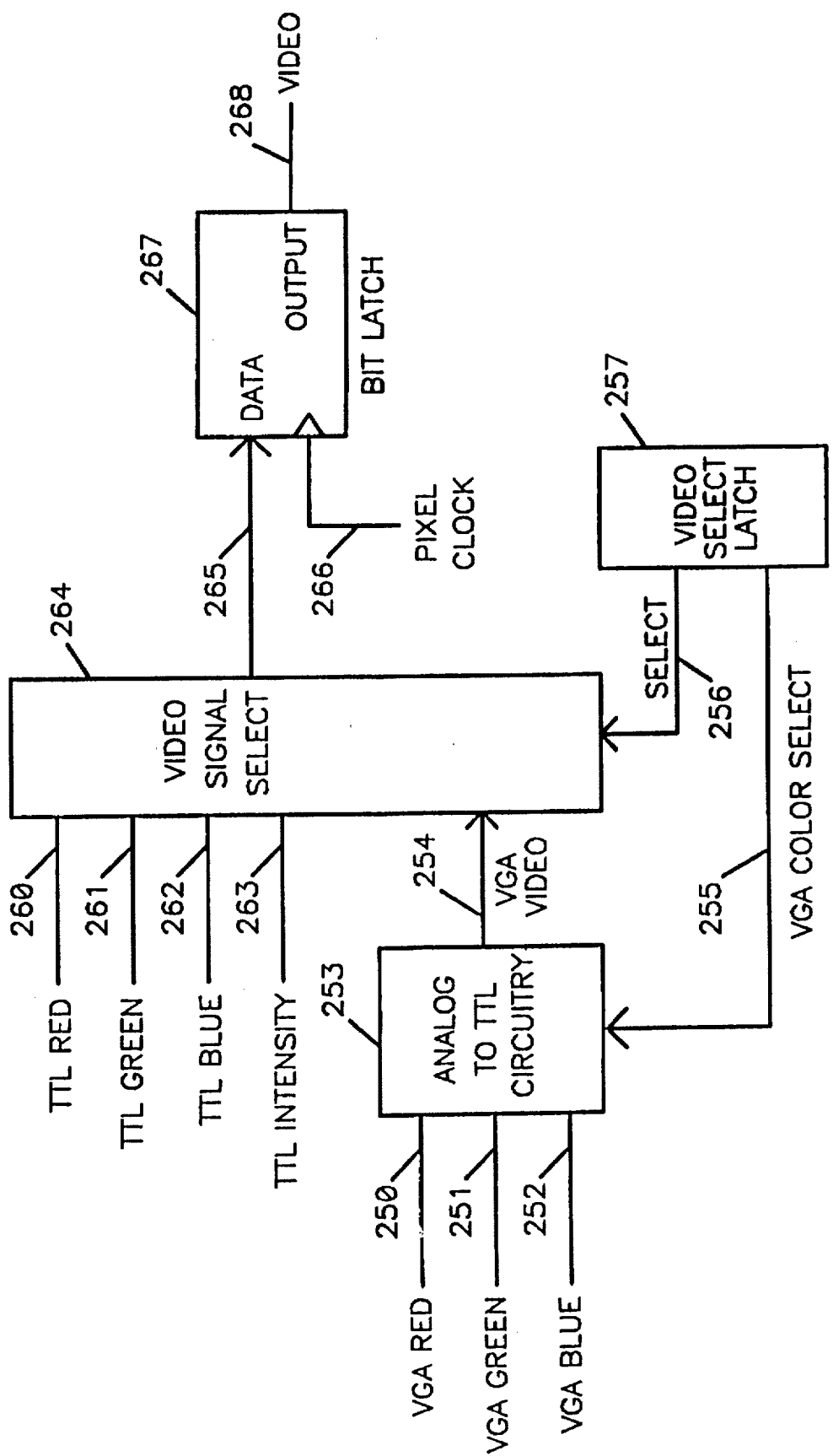

An overview of the color signal selection circuitry of the Video Signal Input Circuitry 110 is found in FIG. 4G. Video Select Latch 257 controls which color signal is selected. This latch is set by the Video CPU 114. Latch signals 256 control the multiplexer in the Video Signal Select 264 which selects one of the TTL signals red 260, green 261, blue 262, or intensity 263, or the converted analog signal 254 and presents this signal at 265 which will be clocked into the bit latch 267 for each pixel clock 266 and appear at the Bit Latch output 268. The VGA Color Select 255 signal causes the Analog to TTL Circuitry 253 to select a particular analog signal (i.e. red 250, green 251, or blue) 252, to be converted to a TTL output 254.

The most preferred embodiment of the invention presently provides for only one color signal to be processed per video raster scan cycle. Therefore, multiple scan cycles are required to derive color text information. Since approximately 60 scan cycles occur per second, color signals can be processed and decoded to achieve reasonable throughput of color text data to a Remote PC. Future embodiments could add circuitry and/or software to allow simultaneous processing of all color signals by, for example, pre-digitizing each color signal (using shift registers and latches, as described in FIG. 4K) and storing this data into a separate memory storage area before passing this information to the Video Processor 111 circuitry. This alternative approach would permit text and graphics color attributes to be more precise by avoiding potential discrepancies caused by processing multiple scan cycles where VDAC screen data changes between each cycle.

Figure 4H:
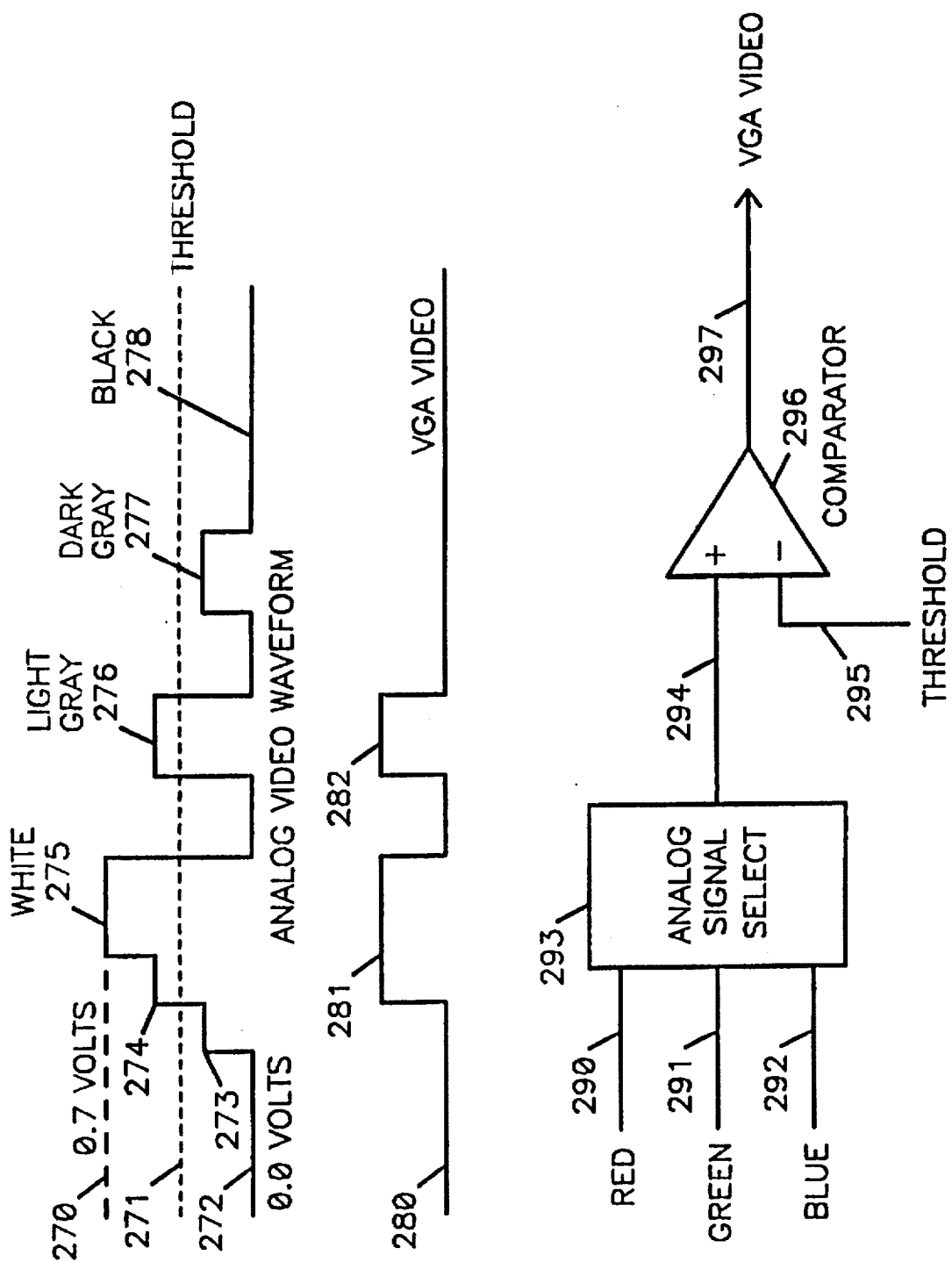

As shown in FIG. 4H, analog color signals vary from zero volts 272 for black 278 to approximately 0.7 volts 270 (into a 75 ohm load) for white 275. Light gray 276 and dark gray 277 are between these two limits. To be processed by the present video circuitry, this analog signal needs to be converted to a digital TTL signal. To accomplish this, a threshold level is set 271 so that color levels above this level 274, 275, 276 are converted to a LOGICAL 1 (high) signal 281. Color levels below the threshold such as 273, 277, 278, etc. will be converted to a LOGICAL 0 (low). The resulting VGA Video output signal 280 is depicted beginning at reference point 280 and is the output of the circuit as shown at reference point 297. Using this present approach, a foreground color of dark gray 277 on a background color of black 278 will not be discerned by the circuitry. Neither will a combinations of white 275 and light gray 276. Also, although white, gray, and black 275, 276, 277, 278 are referenced, the actual color depends on the color signal selected and will be either red, green, or blue. The analog color signals 290, 291, 292 are selected by an Analog Signal Select multiplexer 293 and presented to the positive input 294 of a comparator 296. The minus input 295 is fixed at a threshold value 271. The output of the circuit 297 is a TTL signal as illustrated beginning at reference point 280. The circuit could use, for example, an Analog Devices part AD9696 comparator.

The Video Processor handles both digitizing graphics and text mode character recognition. For processing purpose a "pixel" is equivalent to a "logical bit".

As shown in FIG. 41 block 300 depicts a VDM displaying six characters: "A", "B", "C", "D" and two characters from the extended ASCII character set, namely a solid block and a cross. As shown on FIG. 4J, the total video signal is composed of several parts: Vertical sync 340, horizontal sync 343, and color signal(s) 350 (illustrated as only one signal). Whereas color VDAC uses red, green, and blue signals, monochrome VDAC often use green and intensity signals only. As shown in FIG. 41, the visible portion of the VDM 302, where text and graphics appear, is only a subset of the total video signal. Block 310 shows a close-up view of the upper, top left corner of the entire VDM 301 which includes part of the left, top corner of the visible VDM 302.

As shown in FIG. 4J, the vertical sync signal 340 commands the monitor to go to the top of the screen 301, 313 and start scanning downward to the bottom of the screen. 304. The horizontal sync signal 343 commands the monitor to go to the left side of the screen 305, 325 and scan to the right side of the screen 303. The color signals create visible light on the VDM's screen in the form of text and/or graphics 302. Although 314 depicts the first visible horizontal scan line, there are horizontal scan lines above (see 301, 313, and 352) the first visible scan line 314. As shown in FIG. 4J, reference 345 illustrates the first visible horizontal scan line and reference 348 illustrates the last visible horizontal scan line. References 330 and 333 expands a single horizontal scan line 346. Although the first scan line 314 and the last scan line 315 for a character row represents 16 horizontal scan lines (typical for VGA text mode), some older monochrome VDAC only generate 8 horizontal scan lines as shown at reference 353 between references 345 and 346. Reference 334 shows the first character row's horizontal scan line 316 over the "C" character on FIG. 4I. Similarly, reference 336 represents scan line 316 over the "D". Reference 338 is the same scan line over the 80th character (not shown on FIG. 4I). Reference 347 represents the next horizontal scan line at 317. The horizontal sync pulse 330 starts the horizontal scan line 316. There is a delay 335, 325, 305 before the first visible horizontal pixel 324.

References 324, 322, 321, and 320 position the first pixel of each character of a given row. The 9th position 323 which is preset for VGA, Hercules, and other VDAC (not for early monochrome VDAC which is 8 by 8) is not taken into account. The pixel clock signal only captures the first 8 pixels of the character so that the digitized video ignores this pixel 323.

Figures 1, 2, 4I:
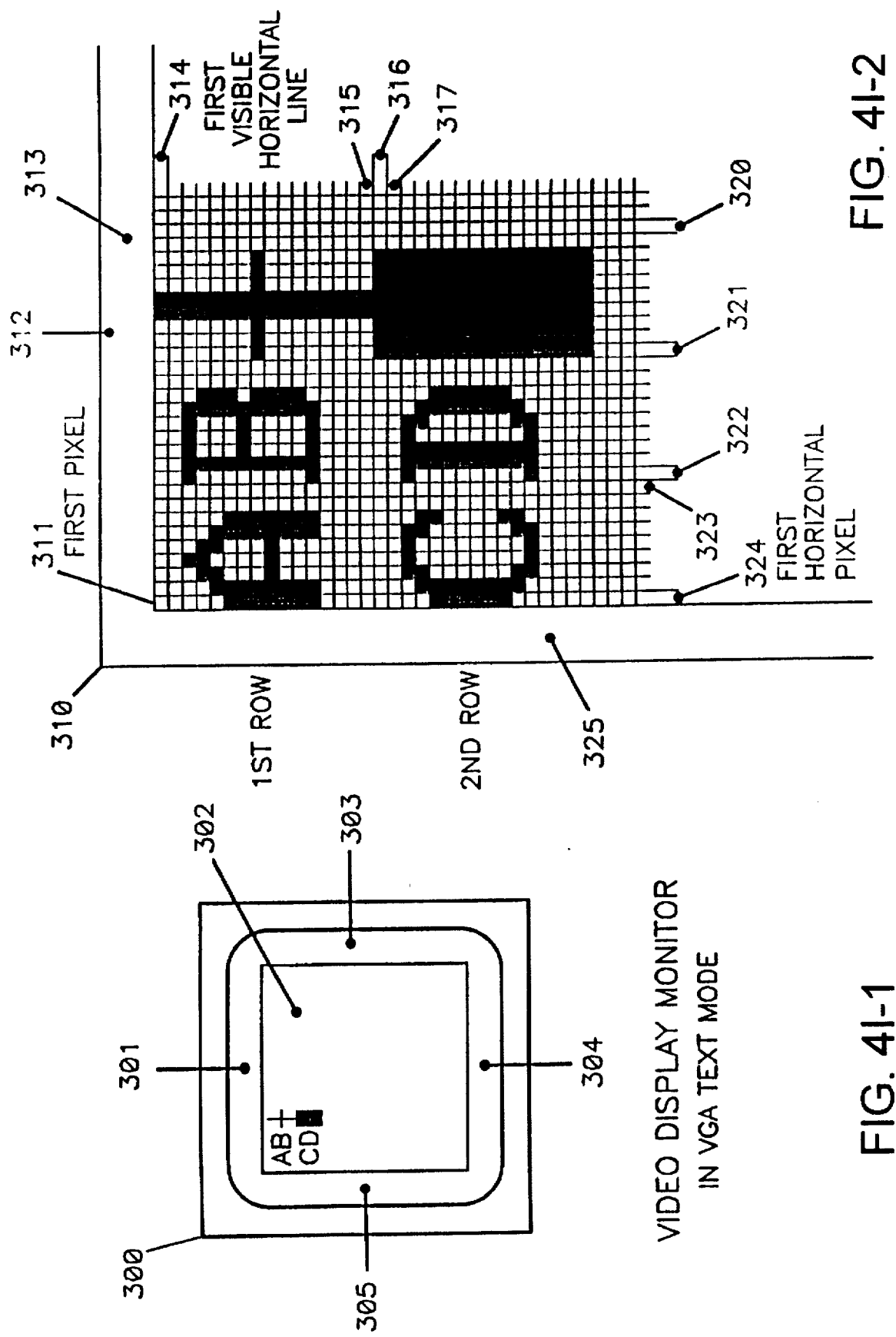

The first horizontal scan line (non-visible) 344 is depicted at reference 312 on FIG. 4I. The last visible scan line 348 completes a VDM's screen. Presently, VGA text mode has 350 visible horizontal scan lines, VGA graphics mode (640×480) has 480 scan lines, hi-res mode (800 by 600) has 600 scan lines, but the present system is capable of operating with any number of differing graphics modes and display lines.

After the horizontal sync pulse 330, and the left margin delay 305, 325, 335, the visible video occurs as illustrated at reference 337. A scan line for the first two characters is shown in FIG. 4K beginning at reference 360. The preferred embodiment of the Video Processor uses a 16 bit shift register and a 16 bit latch. FIG. 4K, however, only depicts an 8 bit latch and shift register for illustration purposes.

As an example of the process of digitizing video characters, assume each character is 8 pixels wide, as illustrated beginning at reference 365 and ending at reference 370. When digitized, these eight pixel values make up the eight bits of a byte used for further processing. After the 8th pixel 370, there is a 9th unused pixel labeled "X" (shown at reference 375). This 9th pixel occurs for VGA VDAC as well as some monochrome VDAC. Some VDAC do not have this pixel so that the last pixel of one character 370 is immediately followed by the first pixel of the next character 373.

Reference 361 shows an actual wave form from a horizontal scan line illustrated on the graph 390, as the last horizontal row at the base of the characters "L" and "M" ending with the pixel referenced at 394. Reference 364 shows the bottom line of the "L", reference 371 shows the left leg of the "M", and reference 374 shows the right leg of the "M".

The video pixel data 365 input 391 to the shift register 393 will appear at the first shift register output bit 395 after a clock pulse at 392. After 7 more clock pulses, the video pixel data 365 appears at the last shift register output bit 399. Thus, to digitize a character, each pixel data bit (e.g. 365) is shifted into a shift register 393 from Video signal input 391 via a Pixel Clock 362, 392. After the 8th pixel 370 is shifted into the shift register, the data is transferred into the Latch 398 via the Latch Clock 363, 372 at 396. After the data is latched, the output of the Latch 398 indicated at reference 397 is then stored into the Video Output Buffer 115 (FIG. 4A) for later retrieval by the Video CPU 114 (see FIG. 4A). For VDACs where the last pixel of one character 370 is followed immediately by the first pixel of the next character 373, then Latch Clock 372 occurs coincident with the first pixel of the next character.

Once in the Video Output Buffer 115 (FIG. 4A), the digitized video data can be transferred, through the Control CPU 106 (FIG. 4A) and out the Remote Data Circuitry 103 (FIG. 4A) to a Remote PC 2 (FIG. 1), which can then be directly displayed in graphics mode. Although presently supported, this transfer requires sixteen bytes per character which slows down the transfer of screen data to a Remote PC. In cases where a Host PC VDAC is in a text mode, screen transmission times can be cut dramatically by converting a character's 16 byte packet into a one byte character code, such as used by the ASCII coding scheme, and transmitting only the one byte code instead. Depending on the particular VDAC, characters can use 8, 9, 14, or 16 horizontal scan lines or byte packets, all of which are handled by the Host Unit's circuitry. For illustration purposes, 16 horizontal scan lines (presently used by VGA VDAC) has been selected for further discussion.

The conversion from pixel data to characters requires some kind of character recognition of which several approaches are possible. The first approach is to take the digitized video and search a look-up table for a match of this character's 16 byte packet, which represents the re-organized pixel data which corresponds to a single character. The relative position in this table would then yield the character code, such as used by the ASCII coding scheme, associated with the desired character. This method is less preferred because the particular shapes of characters vary among different VDACs and the look up table would require excessive storage of character set mappings. Furthermore, the table would have to be updated to handle new character sets or character format changes.

A second approach would be to process the digitized video data by certain algorithms which directly infer (or recognize) the character's identity such as those typically used by OCR (optical character recognition) software familiar to persons in the trade. This approach is less preferred because it is computation intensive requiring too much processing on the part of the Video CPU 114 (FIG. 4A), which slows video screen access by a Remote PC and degrades throughput to a Remote PC.

A third approach, which is employed in the most preferred embodiment of the invention, uses CRC methods for character recognition. Under this approach, the digitized video is converted directly to CRC values by hardware circuitry, after which these values are written to the video output buffer.

To convert a 16 byte packet to a unique CRC value, the packet data is serialized (dropping the ninth pixel, if present) and the resulting bit stream is input to the CRC generator. FIG. 4L illustrates this process. Each horizontal scan line for a particular character 410, 411, and so forth down to 417, is processed sequentially as shown beginning at reference 400. It can be seen that the tip of the "A" (see 412) is followed immediately by the top line of the "B" as shown within block 407. In the most preferred embodiment, the CRC generator is more correctly called a CRC processor, in that intermediate CRC values generated can be saved and then later restored to process the next horizontal scan line. First the CRC shift register value is set to zero. Then the first line of the cell containing the "A" 410, 401 is processed, after which the intermediate CRC value is saved. Then the CRC shift register value is again cleared and the first line of the cell containing the "B" (see 407) is processed, and so on. After the entire horizontal scan line 410 is processed, scan line 411 begins. First, the previously saved intermediate CRC value for the cell containing the "A" is loaded into the CRC shift register. Then, 402 is processed after which again the intermediate CRC value is saved, and so on. Thus, when processing 80 column text data, there will be 80 intermediate CRC values saved for each scan line. This allows the CRC generator to "see" 16 contiguous bytes for each character. After the last horizontal line 417 for the "A" is processed, the resulting CRC value is the CRC for the character and is stored into the Video Output Buffer 115 (FIG. 4A) and so on for the remaining characters. Later the Video CPU 114 (FIG. 4A) reads these CRC values and searches a look-up table of character CRC values for a match. A special initial training process, discussed in more detail below, generates this table of CRC values, which reflect the actual VDAC characteristics of the Host PC. This process translates the actual character formats used by a given VDAC to a unique CRC for each different character.

Another approach to convert pixel information to character format would be to store all 16 horizontal lines of digitized data (16 by 80 bytes) and then process each character in serial order 400. Two banks of 16 by 80 byte memory would be required so that new digitized data could be stored while previously stored data is being converted to CRC values. This approach uses software instead of hardware to do the processing, but otherwise is suitable for use in the present invention.

The Host Unit's circuits could be enhanced to include a memory translation circuit between the Video Processor 111 (FIG. 4A) and the Video Output Buffer 115 (FIG. 4A) where the CRC value output from 111 (FIG. 4A) would form the address which accessed a memory byte containing the character code, such as used by the ASCII coding scheme, for the character and store this code into the Video Output Buffer 115 (FIG. 4A). The Video CPU 114 (FIG. 4A) would then read the character codes from the video output buffer.

Figures 1, 2, 4M:
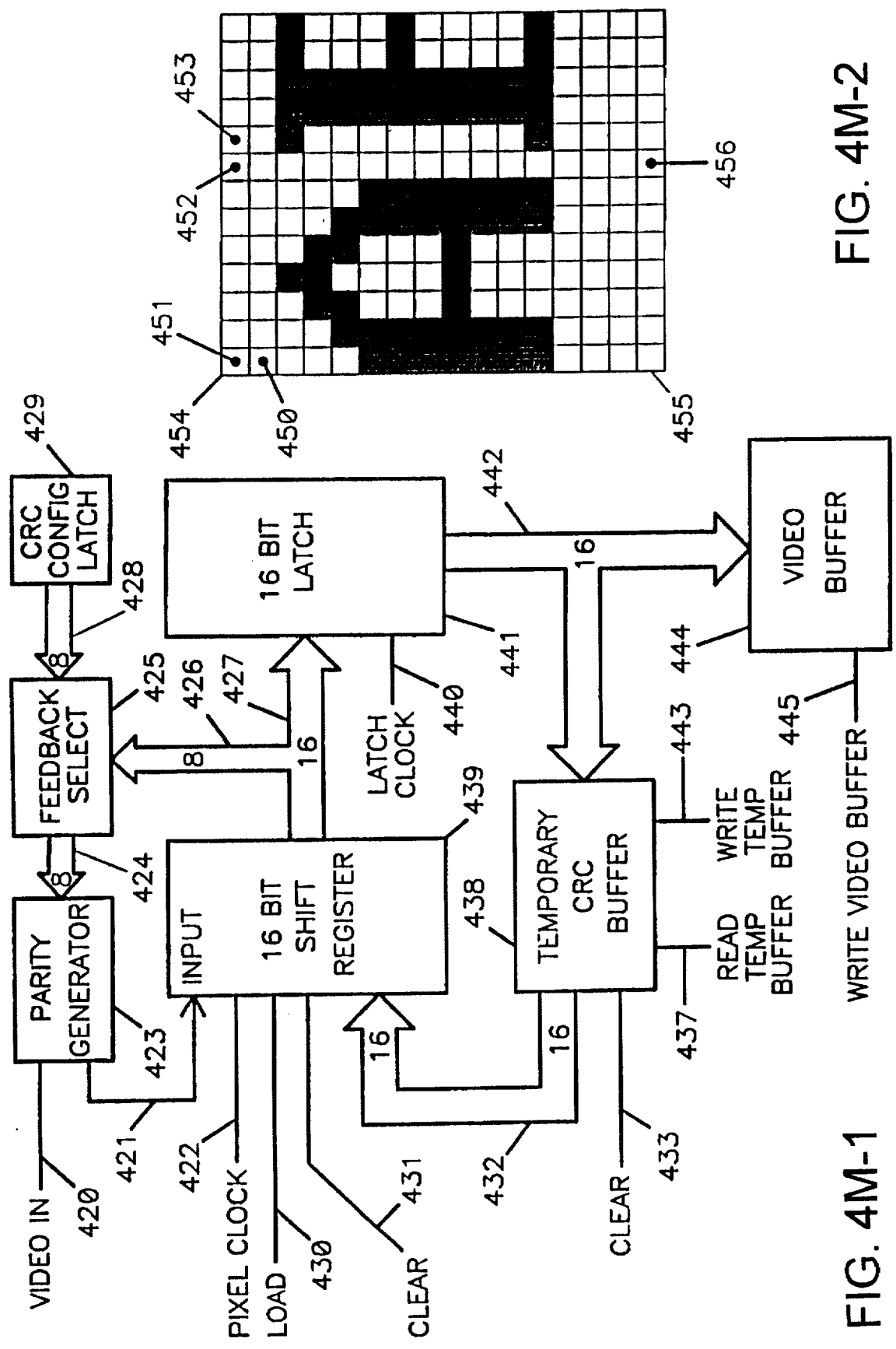

FIG. 4M gives an overview of the current implementation of the Video Processor 111 (FIG. 4A). The CRC generator is composed of a 16 Bit Shift Register 439 (rather than 8 bits as shown in FIG. 4D) and a 9 bit Parity Generator 423 (rather than EXCLUSIVE OR gates as shown in FIG. 4D). The output of the Parity Generator 421 is input to the Shift Register 439. The particular output bits of the Shift Register 439 which are summed with the Video Input 420 is controlled by a Feedback Select circuit 425 (8 dual input AND gates). The first 7 least significant bits along with the most significant bit of the shift register output 426 is logically ANDed with 8 "enable" bits 428 from a CRC Config Latch 429. This latch is set by the Video CPU 114 (FIG. 4A) and configures which of these 8 shift register output bits 426 are input to the parity generator. This Latch 429 is used to configure the CRC generator to produce unique CRC values for the video character set to be recognized. If this value 428 is set to zero, then all 8 bits in 424 will also be zero and the parity output 421 will directly reflect the Video Input signal 420. It is by this means that the Video Input 420 is digitized, with the latched data 442 being stored directly into the Video Buffer 444, without being changed by the CRC generator.

The Pixel Clock 422 clocks video pixel data into the CRC shift register 439. As shown in block 454, the first pixel of the second character 453 directly follows the last pixel of the first character 452. The 9th unused bit (referred to earlier) does not appear on the graph on FIG. 4M as it does not have an associated pixel clock.

The Temporary CRC buffer 438 is cleared by Clear line 433 being pulsed by the vertical sync signal. The Shift Register 439 is cleared to zero via 431. Then, 8 Pixel Clocks 422 occur coinciding with the 8 pixels starting with 451. After the 8th pixel 452 is processed, the intermediate CRC value now appearing at the Latch input 427 is latched via the Latch clock 440. The shift register 439 is again cleared via 431 and the next character is processed starting with pixel 453. While this next character is being processed, the value previously latched 441, 442 is written to a temporary CRC buffer 438 by pulsing the write line 443. This continues until all characters are processed for this horizontal scan line and the Temporary CRC Buffer 438 contains 80 intermediate CRC values. Then, the next horizontal scan line begins. Before pixel 450 is processed, the previously saved intermediate CRC value in the Temporary CRC Buffer 438 is loaded into the Shift Register 439 via the read line 437, 432, mid 430. After the 8th pixel is processed, the new intermediate CRC value is again latched 441 and stored into the Temporary CRC Buffer 438, as described above.

This process continues until a horizontal scan line 455 begins. For this scan, intermediate CRC values are restored as before, but after pixel 456 occurs, the latched CRC value at 442 is the final CRC value identifying the character processed ("A" in the example) and is stored into the video buffer 444 via the write line 445. This is true for the remaining characters on this scan line 455. The next scan line begins the next row of characters and the process starting at 451 repeats until all 25 (for an 80 by 25 video text mode) rows of characters are converted and all 2000 character CRC values are stored into the Video (output) Buffer 444, which is the same as the Video Output Buffer 115 in FIG. 4A.

A possible alternative to storing CRC values in the Video Buffer 444 would be to convert the CRC values before storage into the Video Buffer 444. This could be accomplished by inserting a memory circuit before the video buffer, which would function as a look up table whereby the 16 bit CRC value referenced at 442 will form the memory address. The resulting 16 bit output of this memory would contain the character relating to a given CRC. The Video CPU would initialize this memory with CRC information. For invalid CRCs the 16 bit value is set to zeros. For normal character CRCs the low byte is set to the ASCII code of the character and the high byte would be set to zero. For highlighted (inverse) character CRCs the high byte would be set to the ASCII code and the low byte would be set to zero. This approach would permit immediate translation of CRCs to characters and would improve Host Unit performance.

As shown in FIG. 4N, the video pixel duration as generated by monographic VDACs is about 65 nanoseconds, and for VGA VDACs it is about 30 nanoseconds. The Video time line 458 shows three video pixels: a white, a black, and another white pixel. VGA video requires a fast Pixel Clock 459. The slanted lines indicated by 461 shows jitter produced when any two asynchronous signals interact (the video signal and the Host Unit's video clock). Using 90 megahertz as the base clock rate for pixel clock generation (in the current implementation) this jitter is about 11 nanoseconds in duration. Thus, because of this jitter, to position the rising edge of the pixel clock near the end of the video pixel as shown at reference 460, a resolution of 5 nanoseconds was incorporated into the design. Thus, if reference 467 shows the pixel clock at 460, the circuitry can reposition the pixel clock at 468, or 5 nanoseconds later, if needed. This would make the base clock appear to be between 180 to 200 megahertz. Of course, since the base clock in the current implementation is 90 megahertz, or a period of 11 nanoseconds, and the delay is 5 nanoseconds, the position of the pixel clock follows the pattern 0 ns, 5 nanoseconds, 11 ns, 16 ns, 22 ns, etc. That is, it is centered around a 190 megahertz resolution, and it is a practical solution to achieve the desired result (i.e. to clock in a stable pixel data bit).

To explain jitter, the rising edge of the Horizontal Sync 462 pulse synchronizes the pixel clock. Jitter is inherent in that it cannot be known in advance what the phase of the base clock will be at this time. In fact, the phase of this clock will be continuously changing in respect to each new horizontal scan. To illustrate this, 463 and 464 show the base clock in different phases. Note that the rising edges of the base clock 465 and 466 occurs at different times after the rising edge of the sync pulse 462. Since the Pixel Clock 460 is derived from this sync signal and the base clock, the video pixels 458 inherit the jitter as shown at 461. The start and end of each pixel will fluctuate within the area shown at reference 461.

Figure 40:
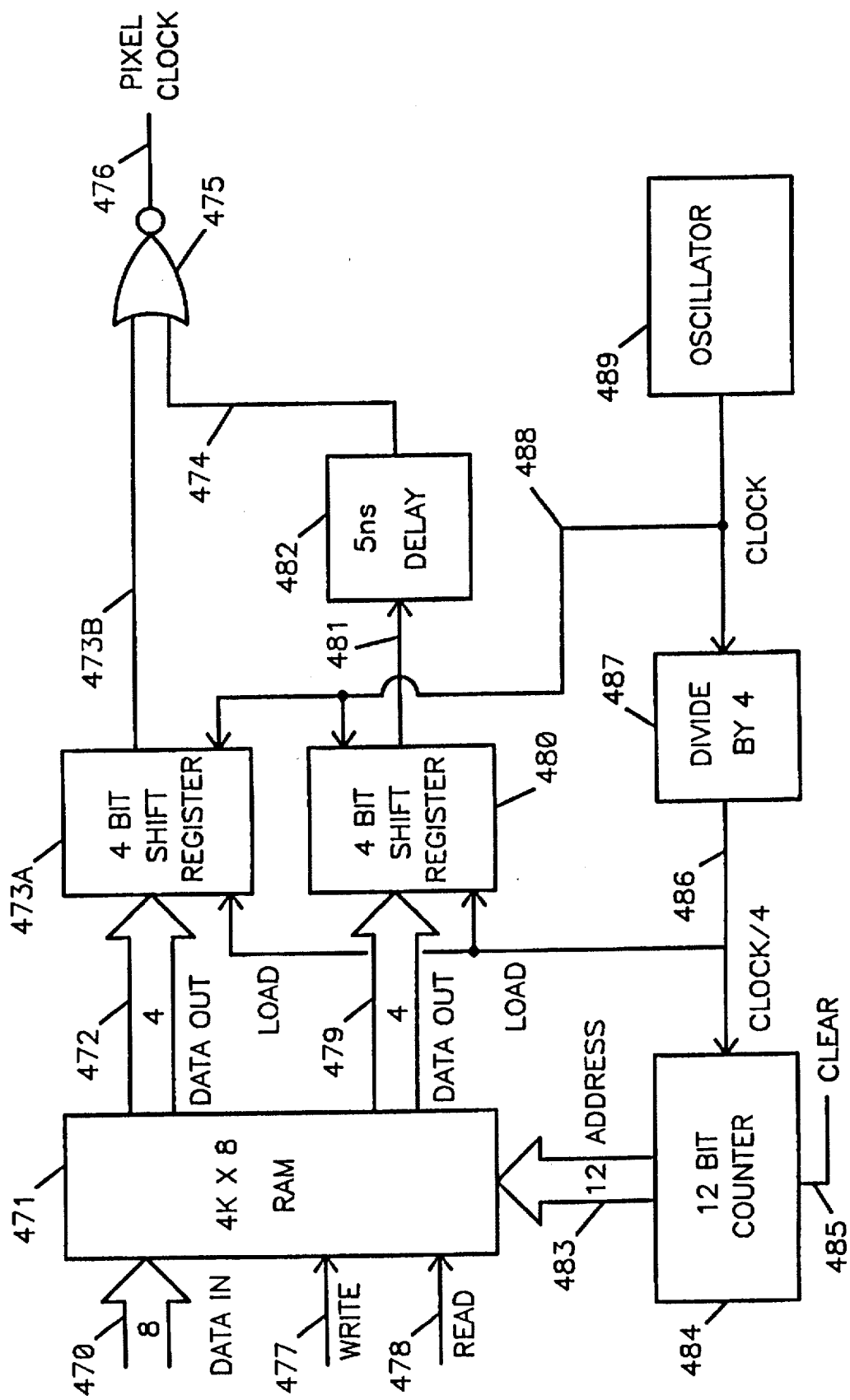

The current implementation of the Pixel Timing Circuit 112 (FIG. 4A) is shown in FIG. 40. Presently, this circuit is a 4K by 8 bit 20 nanosecond RAM memory. The Video CPU 114 (FIG. 4A) programs this memory via the data in 470, and the write line 477. This memory is addressed by the output 483 of a 12 bit counter 484. First, this counter 484 is cleared via reference 485 and, after each write pulse, increments the address counter via reference 486 (this connection is not shown on the figure). When processing video, the read line 478 is enabled. The horizontal sync signal clears the address counter via the clear line 485. The output byte of the RAM memory 471 is split into two 4 bit nibbles 472 and 479 and are loaded into two 4 Bit Shift Registers 473A and 480. A 90 megahertz Oscillator 489 clocks these shift registers and, via the clock signal 488 and the Divide By 4 circuit 487, loads the two nibbles into the shift registers every fourth clock cycle and then increments the 12 Bit address Counter 484. The two shift registers then output each 4 bit nibble one bit at a time at references 473B and 481 to generate the Pixel Clock signal 476. The output of the Shift Register 481 is delayed 5 nanoseconds via a 5 ns Delay 482 (presently a DALLAS DS1000-25) and the two signals 473B and 474 are logically ORed via reference 475 to produce the Pixel Clock 476. Thus, the pixel clock generated can be aligned to the 90 megahertz clock rate every 11 nanoseconds or delayed 5 nanoseconds. Only one bit of one nibble at a time can become the pixel clock. Other means which could be employed include using a phase lock loop (PLL) or other precision delay elements to generate the pixel clock.

The polarity of the vertical and horizontal sync signals change, as well as their relationship to each other, depending on the VDAC in use and the particular video mode (e.g. text or graphics modes). As shown in FIG. 4P., references 490 and 491 show example Vertical Synchronization (Sync) 490 and Horizontal Synchronization (Sync) 491 signals. But, depending on the video mode or VDAC, the Horizontal Sync 491 may appear as shown at reference 492 and the Vertical Sync signal 490 may appear as shown at reference 501. To accommodate this, two exclusive OR gates referenced as 498 and 500 are used so that the sync signals which drive the video circuitry are always negative polarity at references 497 and 499. The Video CPU 114 (FIG. 4A) sets the polarity bits referenced at 494 and 496 to accomplish negative polarity.

The phase relationship of the vertical and horizontal sync signals also vary per VDAC as shown at references 501 and 503. Both rising edges occur at the same time. Referring to references 503 and 504, notice that the rising edge of 504 occurs after the rising edge of 503 as compared with the phase relationships shown at references 501 and 502. To normalize this to a consistent phase relationship, a flip-flop is used as shown at block 508. The VSYNC Temp signal 499 is used to clear the flip-flop as shown at reference 510 and the rising edge of the HSYNC Out signal 497 which is connected to the clock input 507 and sets the output 509 to a one (logical high) via data input 506 (hard-wired to +5 volts). The VSYNC Out signal is shown as reference 505.

The Horizontal Control Circuitry 113 (FIG. 4A) implements the narrative and timing diagram for FIG. 4J and FIG. 4M. Referring to FIG. 4J, after the vertical sync begins a new screen at references 340 and 351, this circuitry skips the non-visible horizontal sync signals referenced at 352, then repeats the cycle of initializing the CRC shift register 439 value to zero 431, for each character of the first horizontal scan line, saving and restoring intermediate CRC values via 438 for the middle character scan lines, and writing the final CRC values for each character row to the Video output Buffer 444 (115 FIG. 4A).

The Host Unit contains two microprocessors (i.e. CPUs) 106, 114 each with their own independent software operating system. FIGS. 5A through 5I provide an overview of these software operating systems. Source program code written in 8032 assembly language for the Video CPU 114 is contained in the microfiche appendix, part 5. Source program code also written in 8032 assembly language for the Control CPU 106 is contained in the microfiche appendix, part 6. As known to persons familiar to the trade, operating system software, such as that used for the Control and Video CPUs, is primarily event or interrupt driven and does not follow the linear logic flow typical of most application software.

The present embodiment includes two CPUs primarily to spread the processing workload so as to give a remote user the impression (to the extent possible) that they are actually sitting at the Host Unit. Decoding the high speed video signal of the Host Unit's VDAC presently requires almost all of the processing speed of a typical high speed microprocessor. Adding additional processing requirements to the CPU responsible for decoding video signals may prevent the CPU from keeping up with the data output of a VDAC. Hence, a second CPU was added to the present design of the Host Unit. As noted above, however, with faster microprocessor technology, a single CPU could be used.

Figure 5A:
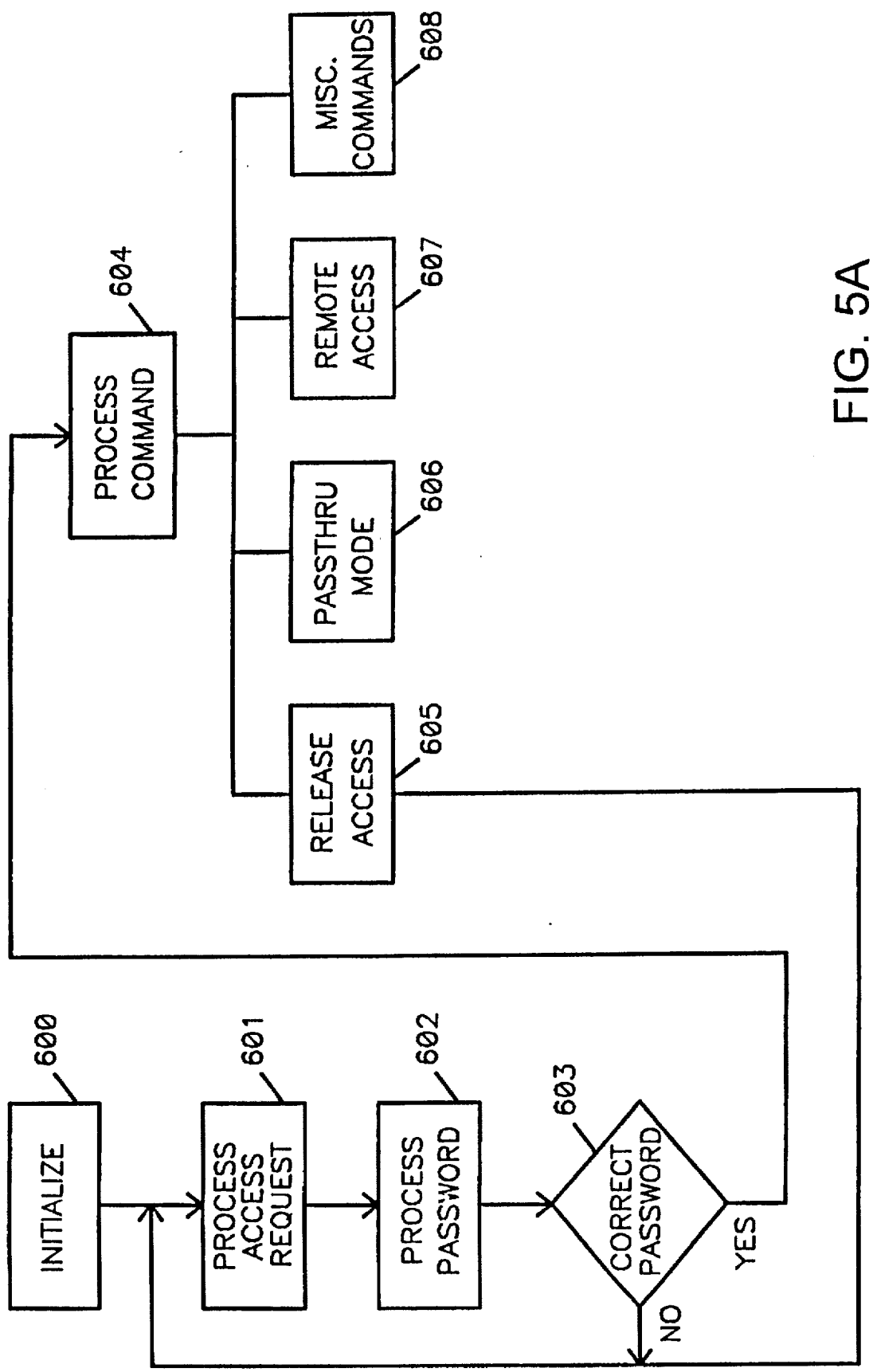

FIG. 5A represents an overview of the Control CPU 106 (FIG. 4A) operating software. When power is first applied to the Host Unit, the CPU begins executing the initialization routine 600. This routine does the nominal housekeeping such as setting certain variables to default values, clearing counters, setting up interrupt parameters. After this, the dip switches are accessed to determine the Host Unit's identification number. Then, non-volatile ram is accessed 108 (FIG. 4A) for the Host Unit's access password, default modem data and to check if the Host Unit is setup to process video (via training discussed below in connection with FIG. 6).

If the Host Unit is ready to process video data, a video-ready command is sent to the Video CPU (via 107 FIG. 4A)

to indicate that video processing can commence. The initialize routine 600 then sets up the Remote Data Circuitry's serial data port 103 (FIG. 4A). If the Host Unit's identification number is zero, the Host Unit's data port is disconnected from the chaining port, the CPU's serial port transmit and receive signals are directly connected to the host data port, and a modem which is expected to be connected to the remote data port, is initialized. In a case where a Remote PC is directly connected to a Host Site via a Direct Line Linkage, no Host Unit with an identification number of zero would exist at the Host Site. In this instance, the Remote PC would presently be connected directly to the "Data In" receptacle of the first Host Unit on the Daisy chain. In this case, the first and all other Host Units present on the daisy-chain listen for an access request.

After this initialization process is complete, the Control CPU waits to Process Access Requests 601 from the Remote PC to the Host Unit. During this time, the "Action" button on the front of the Host Unit is also monitored. Should the "Action" button be pressed, then normally a "Setup" command is sent to the Video CPU and a "Setup" flag is set, the setup indicator on the front panel of the Host Unit is made to blink, and the Process Access Request 601 routine continues to wait. However, in cases where the Host Unit has been locked due to a security breach, pressing the "Action" button unlocks the Host Unit for remote access and resets both the "Session" and "Lockout" counters to zero. Finally, during this Process Access Request 601 wait period, any command received from the Video CPU will be serviced. Then, the Process Access Request 601 routine continues to wait.

When a Remote PC first establishes a connection with a Host Site (i.e. a carrier detect signal or a request to send received), each Host Unit on the daisy-chain at the Host Site re-initializes it's "Session" security counter to zero and session lockout flag.

When a Remote PC issues an access request, each Host Unit at the Host Site checks it's identification number 601. If the Access Request's identification number matches the Host Unit's number, then the Host Unit responds to the access request and Password processing 602 begins. However, if the unit is currently in a SETUP mode, the Process Access Request 601 responds BUSY and access is denied.

Routine 602 now requests a password from the Remote PC and waits. Presently, the Host Unit uses a zero knowledge password protocol, whereby each password request contains a random encryption key that encodes the password in a different manner, so as to make it difficult for anyone with unauthorized access to the data line to determine a password.

If no password is received after a pre-set period of time or an invalid password is received 603, then a "Session" counter is incremented to count the number of unsuccessful access attempts during a session. If this counter exceeds a user specified limit, the counter is reset to zero, a "Lockout" counter is incremented, a session lockout flag is set, and a data packet is returned to the Remote PC indicating that access to the Host Unit is denied for the session and processing returns to the Process Access Request routine 601. If the "Lockout" counter exceeds a user specified limit, as obtained from non-volatile RAM, no user will be permitted access to the Host Unit until the "Action" button on the front of the Host Unit is pressed.

If a valid password is received 603, both the "Session" and "Lockout" counters are reset to zero, the session lockout flag is cleared and the Process Command routine is invoked 604.

The Process Command 604 routine, processes any commands received from the Remote PC or the Video CPU. The Misc. Commands subroutine 608 contains some subroutines that may be invoked by the Video CPU processing, after which processing will return to the calling routine when complete.

The Release-Access command 605 is not a subroutine, but causes an end to command processing by returning to the Control CPU's Process Access Request routine 601.

The Passthru 606 and Remote Access 607 routines are described after a general discussion of the Video CPU has been completed below.

Several processes are grouped together under the heading Misc. Commands 608. These processes include disconnecting the Host PC's keyboard from the Host PC so that the Control CPU can generate the keyboard signal. Also included are commands which start a video training session remotely, or transfer video related data (contained in non-volatile ram) to and from the Remote PC, change the Host Unit's password, or send a keyboard scan code to the Host PC (used by the video CPU during training).

Figure 5B:
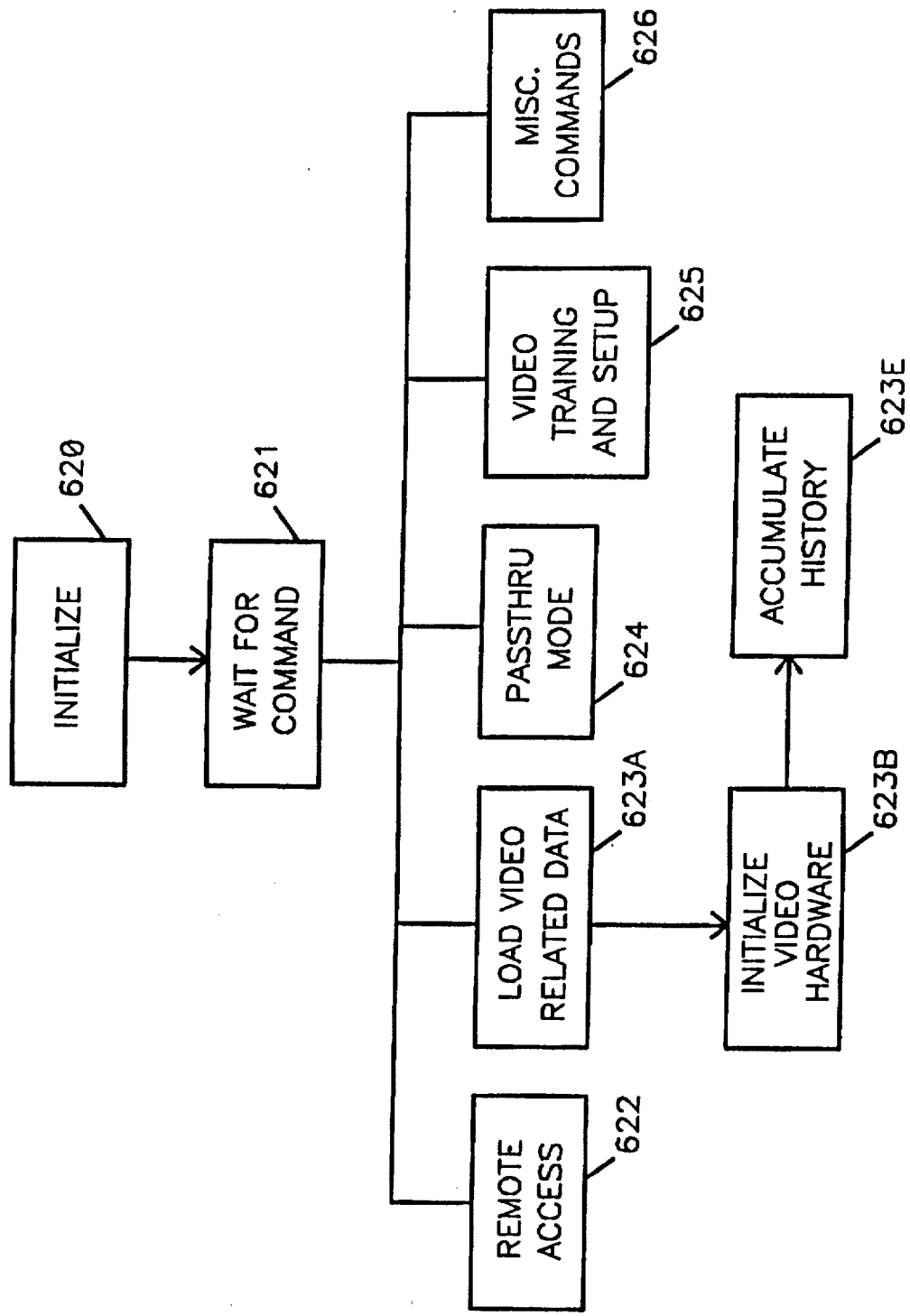

FIG. 5B is an overview of Video CPU's operating software. Lines with arrows indicate processing flow, whereas lines without arrows indicate a called process or subroutine.

When power is first applied to the Host Unit, the Video CPU begins executing the initialization routine 620. This routine does nominal housekeeping such as setting certain variables to default values, setting up interrupt parameters, and initializing the Host Unit's data serial port 116 (FIG. 4A). After this, the software waits for a command 621 from the Control CPU 107 (FIG. 4A). Blocks 622, 623A, 624, 625 and the miscellaneous command 626 are all subroutines invoked by the Wait For Command 621 routine, which returns processing to the Wait For Command routine 621 when subroutine processing is complete. Blocks 623A through 623E are parts of a single subroutine.

If the Control CPU sends a video ready command, then the Load Video Related Data 623A subroutine is invoked and waits for one second, and then requests non-volatile video related data from the Control CPU necessary to decode the Host PC's video output. After this data is loaded into the Video CPU's memory 623A, the video processor hardware 110, 112, 113 (FIG. 4A) is initialized 623B with timing data, default sync polarity, and also flags are set to indicate the video processing mode (monochrome or color). Then, the Accumulate History 623E process begins to perpetually log the most recent VDAC output history to the extent of the Host Unit's memory.

If the video mode changed from a text mode to a graphics mode, history logging within the Host Unit is suspended until the video mode returns to a text mode.

The Accumulate History process 623E initially captures the text data currently displayed by the Host PC's VDAC which is stored in a "base screen" data area and after this, the Accumulate History Process only accumulates any changes which occur. If so many changes occur that the Video CPU's memory limit is reached, then the oldest changes are applied to the "base screen" data area to free up more memory so that more recent changes can be stored.

When a Host Unit is initially accessed by a remote user, the remote user must specify (via the TVLINK.EXE program operating on the Remote PC, as discussed below) whether or not (1) any screen history stored in the Host Unit's memory should be transferred to the Remote PC prior to beginning the access session and (2) if the user wants view only access to the Host site, as opposed to full access. The user's preference on video history and view only mode is transferred to the Host unit as data packets when the Host Unit is first accessed. If video screen history is to be transmitted, then the Accumulate History routine 623E transmits VDAC history data to the Remote PC by the Video CPU through the Control CPU's Misc. Command Routine 608 in the form of data packets and processing returns to the Wait For Command 621 routine. Otherwise, the processing returns to the Wait For Command 621 routine.

If the remote user has requested full access to a Host Site's Host Units, as opposed to view only access, the Remote PC sends a Remote Keyboard command to the Host Unit which invokes the Misc. Commands subroutine 608 that causes the Host PC's keyboard signals to be generated by the Host Unit instead of the Host PC's keyboard. Then, the Remote PC sends a Remote Access command to invoke the Remote Access 607 subroutine.

First, the Control CPU Remote Access 607 subroutine instructs the Video CPU to begin it's Remote Access 622 subroutine processing. The Remote Access subroutine 622 causes video text to be captured and sent via the Control CPU to the Remote PC for display. The last status of the screen data sent is compared to the contents of the current screen and only changes in the VDM data are sent.

Figure 5C:
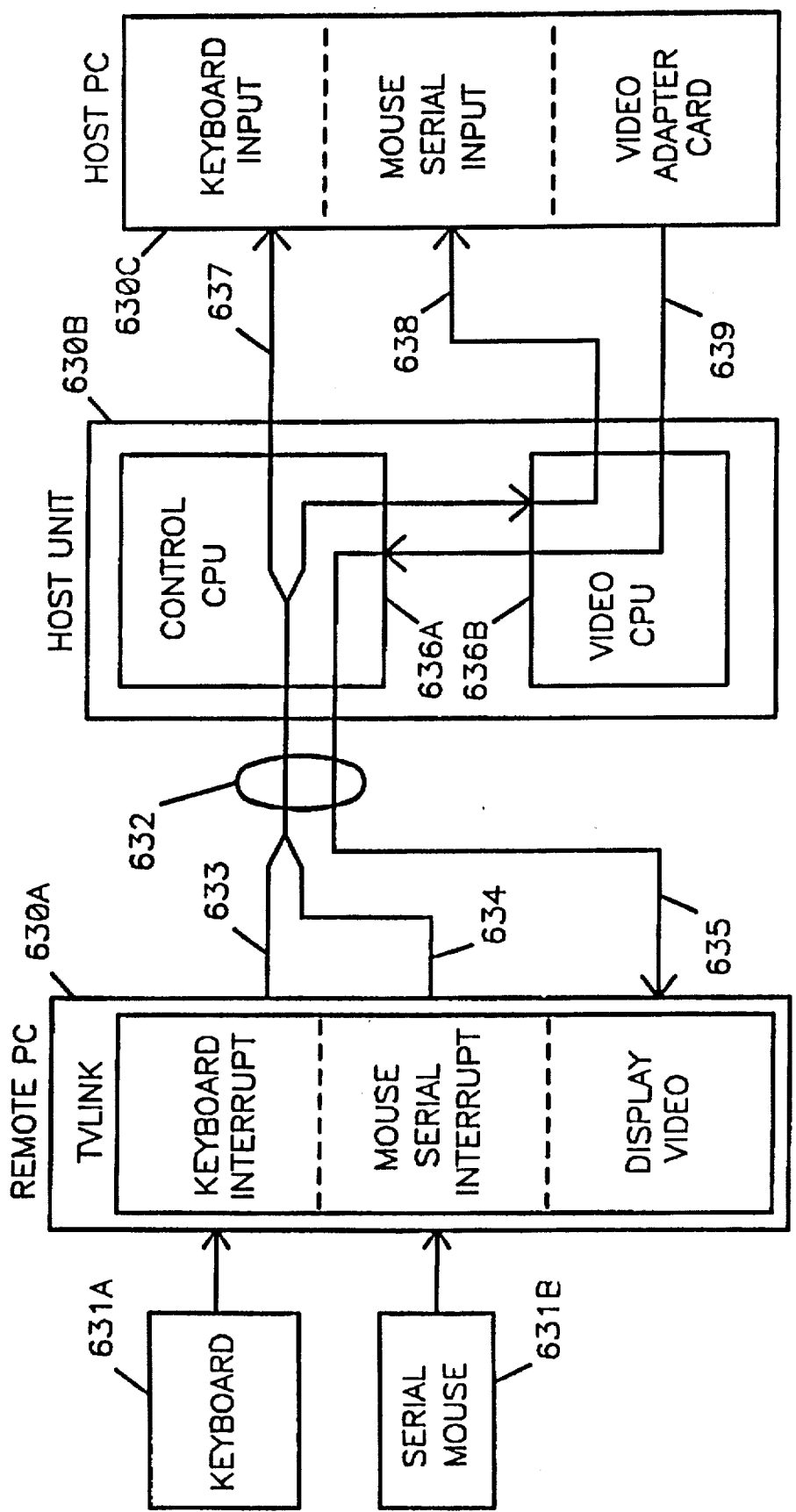
Figures 2, 5D:
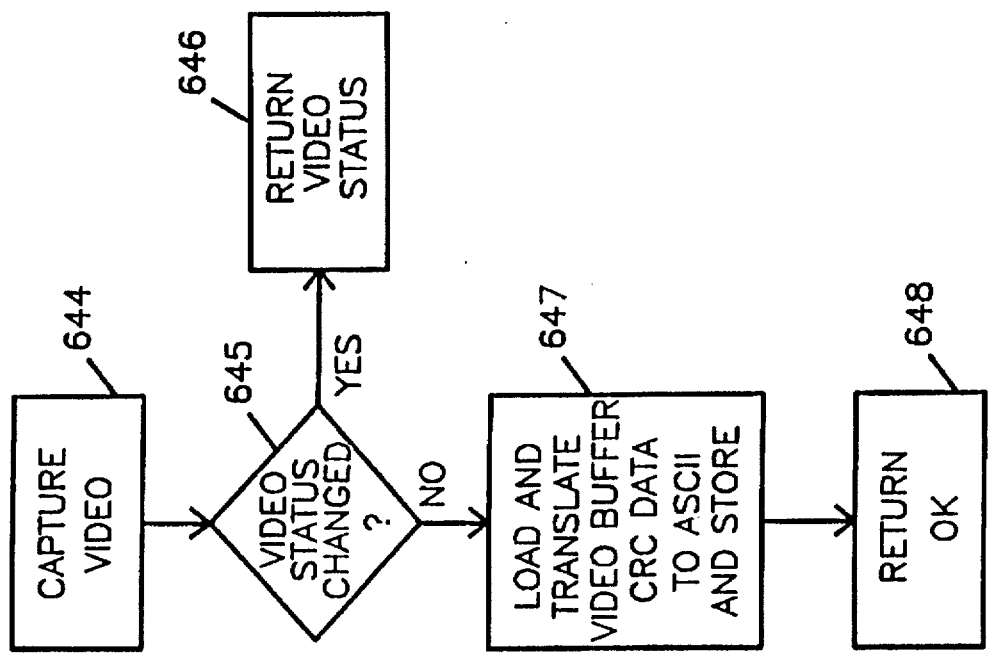
Figures 1, 5D:
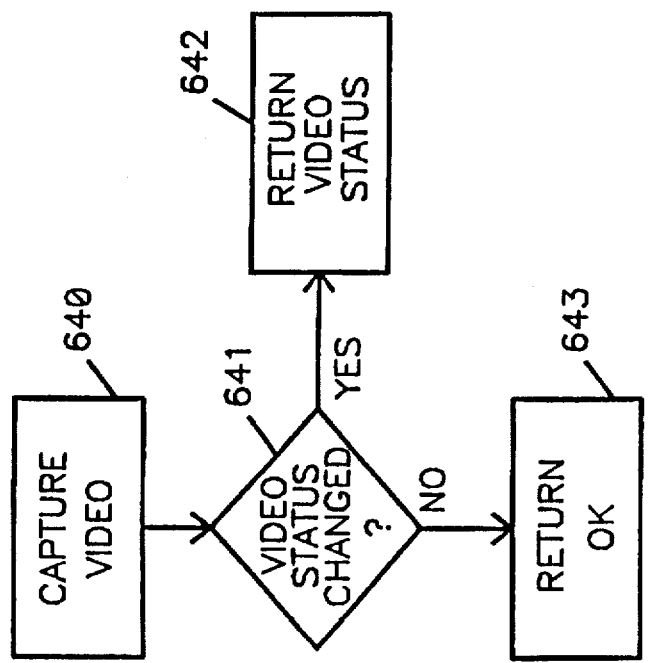

FIG. 5C shows an overview of the data flows between the TVLINK.EXE software executing on the Remote PC 630A, the Host Unit 630B, and the Host PC 630C. Remote keyboard 631A and mouse 631B activity are handled by TVLINK.EXE interrupt processes which combine and transmits this data 633, 634 to the Host Unit 632. The Control CPU 636A separates this data, sending mouse information to the Video CPU 636B which forwards it as serial input 638 to the Host PC. The keyboard data transmitted is converted to keyboard clock and data signals 637 which pass into the Host PC's keyboard input receptacle. Host PC Video signals 639 from the VDAC are converted to coded text data, such as ASCII coded text data, by the Video CPU and transmitted through the Control CPU to the Remote PC 635 where it is processed by TVLINK.EXE for output to the Remote PC's VDAC. Note that the transmit and receive data lines shown at 632 may be connected directly or connected via modems or other communication devices.

To accomplish file transfers between the Remote PC and the Host PC, first a file-transfer program called TVFILES.EXE (provided with the apparatus and installed on the Host PC's mass storage device) is invoked on the Host PC by typing in the program name from the Remote PC keyboard using the Remote Access process 607. Then the file transfer function is selected from the TVLINK.EXE menu of the Remote PC. TVLINK.EXE will then send a packet containing a Passthru command to the Host Unit. The Control CPU receives this command 604 and Passthru mode 606 subroutine is invoked.

The Passthru Mode 606 subroutine first sends a Passthru command to the Video CPU's Wait For Command 621 routine which causes the Passthru 624 subroutine in the Video CPU to be invoked. The Control and Video Passthru 606, 624 subroutines work together so that data received from the Remote PC is forwarded via the Video CPU to the Host PC's serial port. Data received from the Host PC is forwarded via the Control CPU to the Remote PC. Thus, TVLINK.EXE (running on the Remote PC) communicates directly with the file-transfer program (running on the Host PC) and it is the responsibility of these two programs to produce the file transfer either from the Host PC to the Remote PC or vice-versa.

Video Training and Setup 625 is invoked when the Setup command is received from the Control CPU, after the Action button is pressed on the front panel of the Host Unit. This process interfaces with a software program running on the Host PC called TVTRAIN.EXE, which is provided with the apparatus and accessible from the Host Unit's mass storage device, as discussed in the narrative supporting FIG. 6A to 6D. To send data to the program, the Video Training and Setup subroutine 625 commands the Control CPU to send "keystrokes" to the program, and receives data from the program by processing the VDAC's video signals including a video raster signal. This process is described in more detail in connection with FIGS. 6A, 6B, and 6C.

During Remote Access 622 and Video Training and Setup 625, certain subroutines are used to capture and interpret video data. Video graphics is captured and digitized by the Capture Video 640 graphics subroutine. This subroutine first checks that the horizontal sync and the vertical sync did not change in polarity, and then waits for the vertical sync to become active, at which time it enables the video processing circuitry and waits for the next vertical sync. At this point, the video output buffer contains the digitized video data. This data is then transmitted to the Remote PC where TVLINK.EXE program can display this data in graphics mode. This data is also used by the training process (described below) to adjust pixel clock timing. The video circuitry must be properly initialized (see 110, 111, 112, 113 FIG. 4A) without CRC.

If the polarity of the sync signals change 641, this routine aborts and returns 642 the Video Status. Otherwise the Capture Video 640 graphics subroutine returns OK 643.

To capture video text, the video circuitry must be properly initialized (see 110, 111, 112, 113 FIG. 4A) for text mode with CRC. Then, the Capture Video 644 text subroutine captures video text and 2000 CRC's (for a 80 character by 25 line text mode). Presently, both the Graphics and Text Capture Video subroutines 640, 644 are the same subroutine. This results because the video processing circuitry is initialized differently that character CRC's, rather than digitized video, is stored into the video output buffer.

If the sync polarities have changed 645, Capture Video 644 subroutine processing ends and the video status is returned to the calling routine 646. Otherwise, the video circuitry loads each character CRC from the video output buffer and, via a look-up table, translates these CRCs to character codes (such as one byte character codes used by the ASCII coding scheme) stores these codes into memory via a data-pointer which was initialized prior to calling this subroutine 647, and then returns OK 648.

Figure 5E:
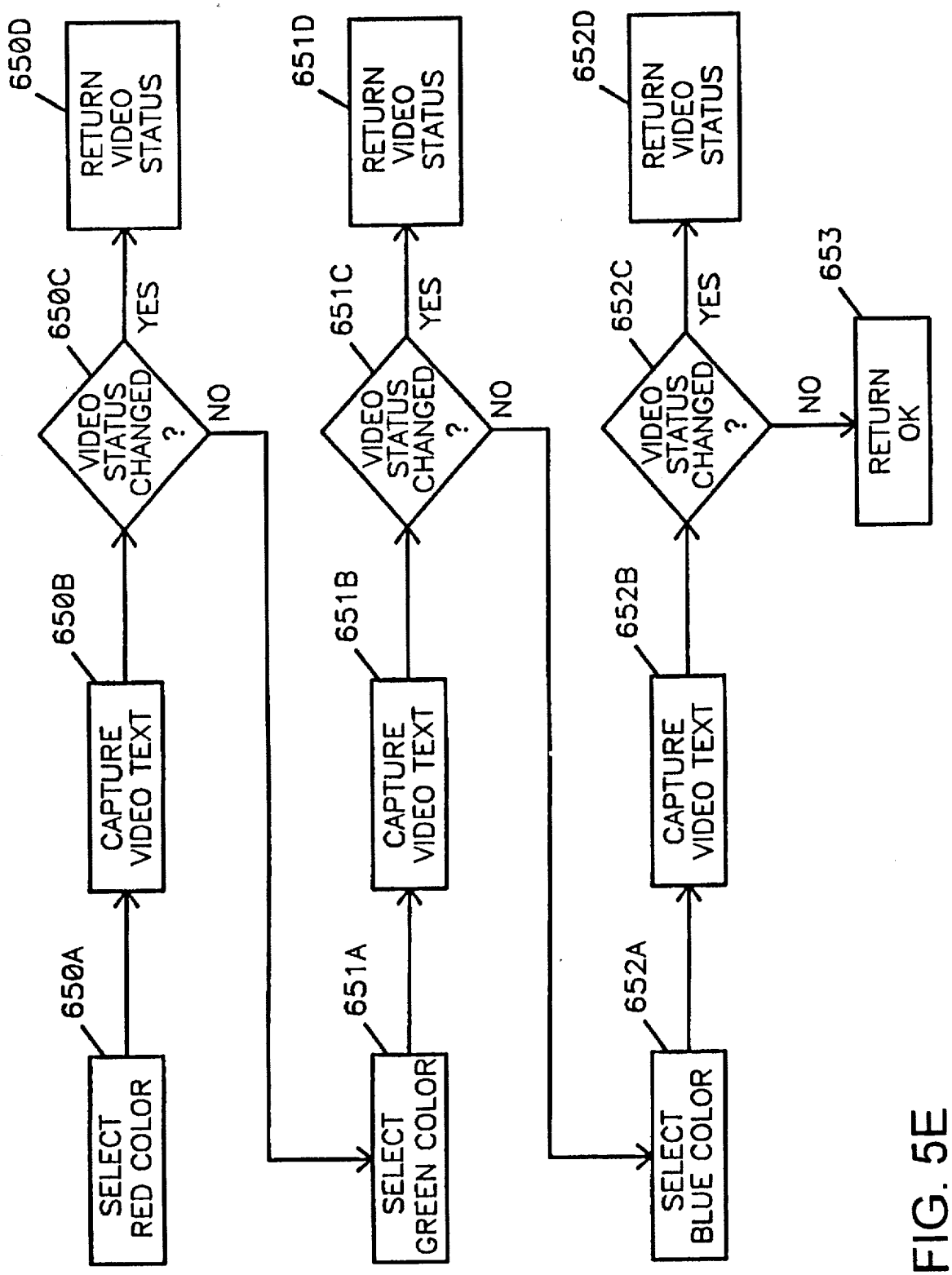

FIG. 5E shows the Capture Video 644 subroutine (at 650B, 651B, 652B) being used to capture text data from the red, green, then blue color signals. Before capturing text data, the particular color signal is selected at 650A, 651A, 652A (discussed previously in the narrative for FIG. 4G). The Capture Video Text 650B, 651B, 652B subroutine will return the video status 650D, 651D, 652D if the sync polarities change 650C, 651C, 652C. Otherwise, the Capture Video Text subroutine returns OK at 653 after capturing video text information from the Red, Green and Blue color signals.

FIG. 5F illustrates some of the data storage areas used by video subroutines. The character data generated from the Capture Video Text subroutine 650B, 651B, 652B is stored into corresponding data areas 660A, 661A, 662A. These subroutines also update a bit flag (in 660B, 661B, 662B) for each character. A bit flag indicates whether a character is normal or inverse (highlighted).

Using the red, green, and blue text data and bit flags, each character value, such as the ASCII value, and color attributes (foreground and background) can be determined. FIG. 5G shows 5 characters 665A, 665B, 665C, 665D, 665E, each with different foreground and background color combinations. For each of these, there is also shown the characters derived from the three color signals after each signal is used to derive the related CRC. The foreground and background colors will be each represented by a three bit number with each bit corresponding to one of the three primary colors. This three bit quantity can take on values 0–7, where black is 0 (000b), blue is 1 (001b), green is 2 (010b), light blue is 3 (011), red is 4 (100b), violet is 5 (101b), yellow is 6 (110b) and white is 7 (111b). The preceding numbers in parenthesis are the binary equivalent of the three bit value and will be used in the discussion. The combination of red, green, and blue light make white. In cases where the analysis of a color signal yields a CRC that is "normal" video, the corresponding bit value of that signal will be 1 for ON and 0 for OFF. Otherwise, if the signal matches an inverse CRC, the bit value of the signal will be reversed (i.e. set to 0 for ON and 1 for OFF).

The process of how the three-color primary color signals are used to derive the foreground and background colors is illustrated in FIG. 5G and FIG. 5H.

For White (foreground) on Black (background) 665A, each color signal matches a "normal" CRC for an "A". Accordingly, 666A shows a red "A" on a black background, which means the red signal is ON for foreground (i.e. 1) and OFF for background (i.e. 0). Similarly, 667A shows a green "A" and 668A shows a blue "A", also on black backgrounds. Together these three color signals appear on a computer monitor as a white "A" on a black background. On this basis the bit values would yield: Foreground: 111b, background: 000b.

For White on Blue 665B, the blue signal 668B is always on. It supplies the blue background color and it also combines with the red "B" 666B and the green "B" 667B to create the white foreground color of the "B". The CRC for the red and green signals yield a "normal" B character. Hence, the first two foreground bits are "11" and background bits are "00". The CRC for the blue signal yields a "normal" solid blue block CRC character where both the foreground and background colors are blue (i.e. ON). Hence, both the third foreground and background bits would be set to 1. On this basis the bit values would yield: Foreground: 111b, background: 001b.

For Yellow on Blue 665C, the red "C" 666C and the green "C" 667C are ON and combine to create the yellow foreground color. When the red and green signals' CRCs are analyzed, a "normal" CRC "C" character results, which means the first two bits are set to foreground value of 1 and a background value of 0. When the blue signal's CRC is analyzed, the blue signal 668C forms the background only and is not part of the foreground color, since the signal matches a "inverse" CRC for the letter "C". On this basis the bit values would yield: Foreground: 110b, background: 001b.

For Red on Blue 665D, the red "D" 666D creates the foreground color and hence matches a "normal" CRC for the letter "D". So, the first bit would be set to 1 for the foreground and 0 for the background. The green signal 66713 is off, or black; does not contribute at all; and matches the CRC value for a "normal" space. So the second bits for both the foreground and background would be set to 0 (i.e. OFF). When the blue signal's CRC is analyzed, the blue signal 668D forms the background only and is not part of the foreground color, since the signal matches a "inverse" CRC for the letter "D". On this basis the bit values would yield: Foreground: 100b, background: 001b.

For Yellow on Violet 665E, the red signal 666E is always on and with the green "E" 667E combine to create the yellow foreground color and combines with the blue background color 668E to form violet. Since the red signal is "ON" to achieve both the foreground and background colors, the red signal matches the "normal" CRC for a block character and the first bit for both the foreground and background would be set to 1. The green signal combine with the red signal to define the yellow foreground for the "E" character, but is not a part of the background color and is hence OFF for background purposes. On this basis, the green signal would match the CRC for a normal "E" character and cause the second bit to be set to 1 for the foreground and 0 for the background. The blue signal 668E does not contribute to the foreground but contributes to the background and combines with the red signal 666E to form violet. When the blue signal's CRC is analyzed, the blue signal 668E forms the background only and is not part of the foreground color, since the signal matches a "inverse" CRC for the letter "E". On this basis the bit values would yield: Foreground: 110b, background: 101b.

For Yellow on Green 665F, the blue signal 668F is off, or black, and does not contribute anything. Hence, the blue signal translates to a CRC for a "normal" space, where the third bit would be off for both the foreground and background. The green signal 667F supplies all of the background color and also combines with the red signal 666F to create the yellow foreground color. Hence, the CRC for the green signal yields a "normal" block character where both the foreground and background for the second bit would be set to "1". The red signal only contributes to creating the foreground of the "F". Hence, the red signal would yield the "normal" "F" character which would set the first bit to a foreground of "1" and a background of "0". On this basis the bit values would yield: Foreground: 110b, background: 010b.

For Black (foreground) on White (background) 665G, each color signal is identical and yields the CRC for an "inverse" "G" character. 666G shows a black "G" on a red background. Similarly 667G shows a black "G" on a green background and 668G shows a black "G" on blue background. Together these three color signals appear on a computer monitor as a Black "G" on a white background. On this basis the bit values would yield: foreground: 000b, background: 111b.

Other characters follow a similar pattern, except for those characters which result in a solid block or a space.

When an analysis of all three color signals yields a character that is a solid block 665X, 665Y, 665Z, the character ASCII code is always stored as a hex DB block with both the foreground and background attributes set to the color of the block. This approach improves processing efficiency as discussed below.

A Black block is shown at 665X. All the color signals 666X, 667X, 668X, are off, or black. The CRC for each color character 666X, 667X, 668X will be translated to a "normal" space character (ASCII hex 20) but the character at 665X will be set to a block (ASCII hex DB) with foreground of 000b and a background of 000b.

A White block is shown at 665Y. All the color signals 666Y, 667Y, 668Y, are on. The CRC for this character will be translated from each color signal to a block (ASCII hex DB). On this basis the bit values would yield: foreground: 111b background 111b.

A Yellow block is shown at 665Z. The blue color signal 668Z is off, or black, and does not contribute anything and hence is translated to the "normal" CRC space character.

The red 666Z and the green 667Z are on in both the foreground and background to combine to make the solid Yellow Block. The CRC for this character will be translated to an ASCII value of hex DB. On this basis the bit values would yield: foreground: 110b Background 110b.

The ASCII hex 00 (null character) and ASCII hex FF characters are identical (as displayed) to a solid block 666X, 666Y. Presently, these characters are translated to a block (hex DB) character. The ASCII code 00 is used to represent a character who's CRC is unknown (not in the CRC look-up table). This can occur for two reasons. One, when noise, or other transients corrupts the video signal, and two, when the presence of the Host PC VDAC's hardware flashing cursor periodically obscures the character. The ASCII code hex FF is defined as an invalid character and is used to clear (initialize) ASCII video data areas.

A discussed above, a "normal" character is defined as a foreground color on black background such as 666F. Whereas an inverse or "highlighted", character is defined as black on a background color such as 666G. A character CRC will uniquely identify whether a particular character is normal or inverse depending on whether the applicable color signal is translated to a character using the "normal" or "inverse" character set. When examining the red, green, and blue characters, each character can be one of the following ASCII codes: a space (hex 20) 666X, a block (hex DB) 666Y, or the ASCII code of a particular character 666F or 666G. So, in deriving the three bit foreground and background color values, the process is as follows: for each particular color, if the character is a space, which is all black, then the foreground bit and background bit for this color are both set to zero. If it is a colored block character, then the foreground bit and background bit for the color are both set to one. Otherwise, the character normal/inverse flag determines the setting of the color bit: normal sets the foreground bit and inverse sets the background bit.

To determine a character code, if all three color characters are either spaces or blocks (such as 665X, 665Y, 665Z), then the character is a block 665X. Otherwise, the character is any non-space, non-block character found (such as 665F). If there is more than one non-space, non-block character, they must be equal. If two such characters are encountered and are not equal, then the character is set to hex 00 (unknown character). Also, if any color character is unknown (unrecognized CRC), then the resulting character is also set to hex 00.

The character comparison, to determine the differences, as referenced above, include both the ASCII code as well as the color attributes. If foreground color changes from one character to the next, then this color change information is processed. If background color changes from one character to the next, then this color change information is processed. If the character code changes, the new character will be processed. Blocks (ASCII hex DB) need special attention because they may be interpreted as spaces depending on the foreground and background color values. For instance, if White on Black text is being processed, such as 665A, then the Black block 665X will be a space (hex 20) and the White block 665Y will be a block (hex DB). If however, Black on White text is being processed 665G, then the space 665X will become a block since the foreground color is black. Similarly, the White block 665Y will become a space since the background color is White. This is determined by examining previously processed character's color attributes. If the entire video screen is blank (all spaces being displayed) this may be interpreted as 2000 spaces with Black background or 2000 blocks (Black foreground). It does not matter, since they are equivalent. The only reason to differentiate spaces from blocks is for efficiency since only the ASCII code need be processed, rather than processing foreground and background information. Since typical screens are composed of a significant amount of blank space, avoiding the need to process foreground and background information improves overall performance of the video signal translation process.

From the above discussion it will be clear to person of skill in the art that the color attributes of the characters displayed on the Host PC VDM can be interpreted and transmitted to a Remote PC using the present invention. The examples listed above are illustrative of the method employed by the present invention, which can be used to determine the color attributes of any characters displayed on the Host PC VDM.

When video text is first processed for remote access, the Current Screen 663A is initialized to hex DB (the block character) and color attributes 663B are initialized to zero (black foreground and background). These two data areas comprise the current text data captured and represent a blank screen. Each new captured text screen is then compared to this current screen data and only the differences are processed (i.e. either sent to TVLINK.EXE or logged as history) and updated to the current screen data. Thus, by initializing the current screen data with hex DB and color attribute of zero, only the first non-blank video text data captured is guaranteed to be different, and thus be completely processed. After this, only the differences will be processed. The initial text data and subsequent differences will be transmitted to the Remote PC via the Control CPU. Transmitting only changes over relative slow speed telephone lines substantially reduces the amount of time required to transmit Host PC video display information to a Remote PC. Furthermore, using data compression techniques familiar to persons in the trade further reduces the time needed to transfer data to a Remote PC.

To accumulate video text history, video text data is first captured and stored into the current screen 663A and the Base Screen 664A data areas as well as the color attribute data areas 663B, 664B. After newly captured text data is compared to the current screen data, only the differences are stored by the Accumulate History routine 623E in the History of Changes 664C data area and then updated to the current screen data. When the History of Changes data area 664C becomes full, the oldest changes are applied to the base screen 664A, thus freeing more storage space 664C.

Some Remote users may wish to sacrifice color attributes for faster transmission of text data. Presently, the remote user is given the option (via the TVLINK.EXE program running on the Remote PC, discussed later) to chose between one of the three color signals in lieu of color detection using all three color signals, as previously described. When one color signal is selected, the Video CPU processes only that color signal and sends back normal and inverse video text data. In certain cases, characters may be formed solely by color signals other than one signal selected. In these cases, the correct character cannot be determined. For example, a blue character on a black background will not be detected on either the green or red color signals.

The Control CPU's keyboard interface emulates the Host PC's keyboard. Keyboard signals (either from the keyboard or the Control CPU) pass through two stages before reaching the application program running on the Host PC. The application program could include the DOS COMMAND.COM program. When any key is pressed and/or released, the keyboard sends one or more serial data bytes to the Host PC. These bytes are processed by a dedicated microcontroller within the Host PC, which translates this information to scan codes, and asserts interrupt 9 to communicate to the Host PC's central processors (for example a 80386 microprocessor). This interrupt invokes a BIOS routine which translates the scan code to an ASCII (or extended) character code and places it in a buffer for use by the current application. Although some application programs may bypass the BIOS and service this interrupt directly, it will not affect the operation of the present invention. Examples of extended character codes include the HOME, LEFT ARROW, and INSERT keys.

The keyboard uses a bi-directional synchronous serial protocol (8 bit plus parity) to communicate with the Host PC and the Control CPU emulates this interface when a Remote user is accessing a Host Unit. FIG. 5I shows the keyboard clock 671A and data 670A signals. These signals are held at a logical high of 5 volts by a pull-up resistor. The Host PC or keyboard asserts a logical low (0 volts) on these lines by use of an open-collector driver. For each bit transmitted, data is first asserted (high or low) (i.e. 670D) after which the clock is driven low for approximately 50 microseconds (i.e. 671C). The transfer of data is controlled by the keyboard, not the Host PC. That is, when clocking data to or from the Host PC, it is the keyboard which produces the clock signal.

When a key is pressed, the keyboard sends a byte or bytes to the Host CPU. It first asserts a serial "start" bit 670B, asserts a clock pulse 671B, then asserts the first data bit 670C, and so on, until the 8th data bit 670E and parity 670F has been clocked. Then, a stop bit 670G is asserted with the clock pulse 671D. This ends the byte transfer. At this time, when the clock pulse is brought high 671E, the Host PC asserts a low on the clock line. This will remain low 671F until the Host PC has finished processing this data byte, at which time, the clock line will go high 671G and the keyboard can send another byte. For keystrokes such as, for example "A" through "Z", 670A and 671A show the protocol involved, data flow is from the keyboard to the Host PC.

For keys such as CAPS-LOCK, NUM-LOCK, and SCROLL-LOCK, data flows both ways. That is, the Host PC controls the state of these functions. When the NUM-LOCK key is pressed, for example, the keyboard sends this information to the Host PC after which the Host PC sends the status of all three functions which activate the NUM-LOCK, CAPS-LOCK, and SCROLL-LOCK indicators on the keyboard. The clock and data protocol for this is shown at 672A and 673A. When the NUM LOCK key is pressed, the start bit 672B and first clock 673B begins the byte transfer. After the byte is transferred, the keyboard brings the clock line high 673C which the Host PC will immediately bring low again 673D to indicate busy. During this busy time, the Host PC brings the data line low 672C to request a data transfer to the keyboard. When this happens, the keyboard waits for the Host PC to set the clock line high again 673E at which time the keyboard now generates the clock pulses 673F. Note, that the data signal at 672C also serves as the start bit. With each clock signal, the keyboard shifts the Host PC's data 672D into its memory. When the transfer is done, the keyboard sets the clock line high 673H and the Host PC brings it low again 673G to indicate busy. When finished, the Host PC brings the clock line high 673J to indicate it is ready for more keyboard data. If after the Host PC has brought the clock line low 673G and the Host PC has more data, the data line is again brought low as illustrated at reference 672C and another data transfer, from the Host PC to the keyboard, will take place.

This concludes an overview of the clock and data protocol. Although one-byte transfers are described to explain the mechanisms for bi-directional data transfer, when a key is pressed, released, or for "lock" key activity (NUM-LOCK, etc.) multi-byte transfers are actually involved. Keys such as Print-Screen, Sys-Req, or CLT-Break also have their own multi-byte protocol. More detail concerning this operation is set forth in the microfiche appendix, part 7.

FIG. 6A illustrates the main training screen 681 presently generated by the TVTRAIN.EXE program distributed with the apparatus. The source program code for the TVTRAIN.EXE program is included in the microfiche appendix part 4.

Processing parameters needed to decode the video signals for a VDAC into digital or text data may vary from VDAC to VDAC and may change further should VDAC technology change. The TVTRAIN.EXE program is invoked on the Host PC. The program permits the Host unit to decode the actual video output signals of a VDAC, including the video raster signals, against known data displayed on the screen to deduce the exact processing steps required to decode the output of the VDAC. This approach permits the apparatus to process video regardless of the VDAC technology employed. These processing parameters are stored in the form of data tables stored in the Host Unit's non-volatile RAM, which are referenced by software programs operating in the Host Unit Video CPU that decode the Host Unit's video signals. Once the TVTRAIN.EXE process has been successfully completed for a HOST PC, the process need not be repeated unless the Host PC's VDAC or VDM is changed or a new Host PC is connected to the Host Unit.

When the TVTRAIN.EXE is invoked on a Host PC, the Host PC waits for a specific series of keystrokes to be received from the Host Unit to begin the training process. Thereafter, the Host Unit controls the activities of the TVTRAIN.EXE program via keyboard input to the Host PC. After the TVLINK.EXE has been invoked on the Host PC, the "Action" button on the front of the Host Unit must be pressed to instruct the Host Unit to begin sending keyboard data to the Host PC. Thereafter, the Host Unit continues to control the TVTRAIN.EXE via keyboard input until the training process is complete. When training is in process the "Setup Mode" indicator light on the front of the Host Unit blinks.

During the training process a video screen is presently displayed on the Host PC VDM as shown in FIG. 4A. This video display uses only black and gray or white unless otherwise noted.

The dashed horizontal line beginning at reference 683 shows 40 half block characters (hex DF) from the ASCII character set. Each of these characters alternate with a space. The next solid horizontal line beginning at reference 684 contains 80 half block characters (hex DF) forming a solid bar. The third vertical line beginning at reference 685 through the twenty-fourth 687 row contain a hex B1 character in the first column (also shown enlarged at 680A. The twenty-fifth line (i.e. row) contains 80 characters (hex DC) as shown beginning at reference 688.

As the first step in the training process, the horizontal and vertical sync polarities are determined and then the video processing circuitry is initialized to digitize the video data (the CRC configure latch 429 is set to zero) by the Video CPU in the Host Unit. There are 8 pixel clocks per character and with 80 characters per row, a total of 640 pixel clocks are needed. Each of these pixel clocks is initialized to a small default value to place them approximately 25 nanoseconds parts.

Then, to determine whether the video signal is analog or TTL, the green analog signal is selected and video is captured. The video data is then scanned for black and white activity which will be found when data relating to 683 is encountered. If the data is all zeros or all hex FF's, then the monitor is not analog and the TTL green signal will be selected, and video activity checked again. If video is still not detected, then the Video CPU instructs the Control CPU to send a keystroke to the Host PC, via the keyboard interface, instructing TVTRAIN to display an error message. Otherwise, the video training process continues.

Next, a video screen is captured. First, the number of non-displayable horizontal scan lines 682 must be determined. This is done by counting each 80 byte (one scan line) until a non-blank scan line is found (i.e. reference 283). Second, starting with the first non-blank scan line 683, scan lines are counted, until the next horizontal line (i.e. reference 684) is encountered. This gives the number of horizontal scan lines needed to generate a character.

With this information, the training process continues to capture the video, ignoring the first two rows 683, 684 and begins adjusting the pixel clock timings using the columns in the vertical line between 685 through 687. This column 685 is shown in more detail at 680A. The blank space referenced at 680B shows the first pixel of the character hex B1. The black square referenced at 680C shows the first pixel of the next scan line. The series of blank and black squares referenced by 680D shows the first character in it's entirety. In a VGA mode 16 horizontal lines are needed to make the character. The next Character referenced at 680E immediately follows the first character thus supplying an unbroken series of alternating pixels (i.e. 680B, 680C, and downward). The vertical column of hex B1 characters indicated by 685 to 687 include 352 horizontal scan lines for VGA text mode video (16 scan lines by 22 rows). For some monochrome adapter cards using 8 scan lines per character row, there are only 176 scan lines. In any case, 100 scan lines of the column 685 to 687 are used in the training process.

Figure 6B:
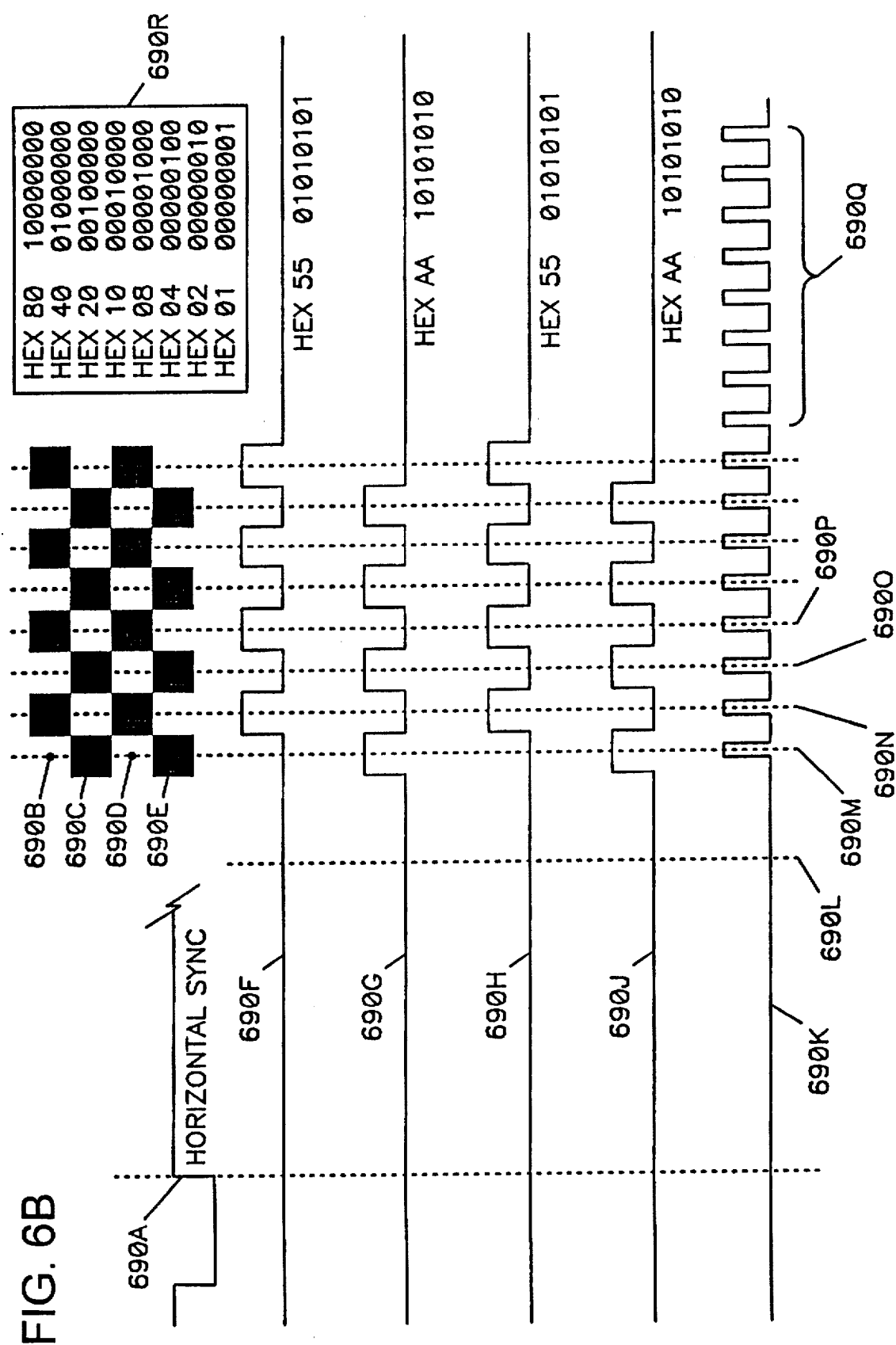

FIG. 6B shows the first four horizontal scan lines of 680A and associated data streams. The pixel referenced at 680B is shown again at reference 690B. The 8 character pixels starting with 690B is shown as a data stream at 690F. Similarly, 690C is shown at 690G, 690D is shown at 690H, and 690E is shown at 690J. Pixel clocks positioned correctly are shown on the line beginning at reference 690K. Correct positioning is when, the pixel clock will reliably capture pixel data without errors due to jitter. Pixel clock 690M captures the first pixel or data bit, the following 7 pixel clocks captures the remaining 7 pixels, producing a data byte for each scan line. The value of this byte for 690B, 690F is 55 hex or 01010101 binary. The value of the next byte for 690C, 690G is AA hex or 10101010 binary. The first pixel is the Most Significant Bit (MSB) of the resulting byte value.

Note that as shown, the first pixel 680B of the character hex B1 is a zero data bit and that 680C is a one data bit. For some video adapter cards however, the hex B1 character is reversed. That is, the first pixel 680B of the character hex B1 is a one data bit and that 680C is a zero data bit. Since the Host Unit knows the expected character contents of each screen location, the Host Unit can automatically detect this reversal, which illustrates how the apparatus can automatically adapt itself to diverse VDACs through this training process.

A primary subroutine involved in the training process evaluates the correctness of a pixel clock position in relation to the video pixel data. This routine processes 100 scan lines. Each scan line is digitized to 80 bytes, each byte representing one scan line of a character. Before calling this subroutine an INDEX and a MASK value is set. The INDEX selects one of the 80 bytes across the screen. The INDEX starts at zero, which is the left most column, moves across the screen one column at a time and ends at 79, which is the right most screen column 689B. The MASK selects one of the bits within a byte referenced by this INDEX. Reference 690R show a table of these MASK values.

As the first step in this subroutine, the pixel at 690B is tested. If it is zero, then a COUNTER is incremented. Then the pixel at 690C is tested. If it is non-zero, then a COUNTER is also incremented. This is repeated for pixels 690D, 690E, and so on, testing for alternating pixel values, until 100 pixels have been tallied. The value of the COUNTER should now equal 100 and, if so, then the pixel clock 690M is correct. If it is less than 100, then the pixel clock needs to be repositioned, and the pixel column 690B rechecked.

After pixel clock 690M is positioned correctly, then pixel clock 690N is selected. At this point, the first pixel in this pixel column (to the right of 690B) will be a one instead of zero at 690B.

Initially, the INDEX for the pixel clock referenced at 690M is set to zero and the MASK is set to hex 80. After the pixel column is processed and the COUNTER equals 100, then the MASK is shifted right to become hex 40, to test 690N, then it is set to hex 20 for 690O, and hex 10 for 690O, until the eighth pixel column is processed with the MASK equal to hex 01. The eight pixel clocks for this column of characters (i.e. 685 to 687) are now positioned.

The Video CPU now instructs the Control CPU to send a keystroke to the Host PC, via the keyboard interface, which instructs the TVTRAIN.EXE program to move the column of hex B1 characters 685, 687 over to the next column at 689A. The training process now increments the INDEX by one and sets the MASK to hex 80, and proceeds to position the next 8 pixel clocks 690Q. This process is repeated until the last column at 689B has been processed (INDEX equals 79). The pixel clocks now correctly capture the 640 pixels.

When the horizontal scan line begins 690A, there is a blank area or left margin 686 before visible pixels commence. When attempting to position the first pixel clock at 690M, it may be at 690L or some other location. Notice here that the data streams 690F, 690G, 690H, 690J and so on, will all have a value of zero. So when the subroutine, described above, processes this data, the value in COUNTER will be 50 since only half the pixels are of the correct value. That is, they are all zero whereas the subroutine expects alternating pixel values. On this basis, the training process permits the unit to automatically adjust to the blank areas present for a given VDAC by skipping over situations where the vertical pixel counter is 50.

Signal interference or noise may cause minor distortions during the training process in the pixel COUNTER. Therefore, a tolerance of plus or minus 3% is presently permitted when setting the pixel clocks. In addition, in cases where a pixel clock appears to be out of such expected ranges, processing for the pixel clock is automatically repeated up to 10 times to resolve the problem. If the problem cannot be resolved at that point, the training process is terminated and an error messages is displayed suggesting that another VDAC or Host Unit be used.

Figure 6C:
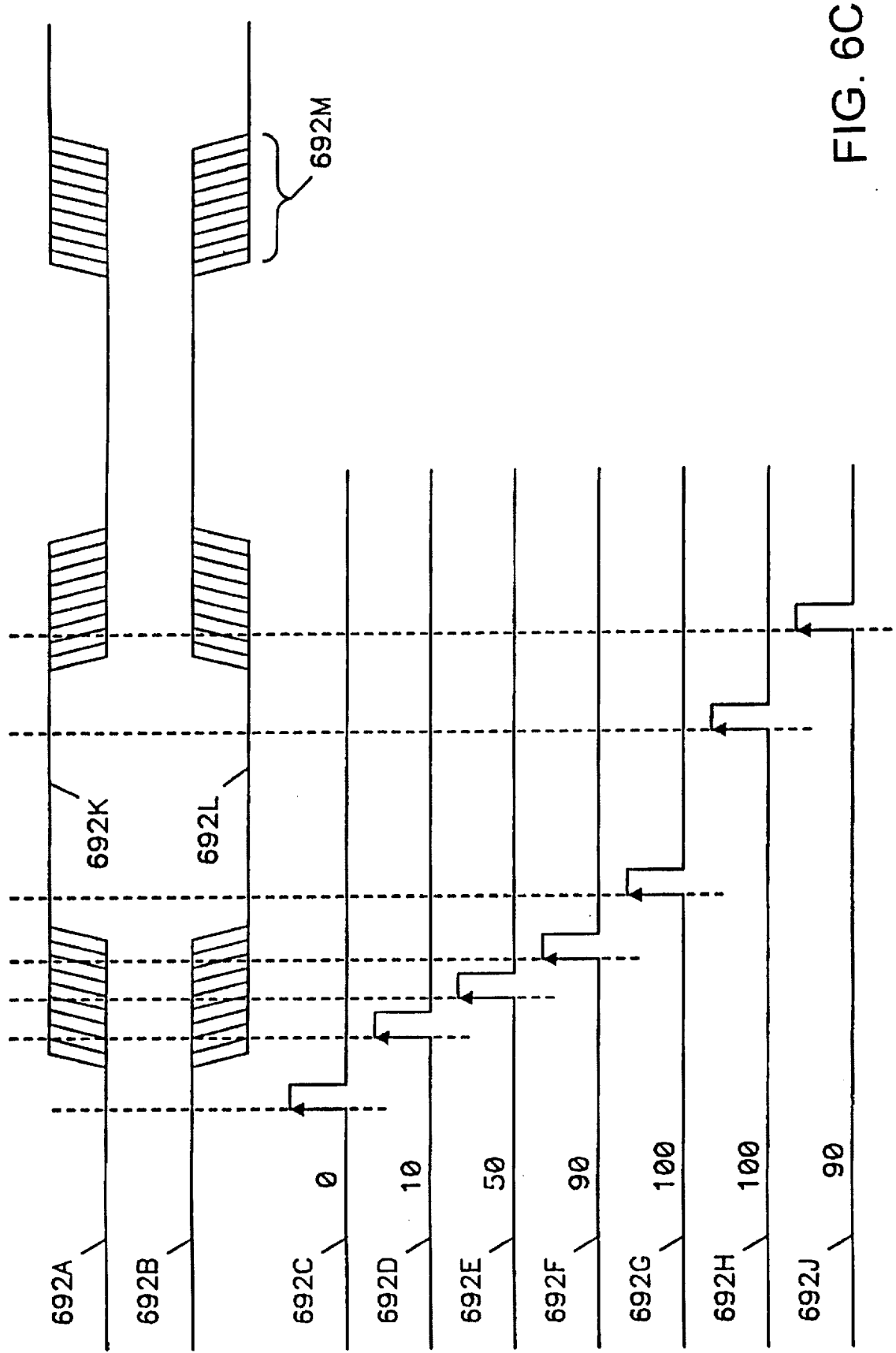

FIG. 6C shows the effect of pixel clock timing on the COUNTER value. Waveforms 692A and 692B show several pixels from two scan lines including jitter 692M. Waveforms 692C, 692D, 692E, 692F, 692G, 692H, 692J show the pixel clock pulse of 690N at different timing positions. This pixel clock as shown at 692H is correctly positioned for 690N. The pixel clock shown at 692C is actually positioned at the previous pixel 690M, 690B, 690C. The COUNTER value resulting from this clock pulse will be zero because none of the pixels are correct. As explained, pixel clock 690N expects a consistent pixel value of one 692K followed by a pixel value of zero 692L.

At 692D, the COUNTER value will be approximately 10 because, due to jitter, the pixels will be correct 10 percent of the time.

At 692E, the COUNTER value will be approximately 50. At 692F, the COUNTER value will be approximately 90. At 692G, the COUNTER value will be close to 100 (due to insufficient data setup time requirements). At 692H, the COUNTER value will be 100. At 692J, the COUNTER value will again be close to 90.

Figure 6D:
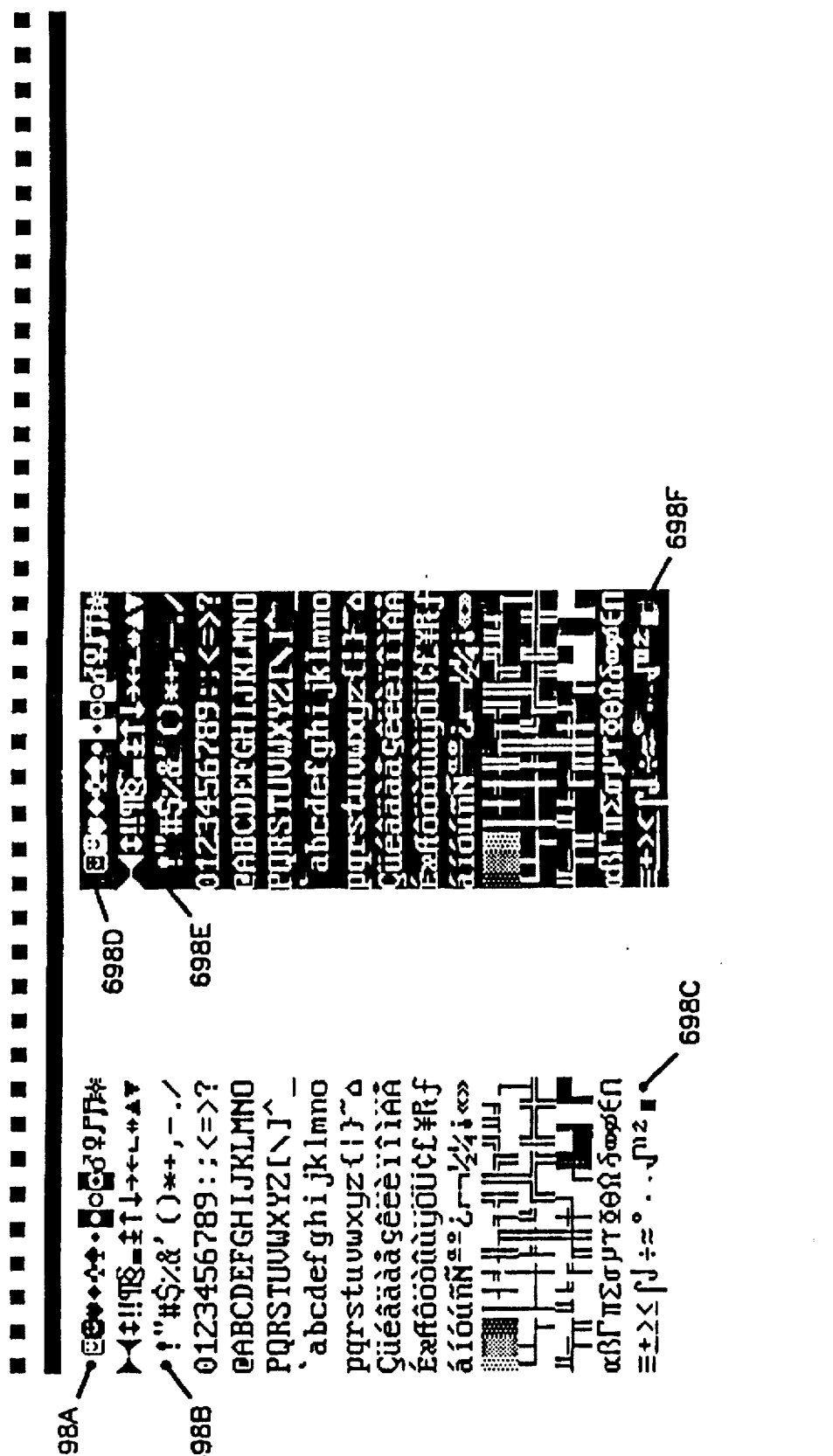

After the pixel clock timing has been determined, the Video CPU instructs the Control CPU to send a key stroke to Host PC, via the keyboard interface, instructing TVTRAIN.EXE program to display the character set as shown on FIG. 6D. Both normal and inverse (highlighted) characters are shown. At this time, the Video CPU enables CRC generation by setting the CRC configure latch 429 to the value of hex 83 (which will select the two least significant bits and the most significant bit of the shift register 439, for feedback 426).

The video is then captured producing CRC's for each character shown on FIG. 6D. Presently there are 512 possible characters (256 normal, 256 inverse) that may be displayed on an Host PC's VDM operating in a text mode. Some of these characters are duplicates. For instance, the zero ASCII code, or null character at 698A, and the hex FF character 698C does not display on a VDM and is the same as the space character 698B, and will be interpreted as a space (hex 20). Similarly, the block character (above the square root sign and near 698C) is identical to the inverse null 698D and an inverse space 698E, and will be interpreted as a block. Although, the ASCII codes differ among these two sets of characters, the visual information is identical.

Only the CRC's for the character sets on FIG. 6D are presently processed. First, they are checked for uniqueness (ignoring duplicate or identical characters). If they are not unique, then a new value must be written to the CRC configure latch 429, such as hex 85, etc. The video is again captured and the uniqueness test is repeated. When a suitable value for the CRC configure latch, which provides for unique CRC codes for all characters is found, video training continues.

If the VDAC is analog (not TTL) then the Video CPU instructs the Control to send a key stroke to Host PC, via the keyboard interface, instructing TVTRAIN.EXE to enter a 16 color 640 by 480 graphics mode and display a single horizontal bar at the top of the screen. The horizontal and vertical sync polarities are determined for this mode and then the video processing circuitry is initialized to digitize the video data (the CRC configure latch 429 is set to zero). The number of horizontal scan lines 682 preceding any visible pixels is then determined.

All information gathered during this video training process including the pixel timing information and character CRC's are transferred to the Control CPU for storage in non-volatile RAM. A flag in non-volatile ram is then set to indicate the Host Unit has been successfully trained and the SETUP indicator light 54 is turned off.

When the training process is complete, the Video CPU instructs the Control CPU to send a keystroke to the Host PC, via the keyboard interface, informing the TVTRAIN-.EXE program that training was successful. At this point the Host PC returns to it's normal operating system (e.g. DOS).

FIG. 7 is a block diagram describing the software processing presently occurring within a Remote PC. Rectangular objects on this diagram represent software subroutines or menu displays that may be initiated within the Remote PC's CPU whenever a program (herein referred to as TVLINK.EXE) supplied as part of the apparatus is executed. Diamond shaped boxes represent major processing decisions occurring within the TVLINK.EXE program. Circled boxes with letters inside represent either on-page or off-page connectors to the next processing step in the block diagram. Lines with arrows represent the direction that TVLINK.EXE processing flows.

Source program code presently used for TVLINK.EXE is contained in part 3 of the microfiche appendix. TVLINK software is installed on each Remote PC that will access Host Site(s).

Figure 7A:
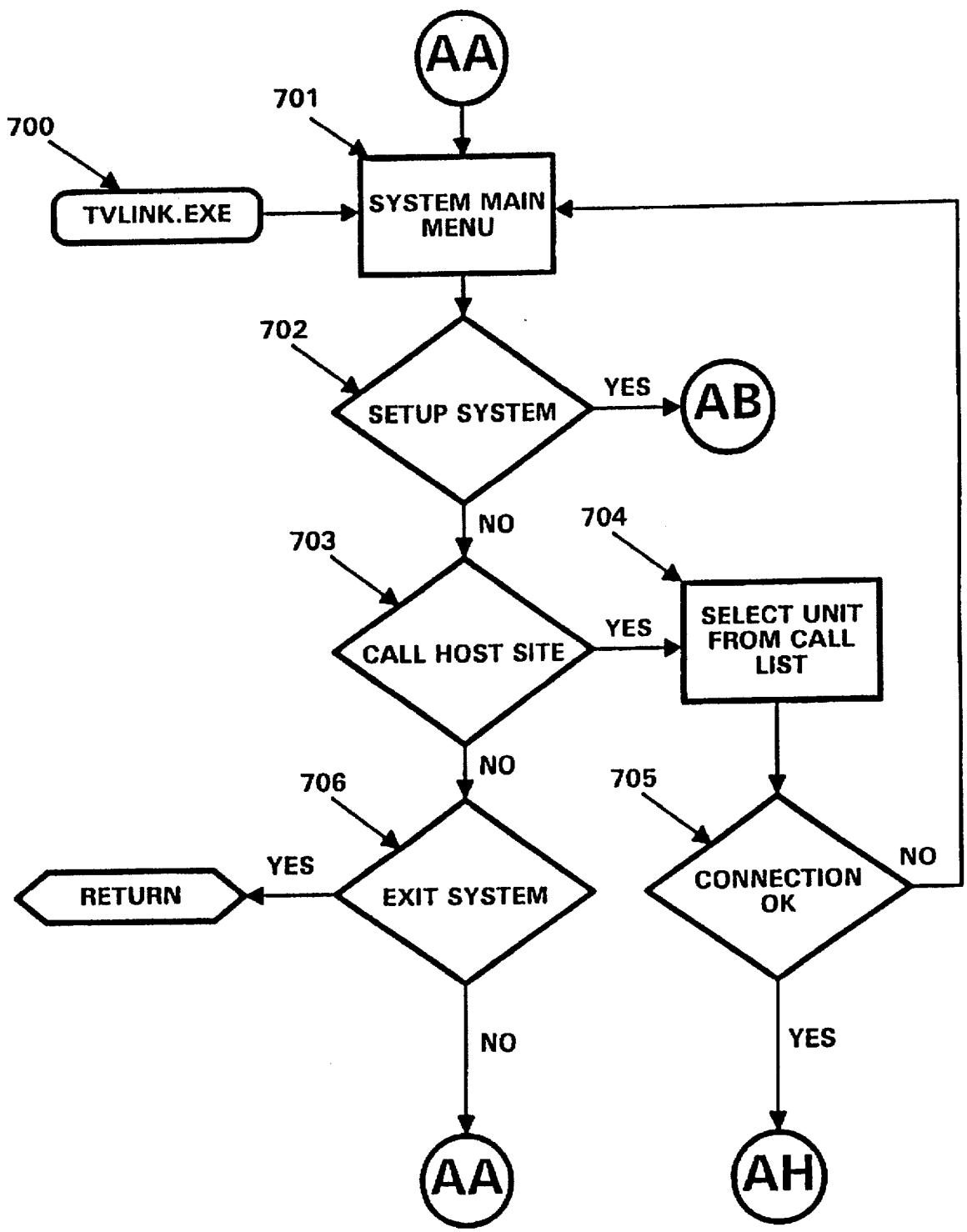
FIG. 7A–7G are block diagrams describing the software operating on the Remote PC.
Figure 7B:
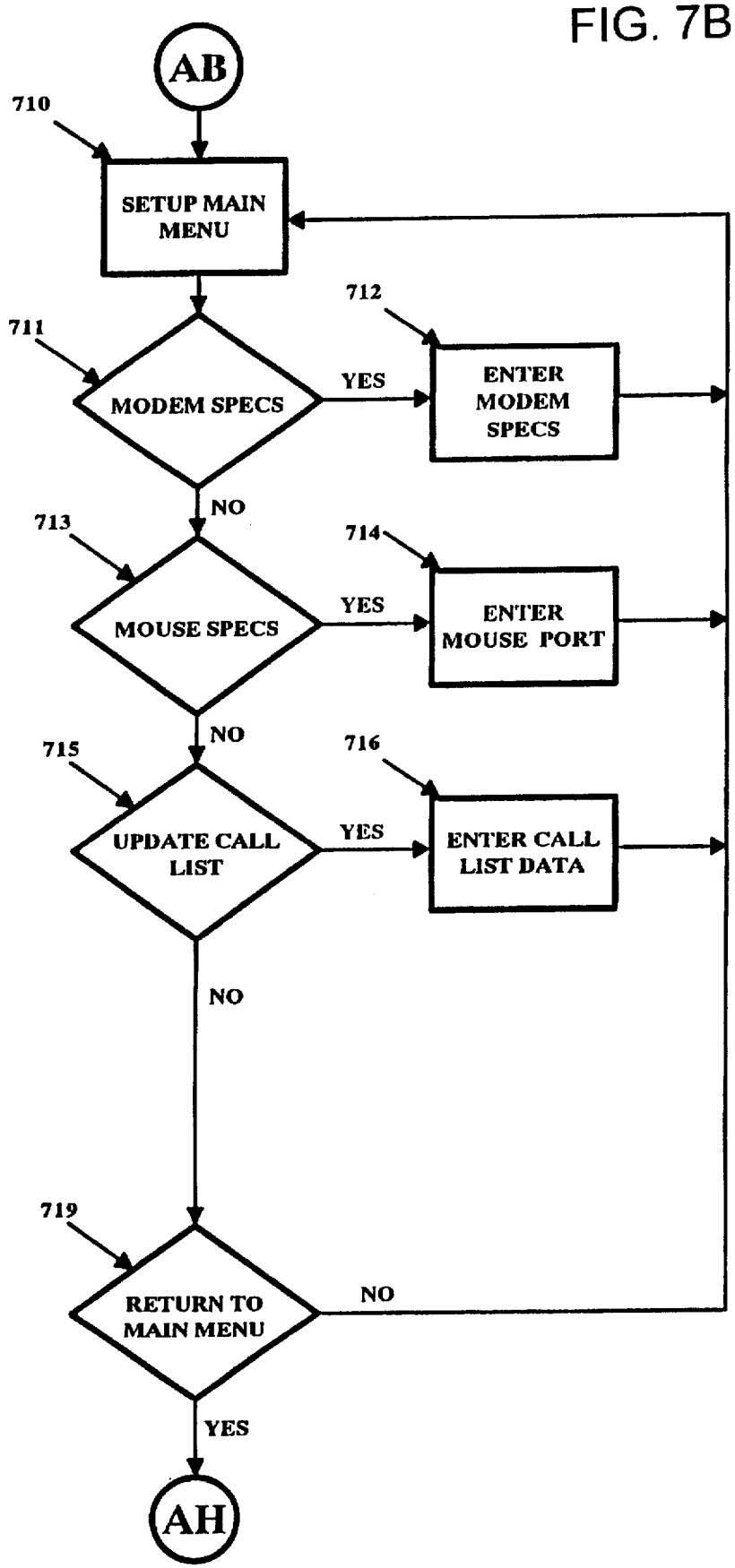
Figure 7C:
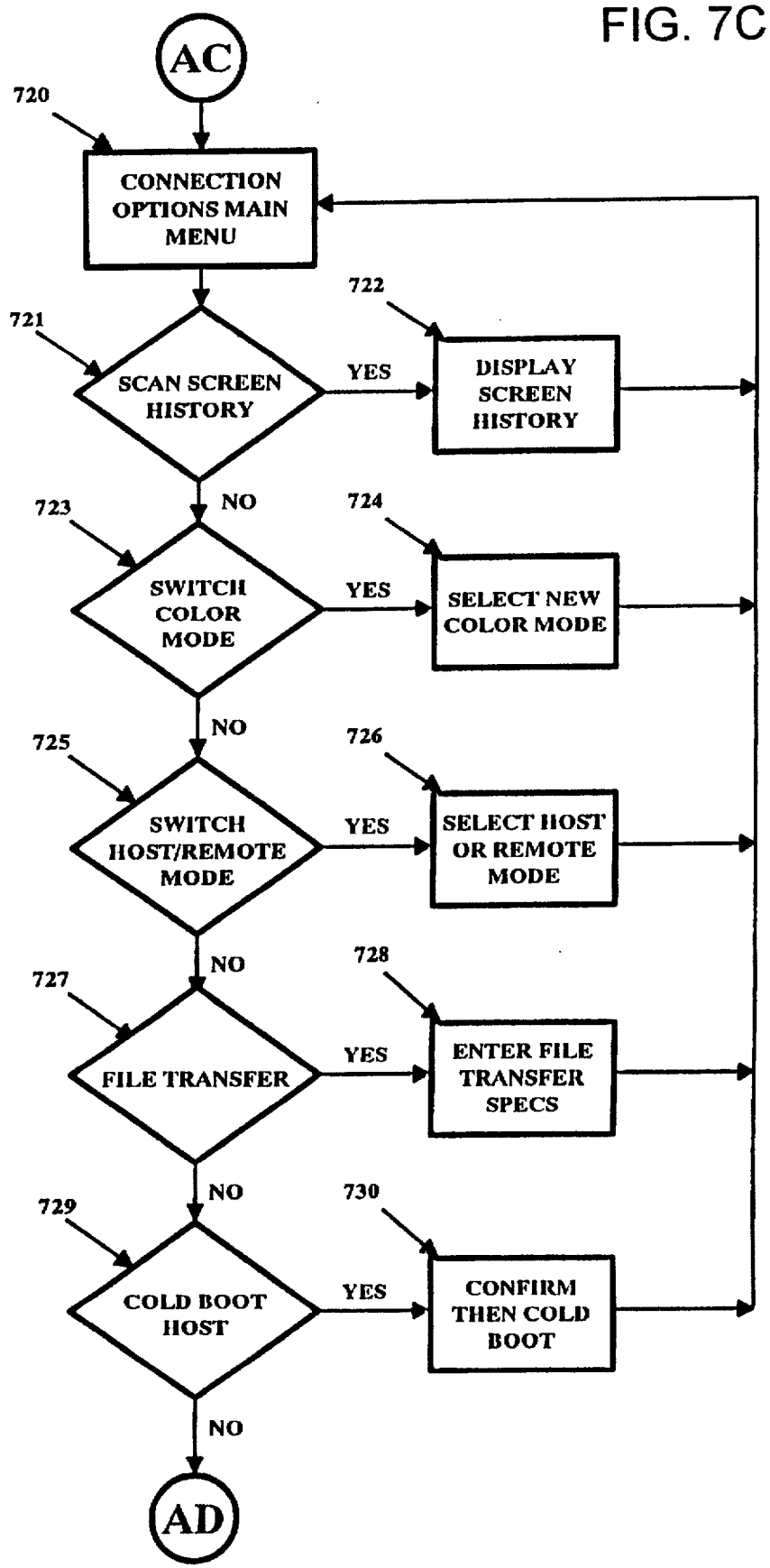
Figure 7D:
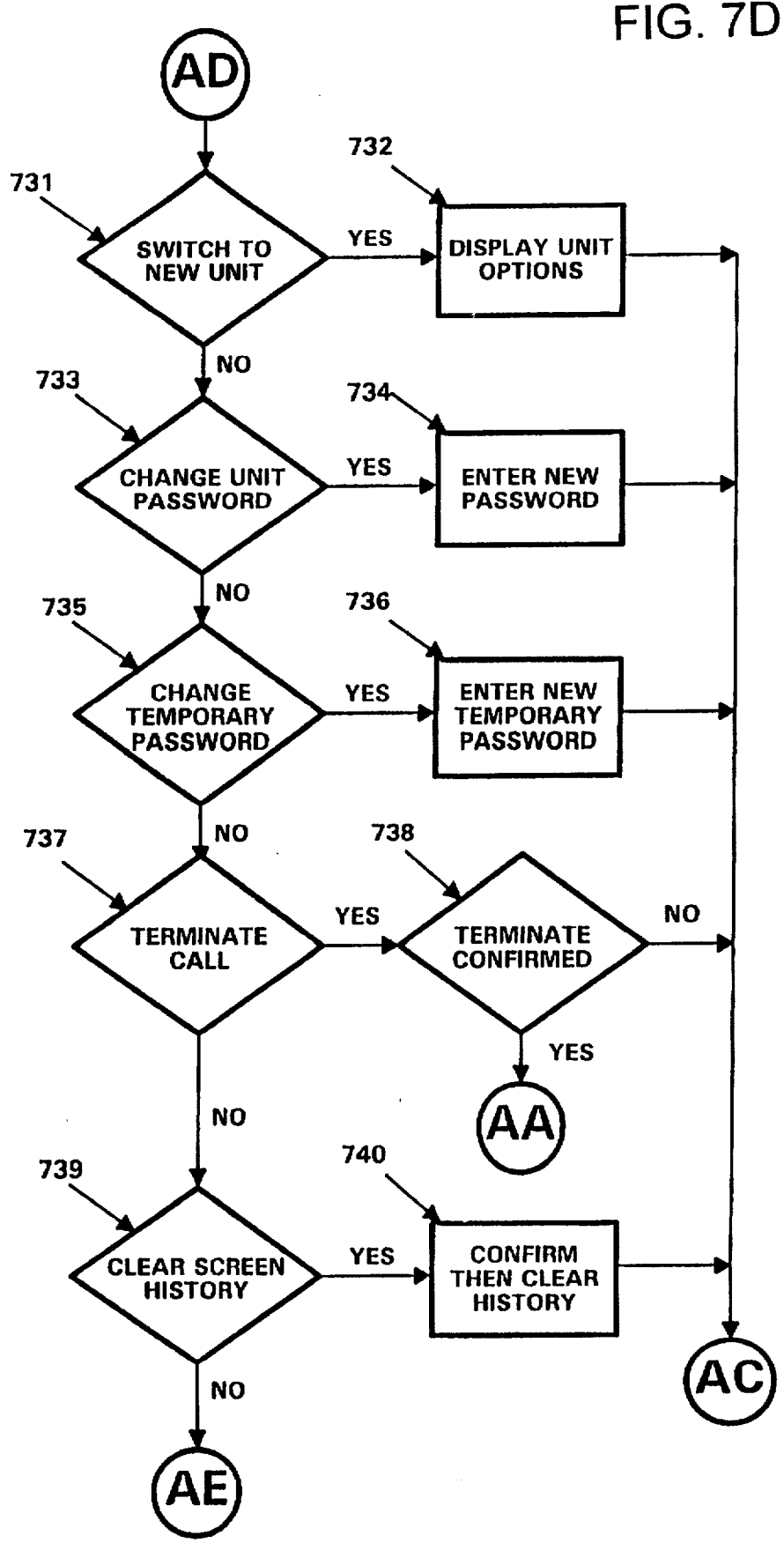
Figure 7E:
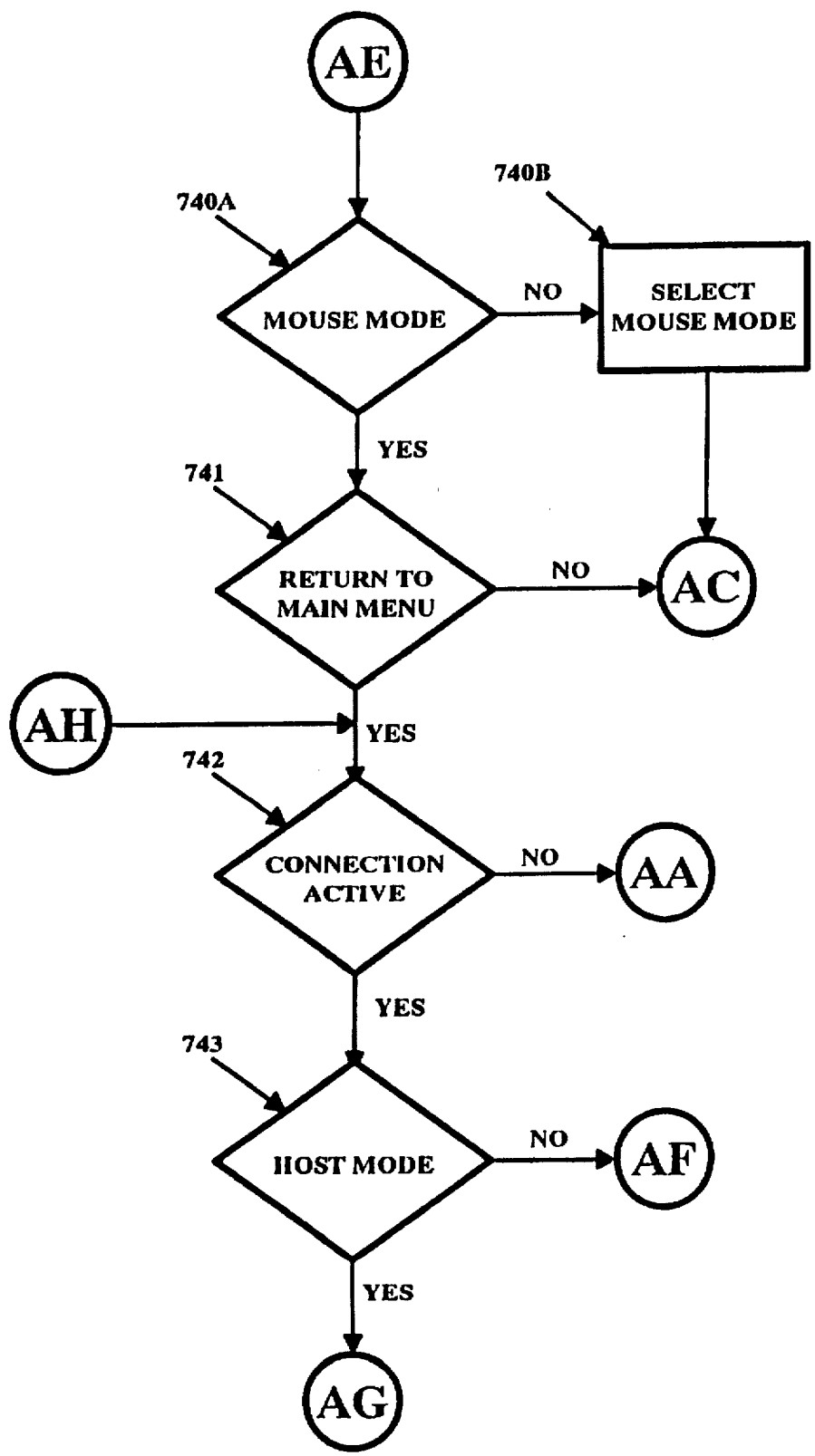
Figure 7F:
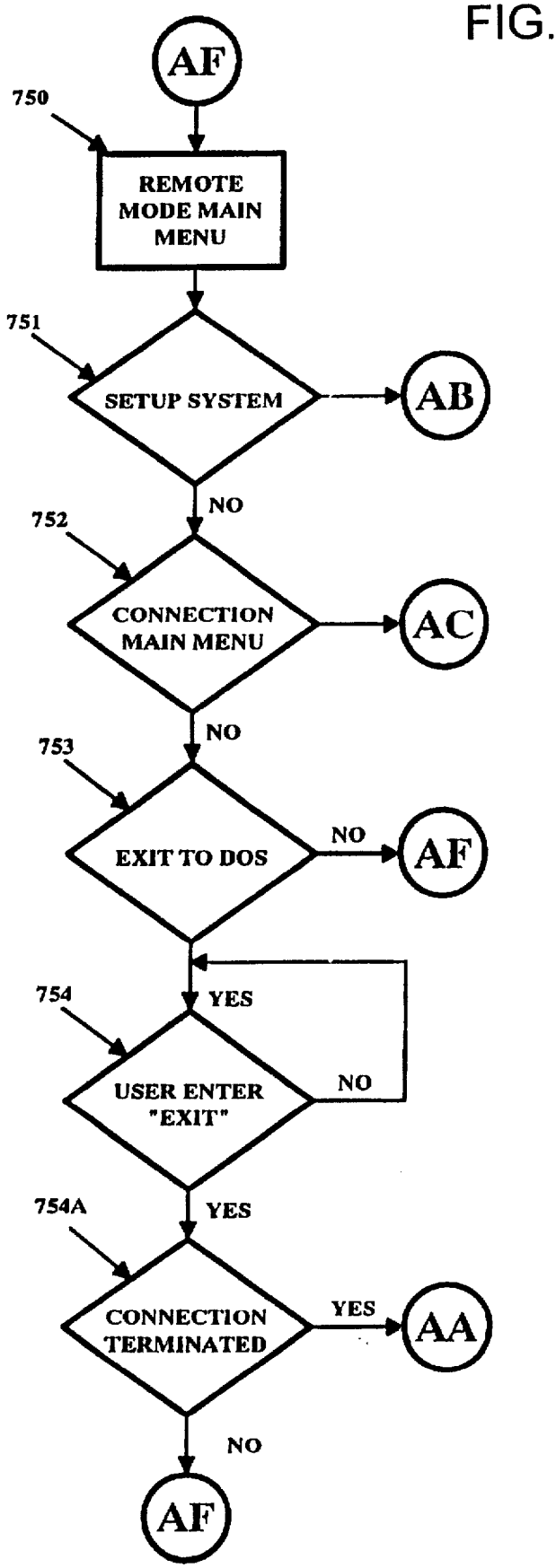
Figure 7G:
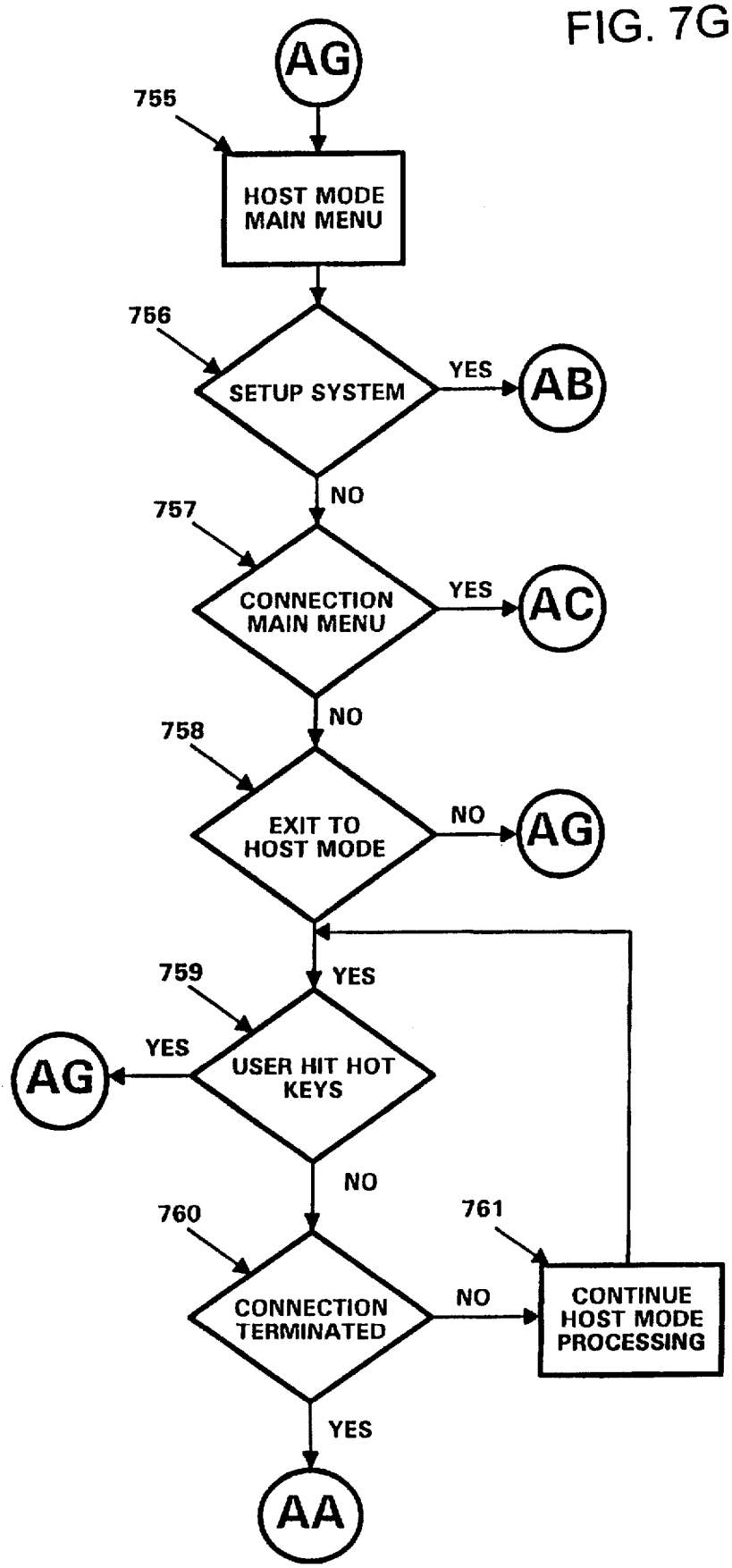

TVLINK.EXE processing begins at block 700 on FIG. 7A. When the program is first invoked, a System Main Menu is displayed 701 with three processing options. The first menu option, Setup System 702, permits configuring the system to the user's specific requirements and the hardware configuration of the Remote PC where the system is being installed. The second menu option "Call Host Site" 703 permits the user to cause their Remote PC to call and link to a desired Host PC. When this menu option is selected, a call list of Host Units that may be selected is displayed 704. This call list is created and maintained as part of Setup System 702 processing. When a Host Unit on the list is selected, the program initiates linkage processing to the selected Host Site, then links to the requested Host Unit. Once linked a password is requested by the Host Unit using a password transmission key based random number that causes the password transmitted by the Host Unit to be encrypted following a procedure set by the key. This approach makes it difficult for someone to decode a password being transmitted from a Remote PC to a Host Unit by tapping into the communication line. If an invalid password is received by the Host Unit, a "session" lock out counter for the Host Unit is incremented by one. If this counter exceeds the limit set for the session (see block 734 processing below), the user is locked out from any further access attempts to the Host Unit for the current session and a Host Unit lock out counter stored in non-volatile RAM in the Host Unit is incremented by one. If the Host Unit lock out counter exceeds the limit for the Host Unit (see block 734 processing below), all access to the Host PC will be blocked until someone presses the Action button on the front of the Host Unit.

If a connection is made to the selected Host Unit 705, the TVLINK.EXE program pops up a menu on the screen with two choices permitting the Remote user to either select a normal access mode or a view only access mode. In a normal access mode, the user has full keyboard and video access to the Host Unit. In a view only access mode, the user has only the capability to view the output of the Host PC's VDAC. Next, processing continues at block 742. If the Host PC is not turned ON or the Host Unit is not properly connected to the Host PC, the Host Unit will return an error that no Host Video signal is present, but the connection to the Host Unit will continue until terminated by the Remote User for the possible purpose of retrieving any VDAC screen history that may be present in the Host Unit.

If a connection cannot be completed to a Host Unit 705, an appropriate error message appears on the Remote PC VDM screen indicating why the connection could not be completed and the System Main Menu 701 is redisplayed. The final System Main Menu option, Exit System 708 terminates TVLINK.EXE program processing and returns control to the Remote PC's operating system.

When TVLINK.EXE program is executed for the first time on a Remote PC, the Setup System 702 main menu option is selected first to (1) define whether the linkage to a Host PC will be in a Modem Linkage mode or Direct Line Linkage mode; (2) setup the Modem Specifications and parameters 711 to initialize and access the modem connected to the Remote PC in those cases where a Modem Linkage mode will be used; (3) setup the Mouse Specifications and parameters 713 to define the Remote PC's serial port number where the Remote PC's mouse is connected in those cases where a serial mouse is present on a Remote PC and will be used to control a Host PC; and (4) setup the CALL LIST 715 of Host Units that may be accessed by the Remote PC 715. After these initial setup options have been completed, the Setup System 702 menu option may be selected to setup other system configuration options or to re-configure any options previously entered.

When selected, the Setup Main Menu 710 displays a list of four options. The Modem Specifications 711 menu setup option allows the baud rate, serial communications port number and modem initialization string to be defined for the modem connected to the Remote PC. If the Remote PC will only operate in a Direct Line Linkage mode, then the modem initialization string would not be entered.

When this option is selected, the software 712 automatically searches for a Hayes compatible modem connected to one of the serial ports on the Remote PC. If the modem does not respond to the search, the modem's power is turned off (external modem), the cable between the Host Unit and modem has not been properly connected (external modem), or a serial interrupt conflict prevents access to the modem, the Setup process will assume that the Direct Line Linkage mode will be used.

After the Modem Specifications are entered or modified, this information is saved on the Remote PC's mass storage device. After the baud rate and modem reset string are set to desired values, the Esc key may be pressed to return to the Setup Main Menu 710. When the Esc key is pressed and the Modem Linkage option is specified, the software automatically initializes the Remote PC's modem using the baud rate and reset string specified. Thereafter, whenever the TVLINK.EXE program is first initiated, the modem installed in the Remote PC is initialized automatically, so there is no need to re-run this menu option again unless the modem installed in the Remote PC is changed or the modem does not properly connect with a Host Unit. Once all required modification have been made to the Modem Specifications, the Esc key may be pressed to return to the SETUP menu.

The Mouse Specifications menu option 713 permits specifying the Remote PC's serial port to which a mouse is connected. If no serial port number is specified, the TVLINK.EXE software assumes that a mouse is not installed on the Remote PC. Otherwise, the TVLINK.EXE program tests for the presence of a mouse on the specified serial port and displays an error message, if the mouse cannot be found by the TVLINK.EXE software. Once a valid serial port is specified, the port number selected is saved to a configuration file on the Remote PC's mass storage device, so that subsequent TVLINK.EXE sessions will know if and where a mouse has been installed on the Remote PC. Once all required modifications have been made to the Mouse serial communications port, the Esc key may be pressed to return to the SETUP menu.

The Update Call List 715 menu option permits each Host Unit that a Remote PC may access to be defined or changed 716. Before a call can be placed to Host Unit, the Host Unit must be defined in the Remote PC's call list.

The specific data elements that presently must be defined for each Host Unit to be accessed include: (1) a location description, which is a user definable alphanumeric description of the Host Unit being accessed such as "SERVER XYZ", "VAST TAPE Unit", etc. (such descriptions help users with access to multiple Host Units more easily select a desired Host Unit); (2) a dialing string needed to call and access the modem at the site where the Host Unit is located in cases where the Remote PC operates in a Modem Linkage mode; (3) an alphanumeric password that allows only authorized persons who have the password to access a specific Host Unit; and (4) the ID number of the Host Unit to be accessed.

When a Host Unit is first installed, the default password has been pre-set prior to shipment to the eight digit serial number of the Host Unit, located on the label affixed to the bottom of the Host Unit. This numeric password must be specified in the Remote PC used to initially access an newly installed Host Unit. After a Host Unit has been successfully accessed using a correct password, the password may be changed as described later for block 734.

New call list entries may be added by using the Remote PC's down arrow key to go to the: last line of the call list which will be a blank line permitting the entry of data for the new Host Unit to be accessed.

An entry may be deleted from the call list by using the Remote PC's keyboard up or down arrow keys to highlight the applicable line item and then pressing the F3 key to delete the line from the call list.

A call list entry may be changed by highlighting the applicable line item, then changing the data contained on the line, as desired. Various other keys may be pressed to speed the process of navigating through a call list. A list of these keys is displayed in a pop up window whenever the user presses the F1 key. The pop up window is removed from screen when the user presses the Esc key.

Once all required modifications have been made to the call list, the Esc key may be pressed to return to the Setup Menu.

The last menu option on the Setup Main Menu 710, Return To Main Menu 719, permits returning to the appropriate System Main Menu VDM screen as discussed below beginning at block 742.

The "Connection Options" menu line only appears on the Host System Main Menu 755 when a active linkage exists between the Remote PC and a Host Unit. When selected the Connection Options Main Menu 720 is displayed that presently contains various processing options.

The Scan Screen History 721 connection menu option permits Host VDM screen data captured and transmitted to a Remote PC's VDM during a linkage session to be reviewed 722.

When the Remote PC is linked with a Host PC, all video VDM screen data received from the Host Unit is automatically logged to a screen history data file on the Remote PC presently called SCRNHIST.DAT. This file is automatically cleared whenever TVLINK.EXE processing is first initiated.

When the Display Screen History connection menu option is selected, the TVLINK.EXE program automatically activates a VIEWHIST.EXE subroutine to view the SCRNHIST.DAT file for the current TVLINK.EXE processing session. This permits any VDM screen data captured since the TVLINK.EXE program was initiated to be reviewed. The VDM screen history can be reviewed by using the UP and DOWN arrow keys. The Esc may be pressed to return to the Connection Options main menu 720.

The Color Mode 723 connection menu option is selected to set the active Host Unit to a specific color or monochrome display mode for purposes of capturing VDAC output for transmission to a Remote PC.

Five menu options are displayed when the Color Mode 723 menu option is selected, which are (1) Normal Color Mode, (2) Bright Color Mode, (3) Green Signal Mode, (4) Red Signal Mode, and (5) Blue Signal Mode. These menu options give a Remote user the ability to either transfer VDAC text output to a Remote PC in normal intensity or high intensity color or in a monochrome mode using either the Red, Blue or Green signal as the basis for decoding the VDAC output. In the high intensity color mode, the foreground colors are displayed from the high intensity color set and the background color set remains normal.

Normally the Host Unit is in a default display mode where the Host Unit's Video Processor only looks at the green color signal output of the VDAC. This mode is one of three possible monochrome modes and normally yields the fastest possible video processing and the greatest probability of decoding video text data displayed by a color VDAC and the green signal is the only signal for some monochrome VDAC output. Blue and Red Signal Modes also yield the fastest possible video processing, but selecting these modes may cause a lower probability of decoding either the Blue or Red signals into characters because Host PC color applications typically use the Blue or Red signals less often than the green signal.

Selecting either the Normal or Bright Color Modes slows down the Video CPU which must decode multiple signals in order to determine color and the text character. As a result, text data may not appear as quickly on a Remote PC, when either color mode is selected. However, selecting color assures the highest probability that the text data output of a VDAC will be properly decoded.

Presently, for graphics modes only the green VDAC output signal is used regardless of the menu option selected. As previously mentioned adding additional hardware to the Host Unit's Video Processor circuitry would permit multiple color graphics transfers to a Remote PC in a reasonable period of time.

The UP and DOWN arrow keys may be used to change to a desired color or monochrome display mode and then the Enter key may be pressed to select that mode.

After the desired display mode option is selected off of the menu or the ESC key is pressed, processing is returned to the Connection Options menu 720.

The Switch Host/Remote Mode 725 connection menu option is selected to set the mode that will be active after exiting from the main system menu when a connection to a Host Unit is active. Whenever TVLINK.EXE processing is first initiated, Host mode processing is assumed.

A menu 726 containing two possible modes appear when the Switch Host/Remote Mode 725 menu options is selected. The desired mode is highlighted using the Up and Down keyboard arrow keys and then the Enter key is pressed to select the mode.

If the Remote menu option is selected, the last menu option on the system main menu will be changed from "Exit to Host mode" to "Exit to DOS" after exiting from the Connection Options Main Menu 720. On this basis, selecting Exit to DOS option causes Remote PC processing to temporary exit out of the TVLINK.EXE application to the PC's operating system (e.g. DOS) while continuing to maintain a connection to the Host Unit. Once DOS processing has been completed, a user may then return to the system main menu by typing "EXIT" at a DOS prompt. For example, shelling-out to DOS during a TVLINK.EXE session would be useful if it became necessary to locate the directory where a file is located in order to transfer the file to a Host PC.

If the Host menu option is selected, the last menu option on the TVLINK.EXE menu will be "Exit to Host mode". When a Remote PC is placed in a Host mode, the Remote PC assumes control of the Host PC. In this mode, the contents of the Remote PC's VDM screen reflect the contents of the Host PC's VDM screen and the Remote PC's keyboard and mouse (assuming the mouse option is installed) is redirected to input keystrokes/mouse data to the Host PC, as opposed to the Remote PC. Accordingly, because the Remote keyboard, mouse and VDM act as if the remote user is sitting at the Host PC, there needs to be a sequence and/or combination of keystrokes (i.e. hot key) pre-defined that will cause the Remote PC to return back to a normal operating mode. Presently, tapping the left Shift key three times within 2 seconds acts as this hot key causing the Remote PC to return back to a normal operating mode. In this same regard, if a user taps the right Shift key two times within two seconds while in a Host mode, it will refresh the Remote PC's VDM screen by causing the Host Unit to transmit the entire current contents of the Host PC's screen. Normally, the Host Unit only sends any changes that have occurred on the Host PC's screen to minimize the amount of data transmitted to a Remote PC. On occasion, variances in the Host PC's VDAC signals may cause the Host Unit to mis-interpret data displayed on a screen and send corrupted display data to a Remote PC. Tapping the right Shift key twice refreshes the Remote PC's VDM screen.

Normally, when a Remote PC is in a Host mode, all key strokes entered into the Remote PC's keyboard are intercepted by the TVLINK.EXE program and transmitted to the Host Unit, so that the Host PC can pass these keystrokes on to the Host PC. This process also permits the TVLINK.EXE to take other actions when necessary. As previously mentioned, multiple taps of the left or right shift keys presently cause the TVLINK.EXE program to pop up and activate TVLINK.EXE menu processing. In addition, when the "Print Screen" key is pressed, TVLINK.EXE presently permits this keystroke to pass through to the Remote PC's operating system, thereby permitting the Remote PC to print the contents of a Host PC's VDM screen to a printer connected to the Remote PC. Other such processing exceptions can be made where necessary (through appropriate changes to the TVLINK.EXE program code) to further enhance a Remote user's ability to more effective manage both their Remote PC's and Host PC's resources.

When a user is in a Host mode and presses the left Shift key three times within two seconds, the user is returned to the System Main Menu 741. This menu and other menus pop-up (i.e. overlay) over a portion of the Host PC's screen. Any Host VDM information displayed continues to be updated and visible behind the pop-up menu on the Remote PC's VDM screen until the Host PC's connection is terminated or the user temporarily exits to the PC operating system (e.g. DOS) as explained at blocks 753 and 754.

After either the Host or Remote option is selected, processing is returned to the Connection Options menu 720.

The File Transfer 727 connection menu option is selected to permit data file transfers to occur between the Host PC and Remote PC. File transfers from one directory location on a Remote PC to another directory location on the Remote PC can be accomplished by temporarily exiting to the PC's operating system, as described under the narrative for block 726 above. File transfers from one directory location on a Host PC to another directory location on the same Host PC can be accomplished by selecting the "Exit to Host" option off of the system main menu, then using the Remote keyboard (that has been redirected to operate in place of the Host PC's keyboard) to complete the transfer using, for example, the DOS COPY command.

In order to complete any file transfer between a Host and Remote PC, the Host Unit must have been properly connected to one of the Host PC's serial ports. When this file transfer option is selected, a menu containing two options appears that define the direction of the file transfer 728. The first option permits file transfer to occur from the Remote PC to the Host PC. The second option permits file transfers to occur from the Host PC to the Remote PC. File transfer processing may be aborted by pressing the Esc key. If the Esc key is pressed, processing will return to Connection Options Menu 720.

Once the direction of the file transfer has been selected, the entry of the file specification is required to define the file(s) to be copied. This specification is presently set to follow the normal DOS COPY command format used to describe a source file to be copied. For example, the source file could be specified as C:\NETWARE\*.EXE, C:VREPAIR.COM, or \NETWARE\VREPAIR.COM. Once the source file has been specified, the entry of the target drive and full directory path where the files will be copied is presently required.

After the source files and target location have been specified, file transfer processing is initiated automatically using a file transfer protocol such as XMODEM, which is known to persons familiar to the trade. File transfer processing is aborted if (1) the Esc key is pressed, (2) no source files exist or the source file drive and/or directory is invalid, (3) the Host Unit is not properly connected to an active, available, Host PC serial port, or (4) the target drive and/or directory do not exist. Should processing be aborted an appropriate error message will be displayed and processing will return to the Connection Options Main Menu 720. Otherwise, during the file transfer process, the name of each file being transferred will be displayed.

After a desired file transfer process has been completed, processing is returned to the Connection Options Main Menu 720.

The Cold Boot Host 729 connection menu option is selected to temporarily interrupt all AC power to the active Host PC for approximately 15 seconds. A Host PC cannot be cold booted unless the Host PC's AC power plug is plugged into the AC Out receptacle on the back of the Host Unit.

When this menu option is selected, the cold-boot request must be confirmed by entering "Y" in response to the question "ARE YOU SURE? (Y/N)" 730. If "N" is entered in response to the question, cold-boot processing is aborted and processing returns to the Connection Options Main Menu 720. If "Y" is entered, the Remote PC sends instructions to Host Unit to temporarily cut AC power to the Host PC for approximately 15 seconds. Once the power is restored, the Host PC reboots, the Host Unit returns a confirmation to the Remote PC that the cold boot process has been completed and processing returns to the Connection Options Main Menu 720.

The Switch To New Unit 731 connection menu option is selected to switch from one Host Unit on a daisy chain to another Host Unit on the same daisy chain without terminating the linkage between a Remote PC and a Host Site.

If only the currently active Host Unit at a Host Site is accessible, there is no reason to select the Switch To New Unit menu option. In cases where it is desired to switch from one Host Unit to another Host Unit at a different Host Site, the currently active modem linkage must be terminated by selecting the Terminate Call menu option 737, then establishing a new connection to the desired new site, as described beginning at block 703.

When the Switch To New Unit 731 option is selected, a call list containing all Host Units defined using the same phone dialing string is displayed 732.

The list of Host Units are displayed to permit switching between Host Units daisy chained together without the need to terminate the existing phone line connection. The Esc key may be depressed to avoid switching to another Host Unit and return to the Connection Options Main Menu 720. The UP or DOWN arrow keys can be used to scroll through the list of Host Units defined. Once the desired Host Unit has been highlighted, the Enter key can be pressed to switch to the new Host Unit.

If the new Host Unit is inaccessible or the password used for the new Host Unit is incorrect, an appropriate error message will be displayed on the Remote PC's VDM screen, the connection to the last active Host Unit will be restored and processing will return to the Connection Options Main Menu 720. Otherwise, the active connection will be switched to the requested Host Unit and processing will be returned to the Connection Options Main Menu 720.

When the Change Unit Password option is selected 733, the system requests the entry of a new password for the currently active Host Unit 734. The Change Unit Password option permits changing the currently active Host Unit's password to a new password. When the password is changed, the call list entry for the applicable Host Unit is automatically updated to reflect the new password. Presently, when a Host Unit is manufactured, the password is initially set as the Host Unit's serial number.

When the Change Unit Password option is selected, the user is requested to enter a new password of up to eight digits in length. Password change processing may be aborted by pressing the Esc key. When the Esc key is pressed, processing returns to the Connection Options Main Menu 720. Otherwise, after a new password is entered, the Host Unit is updated for the new password.

After the password has been updated, the user is requested to enter any changes to the number of attempts during a session that a user is given to enter a valid password before being locked-out of this Host Unit for the session. An entry of zero indicates that a user may be given an unlimited number of attempts to enter a valid password to access the Host Unit. For purposes of lock out processing, a session refers to the period between when a remote user first connects to a host site until that time the remote user terminates the connection to the site.

Once the number of password attempts during a session has been updated, the user is requested to enter the number of concurrent sessions that may occur where a user fails to specify a correct password when accessing this Host Unit and is locked out of the Host Unit for the session. If the number of concurrent access lock-ups exceeds the specified number, the Host Unit will be electronically locked, until someone presses the action button on the front of the Host Unit. When a Host Unit is electronically locked, any user attempting to access the Host Unit will be given a message that the Host Unit was locked due to a possible intruder and access will be denied even if a valid password is entered until the Action button on the front of the Host Unit is pressed. Also, when a Host Unit is electronically locked, the Host Unit will emit a periodic audible alarm sound indicating the Host Unit is locked until the action button on the front of the Host Unit is pressed. An entry of zero indicates that the Host Unit should never be electronically locked. Whenever a Host Unit is successfully accessed by a Remote user, the concurrent session lockout counter is reset to zero.

Both the session lock and electronic lock are security measures designed to prevent giving a means to unauthorized intruders to guess a password to a Host Unit by limiting the number of guesses they can make and bringing the unauthorized access attempts to the attention of management via the electronic lockout procedure.

After, the password and related access counts are entered, the applicable call list entry is updated to reflect the new password, and processing returns to the Connection Options Main Menu 720.

When the Change Temporary Password option is selected 735, the system requests the entry of a new temporary password for the currently active Host Unit 736.

In some cases it may be necessary to grant someone temporary access rights to a Host Unit. For example an independent network consultant at a remote site may need to temporarily access a file server to fix an unusual network problem.

When the Change Temporary Password 735 menu option is selected, a user may specify an additional "temporary" password and a number of hours that the password should remain in effect. The temporary password entry may be aborted by pressing the Esc key. If the Esc key is pressed, processing returns to the Connection Options Main Menu 720. Otherwise, after a new temporary password is entered, the Host Unit is updated for the new temporary password, number of hours the password will remain in effect, and then processing returns to the Connection Options Main Menu 720.

The Terminate Call 737 connection menu option is selected to terminate the linkage to a Host site. When Terminate Call 737 menu option is selected, the call termination request must be confirmed by entering "Y" in response to the question "ARE YOU SURE? (Y/N)" 738. If "N" is entered in response to the question, call termination processing is aborted and processing returns to the Connection Options Main Menu 720. If "Y" is entered, the connection to the Host site is terminated causing both the Host and Remote modem to be reset, when in a Modem Linkage mode, and processing returns to the System Main Menu 701.

The Clear Screen History 739 connection menu option is selected to clear all screens captured and stored on the Remote PC's mass storage device since TVLINK.EXE processing was initiated or the screen history file was last cleared during an active session.

When the Clear Screen History 739 menu option is selected, the clear screen history request must be confirmed by entering "Y" in response to the question "ARE YOU SURE? (Y/N)" 740. If "N" is entered in response to the question, clear screen processing is aborted and processing returns to the Connection Options Main Menu 720. If "Y" is entered, the screen history file is deleted, a new empty screen history file is created and processing returns to the Connection Options Main Menu 720.

The Select Mouse Mode menu option 740A connection menu option is selected to activate or deactivate recognition of a mouse connected to the Remote PC. When this menu option is selected, two menu options appear 740B permitting the user to instruct the TVLINK.EXE software to either recognize or ignore mouse movements from the mouse connected to the Remote PC for purposes of transmitting the mouse movement data to control the Host PC.

The Return To Main Menu 741 connection menu option is selected to return to the system's main menu or is automatically invoked if the connection to a Host Unit is lost. The processing options displayed on the system's main menu vary depending on the processing status and the Remote/Host mode status 726. If a connection between a Remote Site and a Host site is lost due to a communications failure during connection options menu processing 742, processing returns to the System Main Menu at block 701. Otherwise, if the system is in a Host mode 743, Host Mode Main Menu processing is initiated beginning at block 755. If the system is in not in a Host mode 743, Remote Mode Main Menu processing is initiated beginning at block 750.

Remote Mode Main Menu processing begins at block 750. This menu includes three processing options. If the Setup System processing option 751 is selected, Setup Main Menu processing begins at block 710. If the Connections Main Menu option is selected 752, connection option processing begins at block 720. If the EXIT TO DOS option is selected 753, control is returned to the PC's operating system (e.g. DOS, Windows™, etc.) until the Remote user key enters "EXIT" 754. After the user enters "EXIT" processing returns to the Remote Mode Main Menu 750.

Remote Mode Main Menu 750 processing is terminated automatically if the communication connection between a Remote PC and a Host PC is lost 754A (e.g. due to a phone line failure) and processing is returned to the System Main Menu 701. Otherwise, Remote Mode Main Menu processing continues until either the Host Unit connection is terminated 738 or the mode is switched to a Host mode 726 during Connection Options Main Menu Processing 720.

Host Mode Main Menu processing begins at block 755. This menu includes three processing options. If the Setup System processing option 756 is selected, Setup Main Menu processing begins at block 710. If the Connections Main Menu option is selected 757, connection option processing begins at block 720. If the Exit To Host Mode option is selected 758, the Remote PC's keyboard, mouse (assuming a mouse is installed on the Remote PC and activated as described at block 740B) and VDM display are redirected to control the Host PC's keyboard/mouse and display the Host PC's video output 761 until the Remote user taps the left Shift key three times within two seconds, as previously discussed at block 726. When the user taps the left shift key 3 times, processing returns to the Host Mode Main Menu 755.

When a Remote PC is in a Host Mode the Remote PC's screen mode automatically switches to the screen mode (e.g. text or graphics) presently active on the Host PC. If the active screen mode is not supported by the TVLINK.EXE program or the Remote PC's VDAC, a error message indicating the Host PC has an unsupported video mode appears on the Remote PC. If during the course of accessing a Host PC, the screen mode should change, the Host Unit would automatically notify the Remote PC that a change has occurred to a new video mode and then wait for a response from the Remote PC to confirm the Remote PC VDAC has been switched to the new video mode before further video data transfers occur.

Host Mode Main Menu 755 processing is terminated automatically if the communication connection between a Remote PC and a Host PC is lost 760 and processing is returned to the System Main Menu 701. Otherwise Host Mode Main Menu processing continues until either the connection is terminated 738 or the mode is switched to a Remote mode 726 during Connection Options Main Menu Processing 720.

Figures 1, 8B:
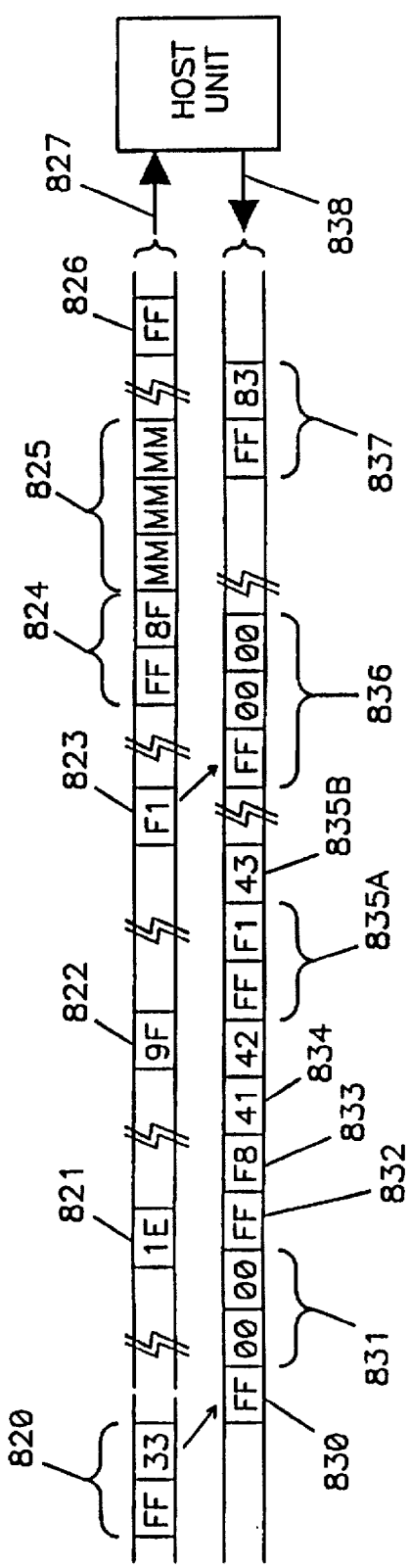
Figures 2, 8B:
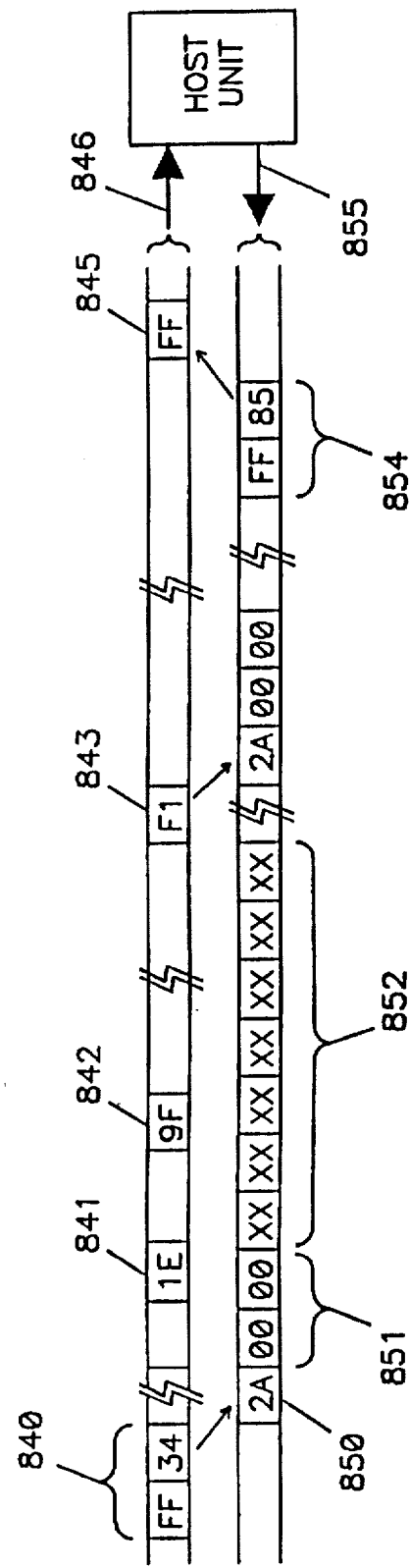

FIGS. 8A and 8B show examples of the current protocol implemented between the Host Unit and the TVLINK.EXE program running on a Remote PC. Numerous alternative approaches known to those of skill in the art could have been chosen to implement a protocol for the apparatus.

Values used in the protocol are shown as hexadecimal numbers. Initially, once a modem connection has been established between the Remote PC and the Host Unit 00, all Host Unit's at a site constantly monitor data from the TVLINK.EXE program waiting for a correct access request addressed to their Host Unit's ID.

Reference 807 represents data which the TVLINK.EXE program sends to the Host Unit. Reference 806 represents data which the Host Unit sends to the TVLINK.EXE program. The TVLINK.EXE program accesses a given Host Unit by sending a four byte packet as shown at references 800, 801. The first two bytes (hex 70 and hex 00) indicate that access is requested, and is followed by two bytes which contain the requested unit's identification number. This number is split into two 4 bit quantities (nibbles): Hex 40 plus the high nibble (shifted down 4 bits) and hex 50 plus the low nibble. The Host Unit on the chain with a matching identification number will respond by unchaining and directly connecting to the data line. This Host Unit then requests a password from TVLINK.EXE program on the Remote PC.

A hex FF 802 is reserved as a BREAK character. When this character is received, it indicates that the next byte is a command or status byte. The hex 06 following 802 is a request for password and is followed by two bytes 803 which form an encryption. The TVLINK.EXE program then sends an encrypted password 804 to the Host Unit. If this encrypted password is correct, the Host Unit sends hex FF and hex 10 bytes 805 which means that the Host Unit is ready and that the Host Unit has been successfully accessed.

Although only one password is requested as shown in the figure, in the current implementation, three to a ten passwords will be processed each with a unique encryption key. Only after all passwords are correctly received will the Host Unit send the ready status 805. This password protocol approach insures added security to the Host Unit access. If a password is incorrect, then no more password requests will occur and the Remote PC will not be permitted access to the Host Unit.

To avoid inadvertent access to other Host Unit's while having access to a given Host Unit, hex 70 is never transmitted to the Host Unit by TVLINK.EXE program (other than during an access request 800). Instead, the two byte packet 810 is sent which is interpreted as a single byte value of hex 70.

Reference 827 represents data which the TVLINK. EXE program sends to the Host Unit. Reference 838 represents data which the Host Unit sends to the TVLINK.EXE program. After the host sends the ready status 805, the TVLINK.EXE program can now issue commands to the Host Unit.

To enter remote access in text mode, the two byte command packet 820 is sent. It is composed of the BREAK character (hex FF) and the command byte (hex 33). The Host Unit now begins a remote access mode. In this mode, data bytes sent to the Host Unit from the TVLINK.EXE program are interpreted as keyboard scan codes which are translated and sent to the Host PC as keyboard signals. The hex value 1E at 821 is a scan code generated when the 'A' key is pressed. The hex value 9E at 822 is a scan code generated when the 'A' key is released.

Also, in remote access mode, video text data is captured and sent to the TVLINK.EXE program 838. This video data stream is composed of several parts. First, the screen character address is sent, which is the BREAK character 830 plus the two byte address 831. This address 831 is shown as zero, but since it is assumed upon entering remote access mode that the Remote PC's monitor screen has been blanked by the TVLINK.EXE program for the first screen's worth of data, no spaces will be sent. Thus, this starting address 831 may not necessarily be zero but will indicate the address of the first non-blank character encountered.

Next, color attribute information is sent (the BREAK character 832 with the attribute 833). This attribute byte is a hex C0 value summed with the 6 bit color attribute. Each bit can be represented by the form of "11rgbRGB" where the two most significant bits "11" (one,one), indicate that this is a color attribute byte where r,g and b represent red, green and blue foreground color bits, and R, G, and B represent the background color bits, as more fully discussed in the narrative supporting FIG. 5G and 5H. The value shown at 833 (hex F8) represents white on black. The two most significant bits (hex C0) is masked off (set to zero) leaving hex 38 or 00111000b. All foreground bits (rgb) equal one and all background bits (RGB) are zero, thus meaning white on black.

After the address and color information is sent, character code values, such as ASCII codes, follow. Reference 834 shows the hex representation of an "A" followed by a hex 42 which represents a "B" character. After this, there is a color change, so 835A is sent, composed of a BREAK character and the new color byte. In this case the hex F1 represents blue on black. The two most significant bits (hex C0) is masked off (set to zero) leaving hex 08 or 00001000b. Only the foreground blue bit (rgb) is equal to one and all background bits (RGB) are zero, thus blue on black. After this a hex 43 representing a "C" character is sent 835B. This continues until and an entire screen's worth of data is sent after which only the changes will be sent (thus reference 831 may take on non-zero values). Hex value FF, used in this mode at 838, as the break character, was selected because this value does not represent a valid character.

In addition to the scan codes 821, 822 being sent by TVLINK.EXE program to the Host Unit 827, there are several commands which can also be sent. A refresh-screen command (hex F1) 823 instructs the Host Unit to resend an entire screen of video text as if remote access mode has just been invoked. This begins with another address packet 836 (identical to 830) to be sent followed by color information, then characters, etc.

Another type of command 824 sends serial mouse data 825 to the Host Unit to be forwarded to the Host PC's serial mouse input port. The content of this mouse data 824 in not important to either the TVLINK. EXE program or the Host Unit, it is simply passed through to the Host PC's serial mouse port.

As the Host Unit is capturing video text data, the Host PC's video mode may change to graphics mode at which point this information is transmitted to the TVLINK.EXE program as indicated at reference 837 (a BREAK character plus the graphics mode status: hex 83). At this point, the Host Unit will not send any more video text information, but will continue to process scan codes and commands received from the TVLINK.EXE program. In the current implementation, the TVLINK.EXE program will end remote access text mode by issuing a hex FF 826 (which in this usage, is not a BREAK character) and begin remote access graphics mode. Then, the Host Unit sends a ready status (see 805) to indicate it is ready to process another command.

Remote access graphics mode begins by the TVLINK.EXE program sending 840 (a BREAK character plus a hex 34 remote access graphics command). At this point the Host Unit sends video graphics data 855 and will process scan codes, mouse information or other commands 846. Scan codes are shown at references 841, 842, the refresh command causing the graphics screen to be "repainted" is shown at 843, and the end graphics video mode command shown at 845. Mouse data is not shown but can also be processed.

The primary difference between graphics processing and text processing, is that the BREAK character value is now a hex 2A. This value was chosen because a hex FF, which means all pixels are on, is a common occurrence in graphics mode, so the value hex 2A was chosen instead. This mode begins by sending the starting address (the break character 850 with two bytes of graphics address information 851). It is assumed that the Remote PC's display screen is blank, and so only non-zero graphics data bytes are sent. The address value 851 may be other than the zero value shown.

In the most preferred embodiment, only graphic "snap shots" are taken. That is, after the address is sent, and the graphics data 852 has been completely sent, video graphics data will cease, until a refresh screen command 843 is received, at which time the graphics data is captured and sent again (see 853). Reference 854 shows that the Host PC's video mode has changed back to text mode (a break character plus the text mode status, hex 85). Then, the TVLINK.EXE program will end remote graphics mode via 845 and start the remote text mode (see 820). Note that for the remote graphics mode, if a graphics data byte equals a hex 2A (same as the break character) then a two byte packet is sent, which includes the break character (hex 2A) followed by the hex value A2. The TVLINK.EXE program will interpret this to be a hex 2A data byte.

Either the text or graphics mode can be ended at any time by issuing the hex FF character 826,845.

It is possible that the video mode may change to an unrecognized video mode or video may cease altogether (i.e. by turning the Host PC off or disconnecting the video cable). TVLINK.EXE is notified of this event (similar to 837 and 854) by sending a BREAK character followed by a hex 89 (no video present) or hex 8B (unknown video mode).

The file transfer mode is entered in a fashion similar to the video modes just described (i.e. a BREAK character followed by the command byte). The Host Unit simply passes TVLINK. EXE file data through to the Host PC or vice versa after the TVFILE.EXE program has been invoked on the Host PC to handle file transfers. The TVLINK.EXE converts all (Host Unit bound) hex 70 values to the two byte packet shown at 810 which the Host Unit will convert to a single hex 70 value before sending it to the Host PC. If TVLINK.EXE sends a hex FF character, this will end file transfer mode. So, (Host PC bound) data values of hex FF must be converted to a two byte packet of hex F0 plus hex 0F 811, which the Host Unit will convert to a single value of hex FF before sending it to the Host PC and TVFILE.EXE program. Other than these exceptions, the file transfer protocol is the responsibility of the TVLINK.EXE and TVFILE.EXE programs. In the current implementation, a modified XMODEM protocol is employed for file transfers with the data packet size changing according to the number of errors encountered (line noise). The XMODEM protocol is an industry standard familiar to persons in the trade.

The current Host Unit protocol could be modified to employ a higher level of data transmission error detection and acknowledgment to lessen the possibility of communication line noise causing data errors.

Figure 9:
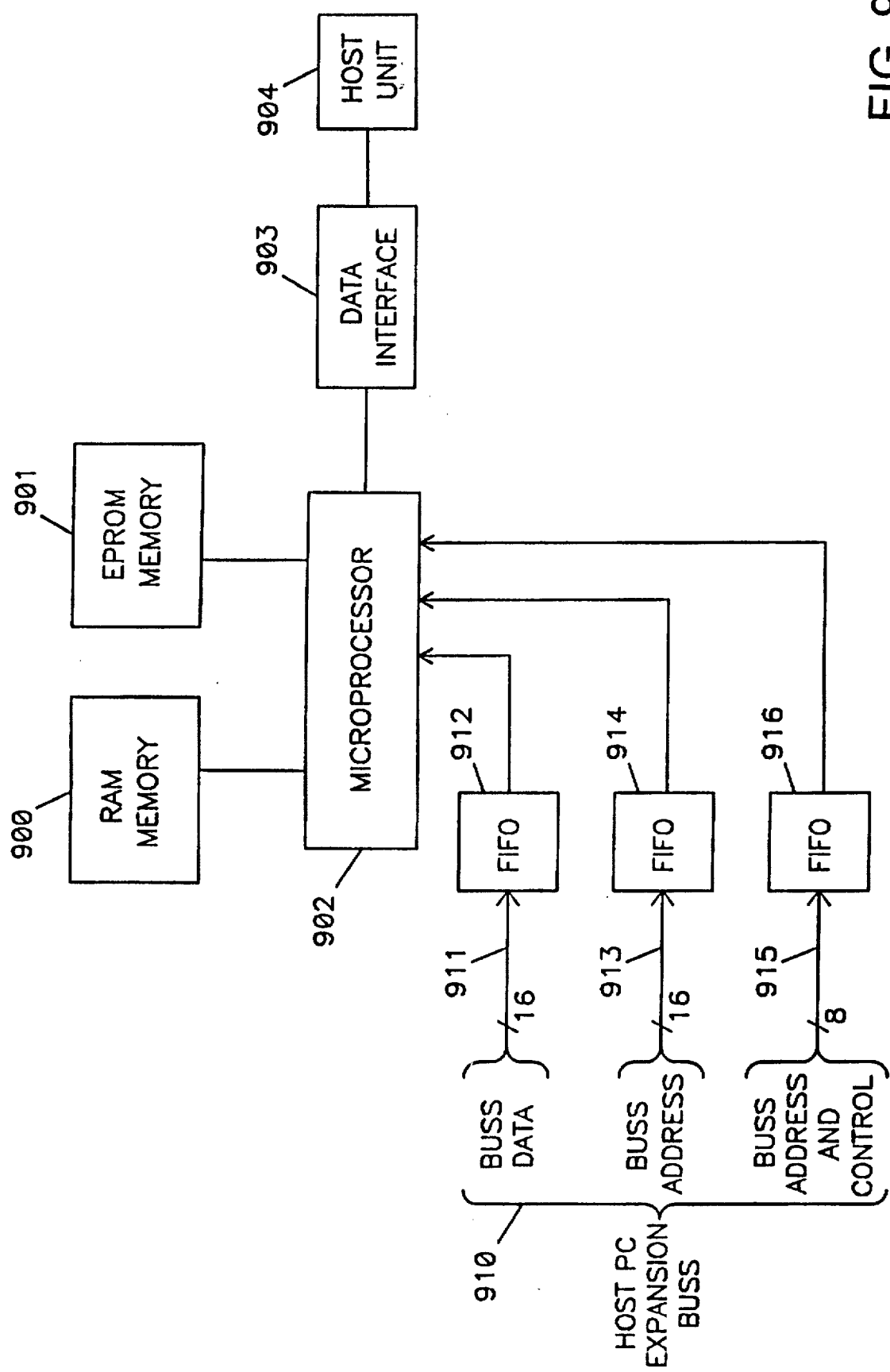
FIG. 9 illustrates an alternative embodiment of the present invention implemented on a circuit card suitable for insertion into a data processing device.

FIG. 9 represents an alternative embodiment of the present invention to the preferred embodiment discussed above in which a Host Unit captures and decodes the Host PC's VDAC video raster output signal. Under this approach, an Expansion adapter Card (EC) could be inserted into one of the available interface adapter card buss slots (e.g. 16 or 32 bit slots) within the Host PC and capture the digital video data directly from the Host PC's buss as it is being send to the Host PC's VDAC. In this case the EC would be designed so as not to interfere with normal Host PC processing, but would simply "listen-in" on the Host PC's buss and immediately transmit any video data detected to the Host Unit via a direct cable linkage between a Host PC video data interface (e.g. serial) port and a Host PC interface port on the EC.

As shown on FIG. 9, a possible embodiment of the EC would contain it's own microprocessor 902. Operating system software (within the associated EPROM memory 901) would monitor video activity being sent to the Host Unit's VDAC. Any video data detected on the buss 910 would be sent out through the EC's video data output receptacle 903 to the Host Unit's 904 (via a video data input receptacle) via 903. Because of possible differences in data transmission rates between the speed of the Host PC's buss and the speed at which data can be transmitted to a Host Unit, two levels of data buffering is included. To capture the video data from the Host PC's buss 910, several first-in first-out (FIFO's) buffers 912, 914, 916 would be used. The microprocessor then reads from these FIFO's, processing the data to place it in a form ready for transmission, and stores this data in memory 900. The data in this memory is then transmitted to the Host Unit.

The EC contains battery back-up, so that any data existing in the buffer could continue to be transmitted by the EC to the Host unit even in cases where the Host Unit has failed.

Digital video data received from the EC by the Host Unit would be stored in the Host Unit and forwarded to the Remote PC following the same procedures described for the preferred embodiment. However, the Host Unit would no longer need to access and decode the VDAC output from the Host PC, since in this alternative embodiment the digital video data would be supplied by the Host PC's EC.

Standard VDAC memory usage is as follows. This memory (addressed by the Host PC's microprocessor) resides on the VDAC. Monochrome text data is written to memory addresses starting at B000:0000. Whereas color text data is written to addresses starting at B800:0000. Standard VGA mode color graphics data is written to addresses starting at A000:0000 and this represents a 64K block (which is not large enough for VGA) and is bank switched to allow total access to the entire VDAC graphics memory. Bank switching is accomplished by writing certain data bytes to VDAC port addresses.

When data is written to the VDAC's video memory, whether in text mode or graphics mode, this data will also be written to the EC's FIFO's. The Host PC's 20 bit buss address is split between two FIFO's. The 16 bit buss data value 911 will be written to FIFO 912. The 16 bits of the buss address 913 are also written to FIFO 914. The remaining 4 bits of the buss address combined with certain control signals 915 are written to FIFO 916. These control signals are composed of a single-byte access line and its associated high or low byte line, the write port signal, and the write memory signal. These signals 915 are analyzed (not shown) so that data will be written to the FIFO's only when addresses A000:0000 through BFFF:FFFF, as well as VDAC port addresses, are written to by the Host PC's buss. Note that FIFO's need not be used and could be replaced by other circuitry to accomplish the same function.

The three FIFO's are then read by the microprocessor 902 and analyzed to determine the kind of VDAC access, and writes appropriate output data to the memory 900. This memory is treated as a circular buffer. When the buffer is not empty, then data is sent via 903 to the Host Unit 904. Thus, new data is added by 902 when it is received from the FIFO's, while previously processed data is forwarded to the Host Unit.

As an alternative embodiment to a separate EC, the functions of the separate EC could be incorporated on to a single Host VDAC. In this case the combination VDAC would have two output ports, namely a VDM interface port and a Host Unit interface port for transmitting the digital video information from the Host PC to the Host Unit via an interface cable.

An alternative embodiment of the Host Unit permits the Host Unit to be more portable and easily connectable to a Host PC in cases where one Host Unit was used to facilitate access to more than one Host PC. This alternative embodiment is hereinafter referred to as a "Portable Host Unit". A Portable Host Unit would typically only be connected to a Host PC in cases where one of the Host PC's at a Host Site had failed and a repairman needed temporary access to the failed Host PC remotely to initiate repairs. Once the repairs were completed or the problem with the Host PC diagnosed, the Portable Host Unit could be removed from Host PC and remain at the Host site until another PC failed.

Under one possible alternative embodiment of the Host Unit, a buss interface slot could be incorporated into the internal circuitry of the Portable Host Unit. This slot could then permit a standard internal modem (commonly inserted into PC buss slots and familiar to persons in the trade) to be inserted into the Portable Host Unit and thereby eliminate the need for an external modem. This approach eliminates the extra steps required for personnel at the Host Site to hook up an external modem to effect remote access. In addition, the Portable Host Unit would have an acoustical coupler (familiar to persons familiar with the trade) which would be incorporated into the Portable Host Unit's case and connected to the Portable Host Unit's internal modem to permit a standard telephone headset to be used (instead of a standard telephone line) to connect a Remote PC to the Portable Host Unit. An acoustical coupler connection is preferred over a telephone line connection due to the existence of intelligent business phone systems. Many such systems have connectors, cabling and/or signals that are not compatible with standard PC modems. Accordingly, it would be impractical for a Remote PC to establish a linkage to the Portable Host Unit unless the Host PC were moved to a location where a telephone jack existed or a long phone cable was run to the Portable Host Unit from wherever an available phone jack exists. An acoustical coupler permits a connection to be made to a Remote PC simply by placing the most convenient telephone's headset at the Host site into the acoustical receptacle on the Portable Host Unit.

Under this alternative embodiment, the Portable Host Unit would be connected to a Host PC as described in the narrative supporting FIG. 1, except (1) no direct line linkage would apply, (2) the modem at the Host Site would not be plugged directly into a telephone line and (3) no other Host Unit's would be daisy-chained to the Portable Host Unit. After the Portable Host Unit was attached to the Host PC, the TVTRAIN.EXE program could be initiated on the Host PC and the training process completed as described in narrative for FIG. 6. If this training process had been previously completed for this Host PC and the training parameters were stored in the Remote PC that will access the Host PC, as described below, the training process need not be repeated, after the Portable Host Unit is re-attached to the Host PC. In this case, the necessary training parameters would be uploaded from the Remote PC to the Host Unit via the TVLINK.EXE program when the connection is first established, as described below.

After the Portable Host Unit is connected to the Host PC and the training process completed, if applicable, a call would be initiated from the Remote PC to the most convenient phone number and phone extension, if applicable, at the Host Site where the Portable Host Unit is located. The person answering the call would place the telephone headset on the acoustical coupler of the Portable Host Unit to complete the telephone line linkage between the Remote PC and Portable Host Unit. If the training parameters for the Host PC being accessed are stored on the Remote PC's mass storage device, the parameters would be up-loaded automatically by the TVLINK.EXE program to the Portable Host Unit's non-volatile RAM storage, immediately after the connection to the Portable Host Unit is established. Otherwise, the training parameters would be automatically down-loaded from the Portable Host Unit's non-volatile RAM to the Remote PC's mass storage device for use in cases where future access may be required to the Host PC to eliminate the need for users at the Host Site to re-train the Portable Host Unit. Once the connection to the Portable Host Unit and the required training parameters have either been up-loaded or down-loaded, the Remote PC will have access to the Portable Host Unit consistent with any other Host Unit, as previously discussed. Once Host PC is processing is complete, the Remote PC user would terminate the connection via the TVLINK.EXE program (see narrative for block 754A), the Portable Host Unit would beep three times after the connection has ended, and someone at the Host Site would then remove the telephone headset from the acoustical coupler and return it to it's telephone cradle.

With regard to TVLINK.EXE processing on a Remote PC, when a call list is updated (see narrative for block 715), a symbol such as "!" will be used as part of the dialing string to indicate a call is being placed to a Portable Host Unit. When a call is placed to a Host Site (see narrative for block 704) containing this symbol as part of the dialing string, TVLINK.EXE will either up-load or down-load Host Unit training parameters to or from the Portable Host Unit, automatically associate the stored training parameters with the call-list entry, and follow the procedures necessary to establish a connection to the Portable Host Unit via an acoustical coupler. In addition, the TVLINK. EXE program will preclude selecting the TVLINK.EXE menu option permitting a Remote user to switch between Host Units (see narrative for block 731), since other Host Unit's cannot be presently daisy-chained to a Portable Host Unit.

The internal circuitry of a Host Unit presently provides a general data interface port, herein referred to as an "AUX" port to send data out of the Host Unit and receive data into the Host Unit from external devices. Presently, this AUX port has several intended uses.

First, this AUX port could be programmed by the Control CPU to interface with a transmitter, such as an X-10 transmitter, familiar to persons in the trade, to permit a Remote PC to control devices external to a Host Unit. For example, a Remote User could select a menu option provided by the TVLINK.EXE program causing power to be temporarily interrupted to remote print servers on a network, forcing the print servers to reboot and reattach to a computer network that has failed and been successfully re-started. In this example, data required by the X-10 unit to interrupt power to desired print servers would be sent by software operating in the Control CPU to the X-10 unit connected to the AUX port. Upon receipt of such data, the X-10 unit would transmit data to an X-10 receiver switch module used to supply AC power to each print server. Upon receipt of a command addressed to a specific X-10 switch module, AC power for that switch module would be interrupted. Upon receipt of a second command addressed to that switch module power would be restored.

Second, this AUX port could be used establish a linkage between the Host Unit and the network monitoring and trouble alert apparatus ("Alert System") such as an apparatus like that described in U.S. patent application Ser. No. 07/966,081 filed Oct. 23, 1992 now U.S. Pat. No. 5,566,339 and assigned to assignee of the present invention, the contents of which are incorporated by reference herein. In this case, the "Alert System" could share a common phone line linkage with Host Unit(s) at a Host Site. In addition, a special "Y" style serial cable interface would permit the Alert System to continue to transmit and receive serial data in the same manner, as well as link the Alert System's serial port to the AUX port of Host Unit 00.

When an alert is received from the Alert System, the person receiving the alert could enter a pre-set code using the keys on their touch tone phone indicating that the Alert System should suspend processing until a second confirming tone is received from a Remote PC's modem. Then, the person receiving the alert would activate the TVLINK.EXE program on their Remote PC to access the Host Site via a direct access (see narrative for Block 711) procedure. The TVLINK.EXE program would then instruct the Remote PC's modem to go off-hook and issue an audible touch tone code indicating the Remote PC was ready for the direct connection. Upon hearing this audible touch tone the remote user would hang up the telephone (at which point the Remote PC will still hold the line connection via the PC's modem's direct connect status). Once the confirming touch tone was received by the Alert System, the Alert System would send a pre-set signal out of it's serial port to the AUX port of Host Unit 00 instructing the Host Unit tell it's modem to go off-hook (and thereby complete the direct connection to the Remote PC). Upon receiving this serial signal, the Host Unit's Control CPU would send commands out of the Data Out port to the Host Unit's modem instructing the modem to go off hook and issue a preset touch tone confirming the Host Unit had taken the modem off hook. When the expected touch tones from the Host Unit's modem are detected by the Alert System, the Alert System would cancel any pending phone alerts and go on-hook. At this point, a successful direct connection between a Remote PC and a Host Site has been accomplished after alert is received without losing the phone connection.

Synchronizing Host Unit access and Alert System processing, as described, (1) permits both the Alert System and Host Unit to successfully share the same phone line and thereby minimize phone line costs, (2) prevents situations where both a Remote PC and Alert system share the same phone line and the Remote PC cannot access a Host Unit because the Alert System is using the phone line to issue alerts, (3) minimizes situations where both a Remote PC and Alert system share the same phone line and the Alert System interferes with the Remote PC's connection to the Host PC by continuing to interrupt the phone line by attempting to issue pending alerts, and (4) insures the fastest possible access to Host PC's in the event an alert is issued by the Alert System.

We claim:

1. A computer monitoring system for monitoring information displayed on a video display terminal connected to, and receiving display information from, a data processing device comprising:

video raster signal input means for receiving a video raster signal representative of said information displayed on the video display terminal from the data processing device; and conversion means connected to said video raster signal input means for converting said video raster signal into a digital signal representative of said information contained in said video raster signals, said conversion means comprising character determination means for determining an identity of each character displayed on the video display terminal and for generating a digital code indicative of said identity of said each character displayed on the video display terminal, said character determination means comprising circuitry for generating a series of cyclic redundancy checks, wherein each said cyclic redundancy check is generated from pixel information associated with each character location on the video display terminal.

2. The system of claim 1 further comprising transmission means connected with said conversion means for transmitting said digital code to a remote location.

3. The system of claim 2 further comprising:

reception means at said remote location connected with said transmission means for receiving said digital code transmitted by said transmission means; and remote video display means connected with said reception means for displaying said digital code received from said reception means, said remote video display means showing an image substantially the same as that shown on the video display terminal to allow a user to determine the operational status of the data processing device.

4. The system of claim 3 wherein said digital code is transmitted to said remote location in response to a command received from said remote location requesting that said digital code be transmitted.

5. The system of claim 4 further comprising interconnection means for interconnecting a plurality of said computer monitoring systems with one another and for allowing a user at said remote location to selectively access any one of said computer monitoring systems.

6. The system of claim 1 further comprising:

memory means connected with said conversion means for storing said digital code to retain an image of said information displayed on the video display terminal; and control means connected to said memory means and said conversion means for monitoring changes to said image and for storing said digital code representative of said changes in said memory means, such that said memory means contains a series of image frames that can be used by an operator to determine the cause of a system failure.

7. The system of claim 1 further comprising:

training means connected to said character determination means for generating a predetermined character display, for operating said character determination means to generate digital codes representative of an identity of each character in said predetermined character display, and for storing said digital codes generated by said character determination means; and comparison means connected with said training means and said character determination means for comparing digital codes generated by said character determination means for an unknown display on said video display terminal with said digital codes representative of each character on said predetermined display, such that said identity of each character displayed on said unknown display can be determined.

8. The system of claim 1 further comprising:

synchronization signal input means for receiving from the data processing device a horizontal synchronization signal; and pixel clock generating means connected with said synchronization signal input means and said conversion means for generating a pixel clock signal.

9. The system of claim 1 wherein said data processing device is a personal computer, and said video raster signal input means comprises a circuit interconnected between said personal computer and the video display terminal.

10. The system of claim 2 wherein said transmission means comprises a standard public switched telephone line.

11. A method of receiving, analyzing and converting information contained in an analog video raster signal generated by a data processing device and displayed on a video display terminal associated with the data processing device, into a digital representation of that information comprising the steps of:

receiving the analog video raster signal generated by the data processing device;

converting said analog video raster signal into a digital signal representative of said information contained in said video raster signal, said converting step including the steps of:

determining an identity of each character displayed on the video display terminal; and generating a digital code indicative of said identity of said each character displayed on the video display terminal, wherein said step of generating a digital code comprises the step of generating a series of cyclic redundancy checks from pixel information associated with each character location on the video display terminal.

12. The method of claim 11 further comprising the step of transmitting said digital codes to a remote location.

13. The method of claim 12 further comprising the steps of:

receiving said digital codes transmitted to said remote location; and displaying said digital codes to create an image substantially the same as that shown on the video display terminal to allow a user to determine an operational status of the data processing device.

14. The method of claim 13 wherein said step of transmitting said digital codes to said remote location is performed in response to a command received from said remote location requesting that said digital codes be transmitted.

15. The method of claim 12 wherein said digital codes are transmitted to said remote location using a standard public switched telephone line.

16. The method of claim 11 further comprising the steps of:

analyzing a predetermined character sequence displayed on the video display terminal to determine an identity of each character displayed on said video display terminal;

generating a digital code representative of each character in said predetermined character sequence displayed on said video display terminal; and storing said digital codes in a memory.

17. The method of claim 11 further comprising the steps of:

receiving a horizontal synchronization signal from the data processing device; and generating a pixel clock signal in synchronization with said horizontal synchronization signal.

18. The method of claim 11 wherein said data processing device is a personal computer, and said video raster signal is intercepted between said personal computer and the video display terminal.

19. A computer implemented method of converting information contained in a video raster signal generated by a data processing device and displayed on a video display terminal associated with the data processing device, into a digital representation of that information comprising the computer implemented steps of:

receiving the video raster signal generated by the data processing device; and converting said video raster signal into a digital signal representative of said information contained in said video raster signal, said converting step including the steps of:

determining an identity of each character displayed on the video display terminal; and generating a digital code indicative of said identity of said each character displayed on the video display terminal, wherein said step of generating a digital code comprises the step of generating a series of cyclic redundancy checks from pixel information associated with each character location on the video display terminal.

20. A computer monitoring system for monitoring information contained in an analog video raster signal generated by a data processing device and displayed on a video display terminal connected to the data processing device and for convening the information contained in the analog video raster signal into a digital representation of that information for transmission to a remote location comprising:

analog video raster signal input means connected with the data processing device for receiving said analog video raster signal generated by said data processing device;

conversion means connected to said analog video raster signal input means for receiving said analog video raster signal and for converting said analog video raster signal into a digital signal comprising a plurality of digital codes representative of information contained in said analog video raster signal, said conversion means comprising processing means for analyzing said analog video raster signal, for determining an identity of each character displayed on the video display terminal, and for generating at least one of said plurality of digital codes, said at least one of said plurality of digital codes being indicative of said identity of said each character displayed on the video display terminal.

21. A computer monitoring system for monitoring information contained in an analog video raster signal generated by a data processing device and displayed on a video display terminal connected to the data processing device and for converting the information contained in the analog video raster signal into a digital representation of that information for transmission to a remote location comprising:

analog video raster signal input means connected with the data processing device for receiving said analog video raster signal generated by said data processing device;

conversion means connected to said analog video raster signal input means for receiving said analog video raster signal and for converting said analog video raster signal into a digital signal comprising a plurality of digital codes representative of information contained in said analog video raster signal, said conversion means comprising processing means for analyzing said analog video raster signal, character determination means for determining an identity of each character displayed on the video display terminal and for generating a digital code indicative of said identity of said each character displayed on the video display terminal and for generating at least one of said plurality of digital codes, said at least one of said plurality of digital codes being indicative of said identity of said each character displayed on the video display terminal; and training means connected to said character determination means for generating a predetermined character display, for operating said character determination means to generate digital codes representative of an identity of each character in said predetermined character display, and for storing said digital codes generated by said character determination means.

* * * * *